US012762560B2

(12) United States Patent
Fiske

(10) Patent No.: US 12,762,560 B2
(45) **Date of Patent: *Oct. 13, 2026**

(54) SECURING TRANSACTIONS WITH A BLOCKCHAIN NETWORK

(71) Applicant: Michael Stephen Fiske, San Francisco, CA (US)

(72) Inventor: Michael Stephen Fiske, San Francisco, CA (US)

(73) Assignee: Biogy, Inc., San Francisco, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 18/513,564

(22) Filed: Nov. 19, 2023

(65) Prior Publication Data

US 2024/0169350 A1 May 23, 2024

Related U.S. Application Data

(63) Continuation-in-part of application No. 13/785,766, filed on Mar. 5, 2013, now Pat. No. 9,235,697, and a (Continued)

(51) Int. Cl.
*G06Q 20/22* (2012.01)
*G06Q 20/34* (2012.01)

(Continued)

(52) U.S. Cl.
CPC ..... *G06Q 20/40145* (2013.01); *G06Q 20/341* (2013.01); *G06Q 20/3829* (2013.01); *H04L 9/50* (2022.05)

(58) Field of Classification Search
CPC ........... G06Q 20/40145; G06Q 20/341; G06Q 20/3829; G06Q 20/3825; G06Q 20/405;

(Continued)

(56) References Cited

U.S. PATENT DOCUMENTS

| | | | | |
|---|---|---|---|---|
| 2003/0005305 | A1* | 1/2003 | Brickell | H04L 9/3247 713/177 |
| 2019/0102756 | A1* | 4/2019 | Zhou | G06Q 20/3278 |
| 2020/0304318 | A1* | 9/2020 | Kravitz | H04L 9/3268 |

FOREIGN PATENT DOCUMENTS

| | | | | |
|---|---|---|---|---|
| EP | 3767876 A1 * | 1/2021 | | H04L 9/50 |
| WO | WO-2019020824 A1 * | 1/2019 | | G06Q 20/065 |

OTHER PUBLICATIONS

Hao Pham-Duc, Khang Vo-Vi, Khuong Nguyen-An; "A Zero-Knowledge Proof-Based Protocol for Privacy-Preserving Transactions on Public Blockchains"; BSCI '25: Proceedings of the 7th ACM International Symposium on Blockchain and Secure Critical Infrastructure; ACM; Article No. 14; pp. 1-8; Aug. 2025 (Year: 2025).*

(Continued)

*Primary Examiner* — Fatoumata Traore
*Assistant Examiner* — Courtney D Fields

(57) ABSTRACT

Methods and systems are provided for performing a secure transaction. In an embodiment, users register biometric and/or other identifying user information. A private encryption key is generated from the biometric information and/or other user information and/or information obtained from a unpredictable physical process and are stored in a secure area of a device and a public key is transmitted to the blockchain network which acts as a service provider. In some embodiments, the execution and integrity of transactions by using transaction signatures, based on visual images is disclosed. In an embodiment, a blockchain network verifies and executes the transaction.

19 Claims, 25 Drawing Sheets

Related U.S. Application Data continuation-in-part of application No. 13/541,733, filed on Jul. 4, 2012, now Pat. No. 9,858,401, and a continuation-in-part of application No. 14/991,991, filed on Jan. 10, 2016, now Pat. No. 10,728,027, and a continuation-in-part of application No. 15/859,681, filed on Jan. 1, 2018, now abandoned, and a continuation-in-part of application No. 16/939,691, filed on Jul. 27, 2020, now Pat. No. 11,824,991.

(60) Provisional application No. 61/634,778, filed on Mar. 5, 2012.

(51) Int. Cl.

| | |
|---|---|
| ***G06Q 20/38*** | (2012.01) |
| ***G06Q 20/40*** | (2012.01) |
| ***H04L 9/00*** | (2022.01) |
| *H04L 9/32* | (2006.01) |

(58) Field of Classification Search

CPC ....... H04L 9/50; H04L 9/0643; H04L 9/0841; H04L 9/0866; H04L 2209/56; H04L 9/3247; H04L 9/3231

See application file for complete search history.

(56) References Cited

OTHER PUBLICATIONS

Mohammad El-Hajj, Ahmad Fadlallah, Maroun Chamoun, Ahmed Serhrouchni; Ethereum for Secure Authentication of IoT using Pre-Shared Keys (PSKs); 2019 International Conference on Wireless Networks and Mobile Communications (WINCOM) Year: 2019 | Conference Paper | Publisher: IEEE; pp. 1-7; (Year: 2019).*

* cited by examiner

321

370

FIG. 4
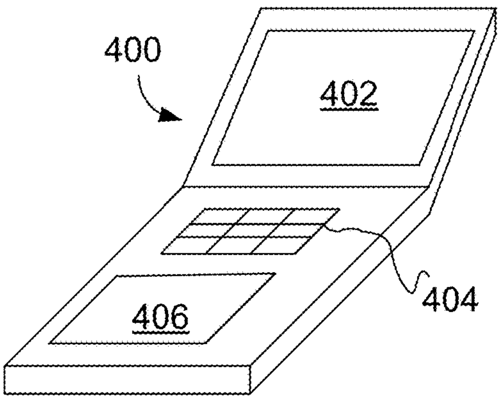
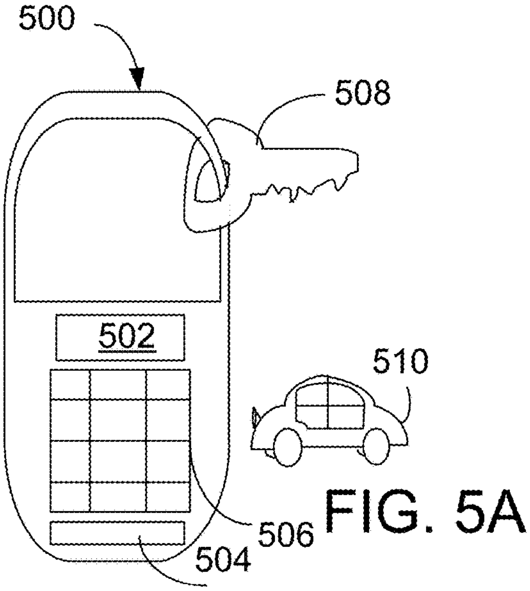
FIG. 5A

520

700

800

900

FIG. 10 Enrollment 1000

SECURING TRANSACTIONS WITH A BLOCKCHAIN NETWORK

CROSS-REFERENCE TO RELATED APPLICATIONS

This application incorporates herein by reference U.S. Provisional Patent Application No. 61/634,778, filed Mar. 5, 2012; this application is a continuation-in-part of U.S. Non-provisional patent application Ser. No. 13/785,766, entitled "One-Time Passcodes with Asymmetric Keys", filed Mar. 5, 2013, which is incorporated herein by reference. This application is a continuation-in-part of U.S. Non-provisional patent application Ser. No. 14/991,991, entitled "One-Time Passcodes with Asymmetric Keys", filed Jan. 10, 2016, which is incorporated herein by reference. This application is a continuation-in-part of U.S. Non-provisional patent application Ser. No. 15/859,681, entitled "Securing Blockchain Transactions Against Cyberattacks", filed Jan. 1, 2018, which is incorporated herein by reference. This application is a continuation-in-part of U.S. Non-provisional patent application Ser. No. 16/939,691, entitled "Securing Blockchain Transactions with a Blockchain Network", filed Jul. 27, 2020, which is incorporated herein by reference.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the "some advantages section" represents different approaches, which in and of themselves may also be inventions, and various problems, which may have been first recognized by the inventor.

In many applications a password is required to grant access to a system or authorize a transaction. Today many users have so many different passwords that it is difficult to remember them. In other cases, a password can be stolen by a thief, making passwords susceptible to fraud.

LIMITATIONS AND WEAKNESSES OF PRIOR ART

In March, 2011, EMC Corp's RSA security division announced a massive breach of its SecureD products. On Mar. 19, 2011, the Wall Street Journal stated the following.

A security company that provides computer-access keys used by thousands of businesses around the world disclosed a serious break-in, but left many customers scrambling to figure out what was taken and how they might be affected.

EMC Corp's RSA Security division Thursday said it has experienced an "extremely sophisticated cyber attack" on its computer systems, resulting in the theft of information related to its SecurID products.

Those products include tokens, which can be the size of a credit card or key-chain fob, that are used by employees to access corporate computer networks. The token generates every minute a new six-digit number that is synchronized with central security servers.

RSA held a conference call with customers Friday to discuss the intrusion, but didn't specify what information was taken by the attackers and declined additional comment.

RSA says SecurID system is used by more than 25,000 corporations, and more than 40 million users around the world.

"RSA is distributing a set of best practices that they say will protect you," said Bruce Jones, head of global information-technology security at Eastman Kodak Co. Beyond that, he said, RSA isn't telling customers much more about the incident.

We are getting very little information, primarily because it is an open criminal investigation and the law-enforcement agencies are limiting RSA to what they can share," Mr. Jones said.

Security experts interpreted the statements that RSA issued Thursday to indicate the attackers may have obtained so-called "seed" keys, which include number associated with each token.

RSA said Thursday it is confident that the stolen information "does not enable a successful direct attack" on any SecurID users, but added that the information "could potentially be used to reduce the effectiveness" of the security scheme as part of a broader attack. Hackers have already demonstrated the ability to decrypt other authentication factors used to make networks safe, and "this just exacerbates the situation," said Avivah Ltan, an analyst with research firm Gartner.

Art Coviello, RSA's executive chairman, described the attack in an open letter Thursdayd as an "advanced persistent threat"—a category of computer crime often associated with efforts to steal specific sorts of information over a considerable period of time. Such attacks typically are associated with criminal groups, which in recent years have often operated out of Eastern Europe, analysts said. Mr. Coviello didn't discuss any suspects for the attack, but said the company is working with law-enforcement agencies.

Friday's conference call mainly focused on what customers should do to beef up their own security, such as making sure no rogue programs had been installed on servers running RSA software and suggesting that users increase the length of PIN members from four to eight digits, according to one person who participated.

"RSA's limited disclosures may have been driven by the desire to avoid creating a panic among its customers", said Jonathan Penn, an analyst at Forrester Research. He anticipates that RSA will reach out to customers through its sales force and support staff in the coming days.

Paul Kocher, president of security-technology firm Cryptography Research, said the incident raises questions about the viability of RSA's model of serving as a central repository for seed keys. Some rivals have created systems that use software at customer sites to generate such keys. "It's a big problem" for RSA, Mr. Kocher said. "They are going to have a hard time convincing their customers that they should hold their keys."

Despite the original claim that this loss of seed information on RSA networks did not enable a direct attack, in June 2011, the adversary phished PINs from employees of defense contractors and penetrated the corporate networks of these defense contractors with offices in Washington D.C. According to Krebs Security, over 700 institutions worldwide had their networks compromised as a consequence of the SecurID breach.

Because he backend server that authenticates SecurID passcodes uses the same seed as the token, after the seed information was stolen from RSA's network, the adversary was able to launch a successful attack. In summary, THE ADVERSARY WAS ABLE TO REMOTELY ACCESS CORPORATE NETWORKS OF U.S. DEFENSE CON- TRACTORS WITHOUT HAVING AN RSA SecuID token in their physical possession. At least part of SecurID's security vulnerability and security breach was caused by the fact that the seed for a particular token is the same as the corresponding seed on the backend server. In other words, the prior art uses the same shared secret on the physical token device and the backend server that performs the authentication and administers access to a network or other resource. In some cases, this is referred to as symmetric seeds or symmetric keys. In some cases, this is referred to as a shared symmetric secret.

A shortcoming in the prior art, recognized by this specification, is that there is a lack of a secure integration of the identity of the user to the protection of the user's data and the control of the user's wallet. A critical part of the computer instructions for an action or a transaction are usually executed on the host domain machine (e.g., the user's wallet). Some examples of the user's wallet are a Mac Book Pro, a Dell desktop computer, an IPhone, a Blackberry or an Android phone. Currently cryptography keys are stored on the user's wallet or a chip executing the operating system, which is not secure. For example, when Bob's computer communicates with Mary's computer, even when using well-implemented Public Key Infrastructure (PKI), Bob's computer can only be sure that it is communicating with Mary's computer. Bob can not be sure that he is communicating with Mary and vice versa. Similarly, even Bob cannot be certain that the communications he sends Mary the same as the communications that Mary receives as coming from him.

Sending a secure communication using Public Key Infrastructure (PKI) from one user machine to another user machine ensures communication between the user machines, but may not ensure secure communication between the users of the machines. Continuing, with the above example, as a result of the use of a Public Key Infrastructure, although Mary may be reasonably sure that Mary's machine is communicating with Bob's machine, Boris may be operating one or more computers in Russia and may have remotely broken into Bob's computer and may be using Bob's machine and pretending to be Bob.

In the prior art, each computer cannot be assured of who controls the other computer. For example, even when a user is present, an intruder (e.g., a hacker) may be physically located thousands of miles away, but is remotely logged onto the user's machine and hijacking the user's intended action(s). Even the Trusted Platform Module (TPM) has the fundamental cyber security weakness of not knowing who controls the other computer with which a user may be in communication with or who controls the computer which contains the Trusted Platform Module. Not knowing the other computer with which a current computer is in communication with may be a weakness that is significant when the operating system can directly access the TPM. If the user's wallet is compromised, then the attacker can access the TPM. Another limitation and weakness of the TPM is that there is no mechanism for binding the identity of the user to the user's cryptography keys and other confidential information that should be bound to the user's true identity.

Another shortcoming of cyber security is that a secure link is missing between the authentication of a valid user, and the authorization of an action. The authorization of an action could be the execution of a financial transaction from a user's bitcoin account, a stock trade in a user's brokerage account, the execution of an important functionality on the electrical grid, or access to important data on a private network such as SIPRnet (e.g. WikiLeaks). The authorization of an action typically occurs through the web browser since the web browser presents a convenient interface for a person. However, the web browser is where the important connection between authentication of a user and authorization of an action may be broken. Existing systems have the user authenticating the user's wallet, and then the same user's wallet also authorizes (and may also execute) the action. Since the user's wallet can be hacked, the lack of a secure and direct link between authenticating the user's wallet and authorizing the action may render the act of user verification irrelevant.

Part of the vulnerability between authenticating the user and authorizing the user's action occurs, because authentication (e.g., biometric authentication) is typically and naively represented as an on/off switch. That is, after the user has been authenticated and the initial transaction approved, the remainder of the session is assumed to be secure and all actions after authentication are assumed to be legitimate, without performing any further checks. In the same way, if this on/off implementation occurs in an untrusted computing environment, then outstanding biometric algorithms and sensor(s) become irrelevant because the biometric authentication can be circumvented between the user authentication and the authorization or confidentiality part of the security system.

The use of biometrics can be advantageous for security, because biometrics offers a reliable method for verifying who (the person) is that is actually initiating a transaction. However, even with the use of biometrics, if the handling of the biometric information, the storage of the biometric data, or the control of actions based on a biometric verification is done on an unsecured user's wallet, the value of the biometrics may be greatly reduced or nullified.

An additional aspect of the weakness of current authentication and authorization processes (such as those using biometrics) is that the action can be hijacked by executing a Trojan attack on the user's wallet, for example. A Trojan attack is an attack in which the attacker pretends to be the user and/or the other system to which the user is communicating with. In other words, a valid, authorized user cannot verify that the action he or she is trying to execute is what is actually being executed, because a third party may be masquerading as the other system.

SOME ADVANTAGES OVER PRIOR ART

In light of the aforementioned RSA SecurID breach announced in March 2011, the embodiments, presented here, have the advantages of DECENTRALIZATION and NON-DETERMINISM, which substantially increases the quality of the security provided in a cybersecurity system across many applications and embodiments: securing financial transactions; securing critical infrastructure such as the electrical grid; securing private networks such as SIPRNet <http://en.wikipedia.org/wiki/SIPRNet>; securing physical objects and securing physical objects and infrastructure such as autos, trucks, farm machinery, cranes, ships, airplanes, jets, tanks, safes, houses, hotels, hospitals, office buildings, military bases, satellites, power plants, manufacturing plants, mines and stadiums that offer entertainment (football, soccer, etc.).

A.) DECENTRALIZATION. Generation of the registration code and passcode generators and keys and the use of all user credentials is decentralized in the embodiments presented here. The purpose of the decentralization is to force the hackers or adversary to compromise these cybersecurity system embodiments one device at a time. This is considerably more expensive, more difficult and far more time consuming for the adversary. This decentralization also helps protect the privacy of the person who owns the device. Furthermore, this decentralization also reduces the possibility of one hacker(s) breach, enabling the hacker(s) to have unauthorized access across the whole world using this security system or suite of products.

B.) NON-DETERMINISM. Non-determinism pertains to using a physical process to generate keys, passcode generators or registration codes. This means that these sequence of bits are not created by a computer algorithm, which are deterministic. Part of the RSA SecurID breach pertained to capturing seed information on their network, which means that there seeds were already determined. Passcode generators, keys and registration codes created from a non-deterministic physical process after enrollment means that before enrollment, these values are extremely difficult to predict. This provides a greater level of security and also helps in decentralizing the security since the passcode generators, keys and registration codes are derived from the particular non-deterministic physical process on that unique transaction device. The embodiments disclosed here are superior to the prior art such as RSA SecurID and other token vendors, because compromising these cybersecurity embodiments requires hackers breaking into one physical device (e.g. mobile phone, USB token, etc) at a time. At least some of the security advantage pertains to the fact that part of the secret stored on the physical token is distinct and mathematically intractable to derive from part of the secret stored on the backend server. Another part of the security advantage pertains to the fact that the asymmetric secrets are not generated until after enrollment or setup of the Biogy token device in the field. Further, the asymmetric secrets are generated from a non-deterministic physical process.

Hence, a breach of any Biogy <http://www.biogy.com> network or its documents that describe its algorithms or source code, does not reveal any information about how to predict the asymmetric secrets. Also, one key, called the user key, that is part of the asymmetric secret is stored on the physical token or in a secure area of the mobile device (e.g., a secure of a chip in a mobile phone). The other key, called the administrator key, that is part of the asymmetric secret is stored and administered on backend servers: a compromise of the backend server and any information of the administrator key on the backend server(s) doesn't reveal the user key on the token. In other words, the user key and the administrator key are distinct. Further, it is mathematically intractable to derive the user key when the adversary has the administrator key. Furthermore, it is mathematically intractable to derive the administrator key when the adversary has the user key.

BRIEF DESCRIPTION

In the following drawings like reference numbers are used to refer to like elements. Although the following figures depict various examples of the invention, the invention is not limited to the examples depicted in the figures.

FIG. 4 shows an example of a transaction device, which is an example of the system of FIG. 1A.

FIG. 5A shows a transaction device in a mobile phone, used to open an automobile.

DETAILED DESCRIPTION

A passcode generator is disclosed, which may implement a method for reducing the possibility of a thief stealing a password or other types of user information. Furthermore, the user does not have to remember her passcode as the generator creates one-time passcodes that may only be used once. In an embodiment, after a passcode is used once, it will no longer enable access to a system or account. In addition, optionally, the passcode generator can be a standalone portable device (e.g. USB token with battery or credit card with a smart card chip or a mobile phone) that makes it difficult for an attacker to gain access to. The portable embodiment enables users to generate one-time passcodes with asymmetric secrets in remote places such as inside an airplane, out on an oil tanker, in a satellite, and other places far removed from AC power sources.

Figure 5B:
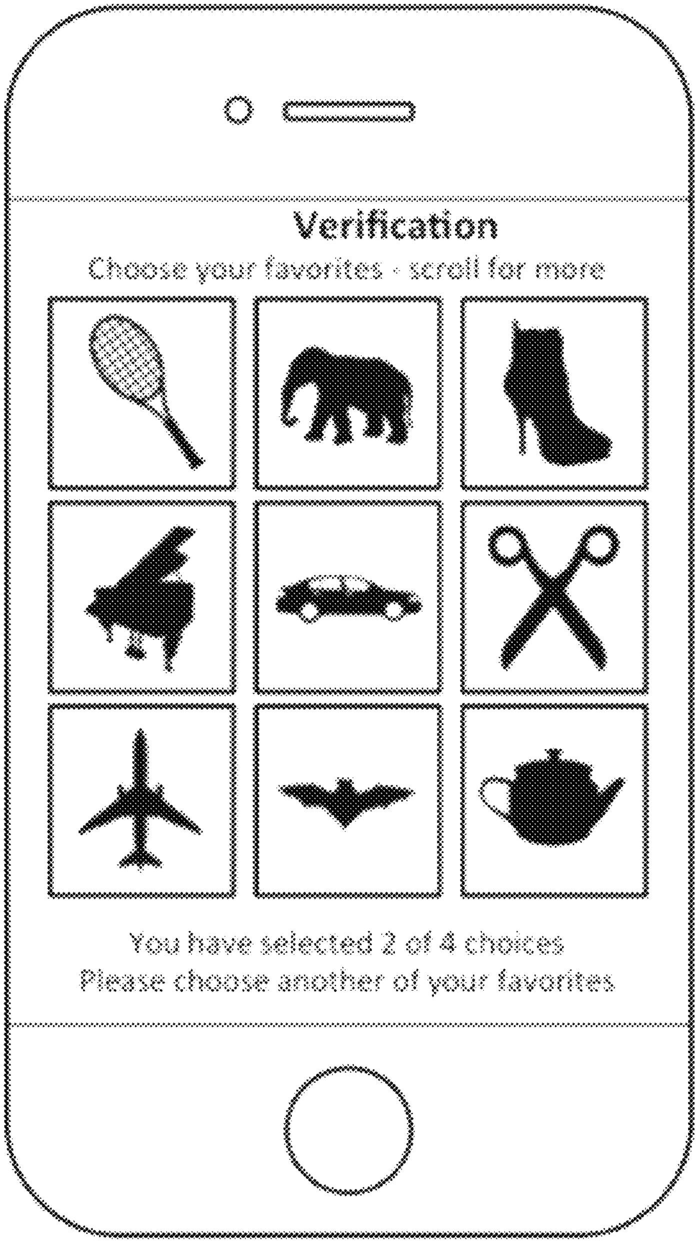
FIG. 5B shows an example of an authentication device in a smartphone embodiment where the selection of images are used to verify the user.
Figure 5C:
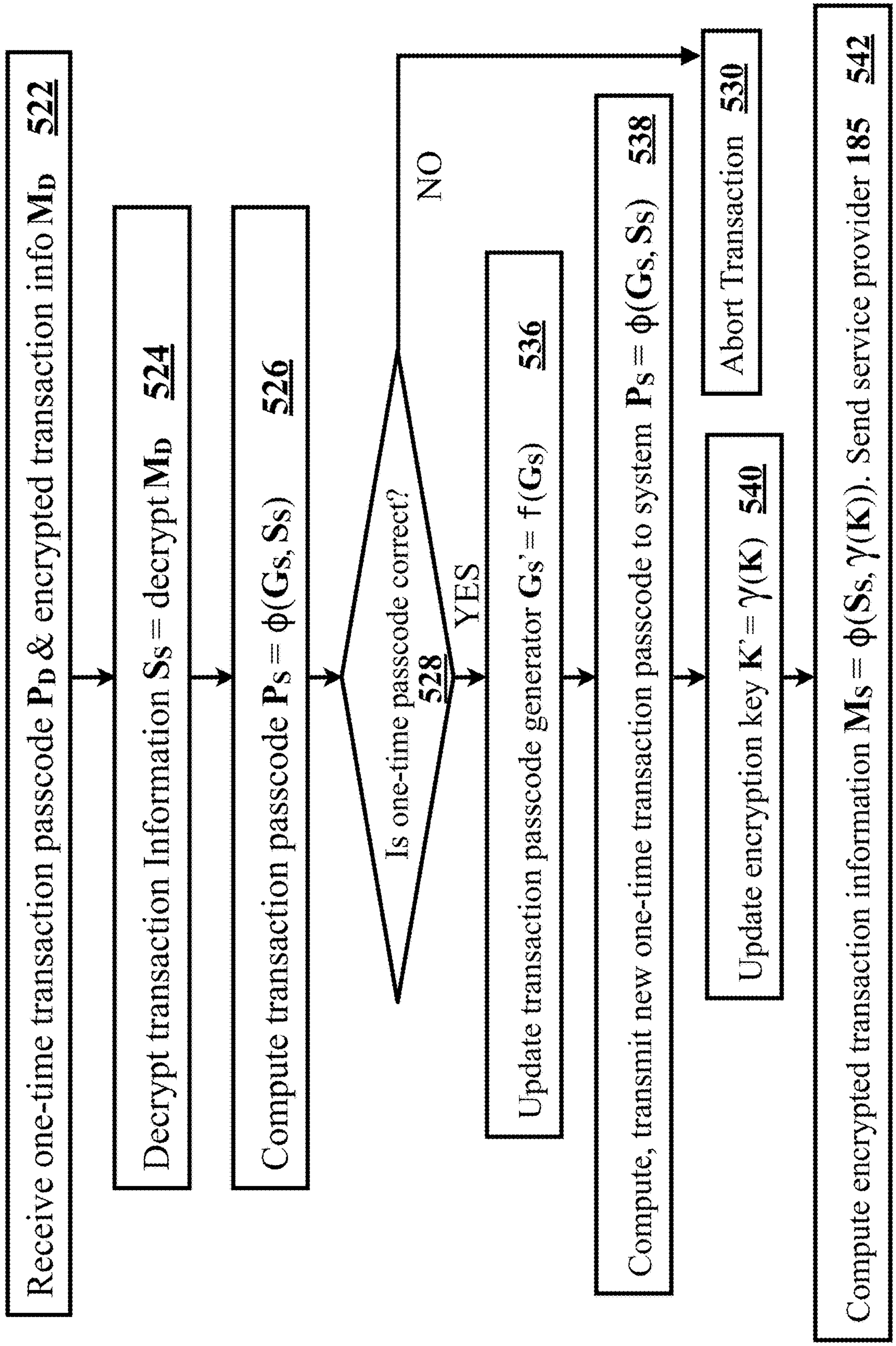
FIG. 5C shows a flow diagram of an embodiment of a service provider-side method of authenticating the user and requesting authentication.
Figure 6:
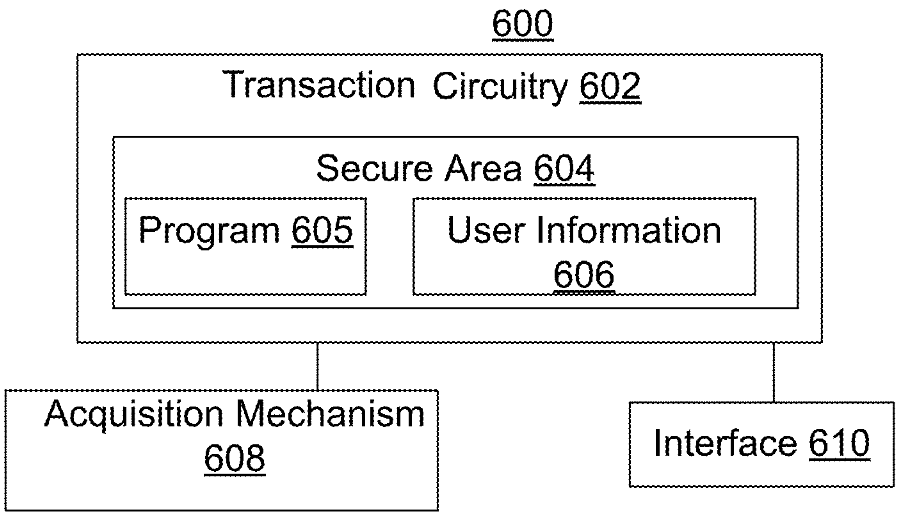
FIG. 6 shows a block diagram of a circuit of an example of a transaction device.

The system below is described using biometric prints or a PIN or a recognizable collection of images to authenticate the user as shown in FIG. 5B. Biometric prints may be fingerprints, face prints, iris scans, toe prints, voice prints, prints created from multiple fingers, handprints, footprints, or even DNA prints. In an embodiment, the item used to generate the passcodes is any item that is unique. In an embodiment the item used to generate the passcode is one that is difficult to fabricate, guess, find by trial and error, and/or compute. In an embodiment, the item used to generate the passcodes is uniquely associated with the user. In an embodiment, the item used to generate the passcodes has an unpredictable element to it.

An embodiment of the passcode generator uses a secure device that produces unique passcodes that can be used as one-time passwords. For each acquired biometric print, the derived passcodes created from it are unique. Another embodiment of the invention includes a secure area to execute biometric acquisition and storage of a registration code, public and private keys and a passcode generator created during enrollment.

In yet another embodiment of the invention, biometric prints are used to generate a registration code and cryptography keys within a secure area. The secure area is one that uses embedded software. The use of biometric prints to create passcodes within a secure area or the use of biometric prints instead of passcodes within a secure area eliminates the use of passwords or PINS to memorize and store in an insecure system. In some embodiments, a PIN and a biometric print may be required. In other embodiments, only one part of the user information may be required. In one embodiment, one or more visual images—as shown in FIG. 4B—may be selected instead of requesting a PIN or a biometric.

In another embodiment, a quantum device is used to generate physical randomness (non-determinism) that can be used to help create unpredictable asymmetric keys, registration code and passcode generator. In some embodiments, photons are used to generate physical randomness. In other embodiments, zener noise is used to generate physical randomness (non-determinism) that can be used to help create unpredictable asymmetric keys, registration code and passcode generator. In some embodiments, the zener noise is caused by an avalanche breakdown.

Figure 13:
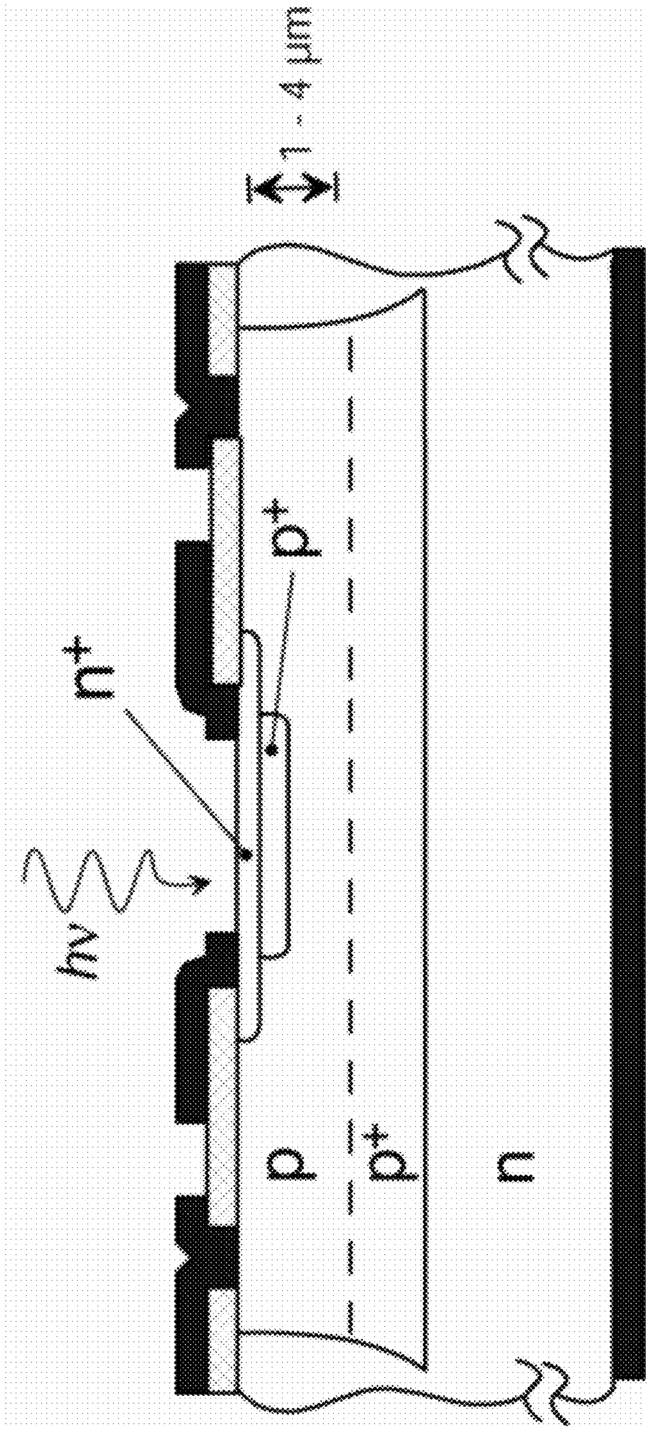
FIG. 13 shows a semiconductor device that is a photodetector. This hardware device can detect the arrival of single photons, which can be used to generate random numbers.

FIG. 13 shows a semiconductor device that is a single photon avalanche diode (SPAD). It is a solid-state photodetector based on a reverse biased p-n junction. This photodetector can detect low intensity signals of light down to a single photon. In one embodiment, an LED (light emitting diode) or OLED may be placed next to a SPAD. A SPAD is generally sensitive to photons that have a wavelength of 10 to 100 micrometers. The arrival of photons may be measured as a function of their arrival time within time intervals $[t_k, t_{k+1}]$ to generate a sequence of random bits $b=b_1 b_2 \ldots b_n$.

VOCABULARY

The user refers to a computer or possibly another electronic device, or a person that requests access to resources or to perform particular event (e.g., a person executing financial transaction, a chip actuating the brakes in an automobile, and so on.) In some embodiments, the user may be called "Alice" or a "first party".

Figure 2A:
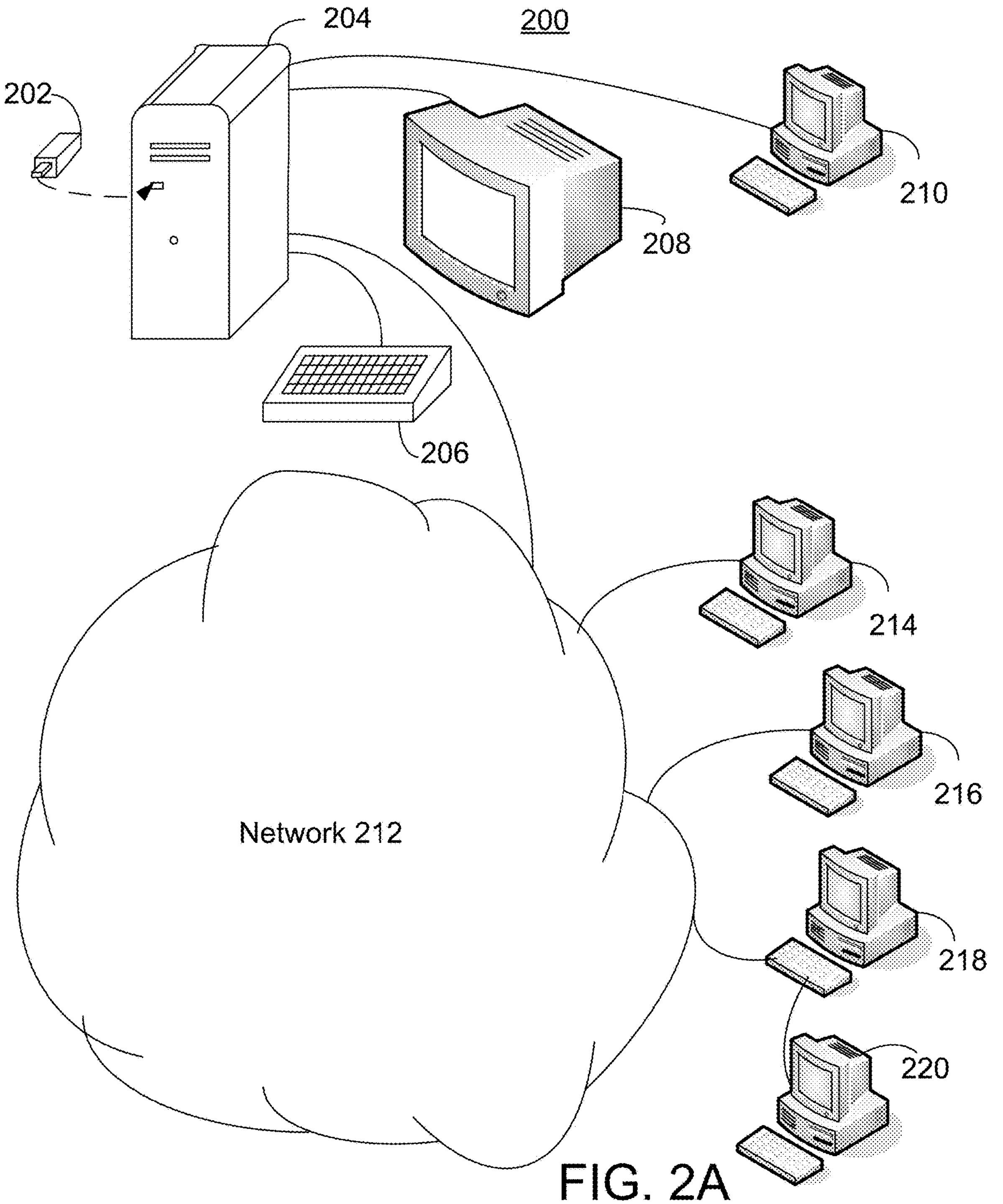
FIG. 2A shows a block diagram of an example of the system of FIG. 1A.

The word administrator refers to a computer or possibly another electronic device, or person that grants a particular user access to its resources or enables a particular event (e.g., a financial transaction, or landing a plane at an airport, and so on). In some contexts, the administrator functionality is performed by one or more backend servers. FIG. 2A shows embodiments, where computers 214, 216, 218 and 220 are backend servers along with network 212 that collectively act as the administrator. In some embodiments, the administrator may be called "Bob" or a "second party".

The registration code, denoted as R, is a sequence of symbols or may be a sequence of bits. An example of a registration code with 16 symbols is 1Ae58GnZbk3T4pcQ and a registration code with punctuation and other symbols may also be used. An example with 32 symbols is 1!56hs#KUD3_4xP*7:y2iW=K;r.+4vN? There is at least one unique registration code for each passcode generator. In an embodiment, the registration code may be a sequence of 2048 bits. The registration code is created during setup and securely given to the administrator.

Figure 10:
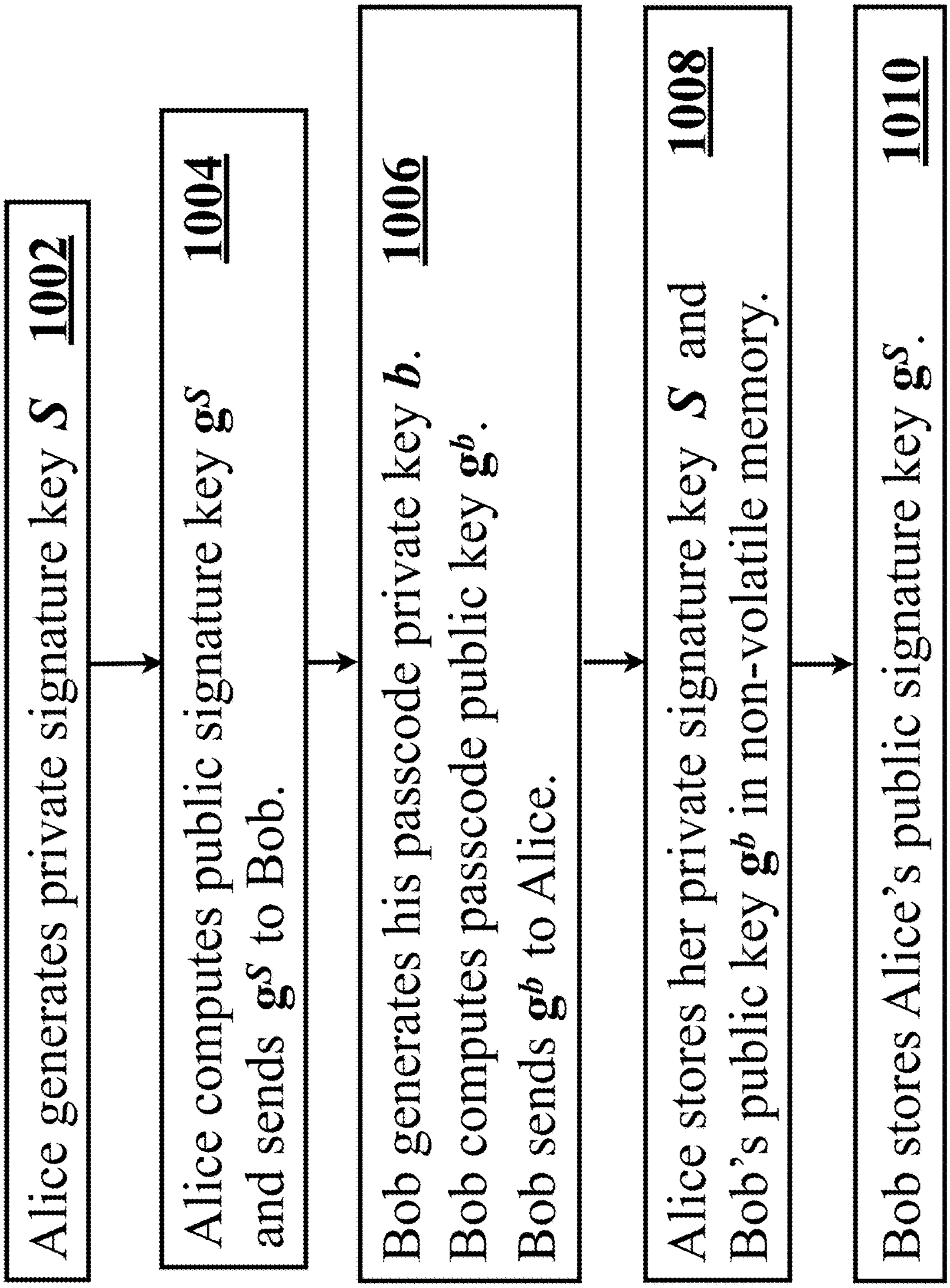
FIG. 10 shows a flowchart of an example of a method for enrolling a device or computer chip named Alice with an administrator (named Bob or called a second party) so that asymmetric secrets are used and Alice's transaction signature is dependent on a nonce or time.

The passcode, denoted as P, is a sequence of symbols. An example of an alphanumeric passcode with 8 symbols is 4zc8vNXA and an example with 16 symbols including punctuation and other symbols is &xL#WBq61!j$uS_m. In an embodiment, an passcode is composed only of digits: 34902 45157. In an embodiment, each time a user submits a valid biometric print to the passcode generator, a new one-time passcode is created. In some embodiments, the administrator (Bob) checks that the passcode is derived from one of the registration codes in the database. In some embodiments, the administrator (Bob) verifies Alice's one-time code based on Alice's public signature key which is established during her enrollment. Alice's enrollment with a public signature key is shown in FIG. 10. In other embodiments, a new passcode is generated less frequently than every time Alice submits a valid fingerprint. For example, a new passcode may be generated every other time or on a random schedule that the user is unaware of.

In some embodiments, Alice is a computer chip or a hardware device: that is, Alice is NOT a person and Alice is the name of the computer chip or the hardware device that will be generating one-time codes for the purpose of secure authentication. In some embodiments, no fingerprint authentication, or PIN or visual image authentication is required by Alice for a one-time code to be generated by Alice.

Figure 1A:
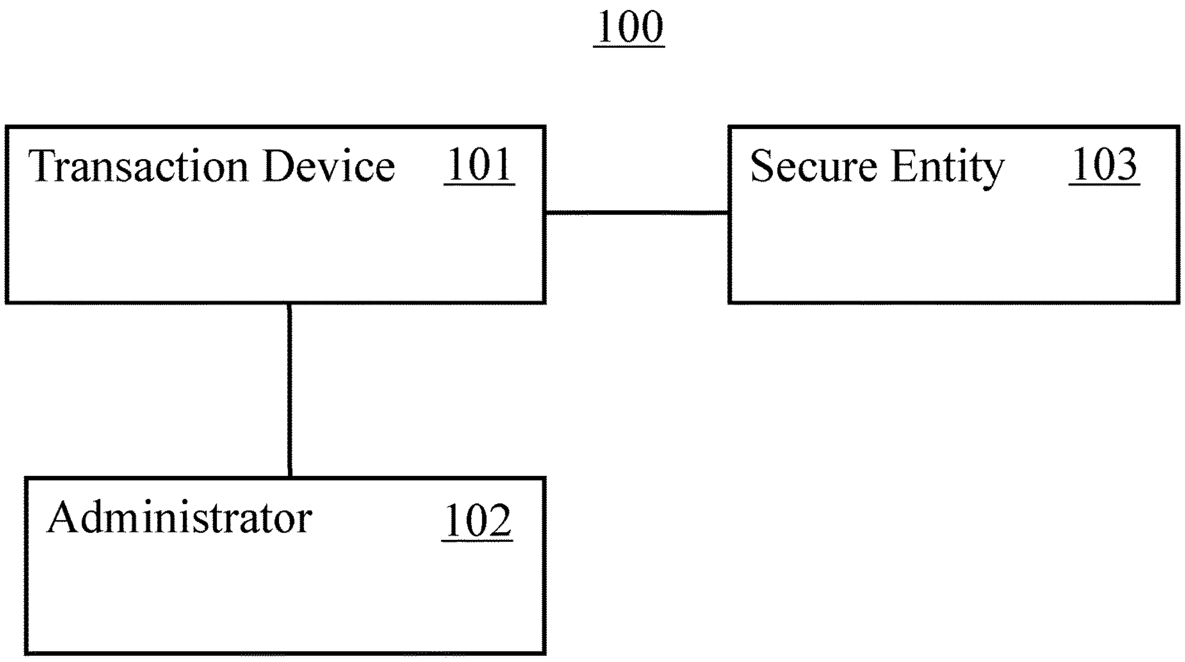
FIG. 1A shows a block diagram of an example of a system for maintaining a secure entity.

The passcode generator, denoted as G, is stored in the user's (Alice's) secure memory in transaction device 101, shown in FIG. 1A and helps the device to generate a one-time passcode. G is also stored securely by administrator (Bob) 102 so that the administrator can verify a passcode that the user submits. FIG. 3D shows an embodiment that contains transaction device 101. FIG. 4 shows an embodiment that contains transaction device 101.

The key pair (administrator key, user key)=$(L_A, K_A)$ pertains to user A. The user key $K_A$ is stored in a secure area of the user A's transaction device 101. The administrator key LA is sent to the administrator during enrollment (also called registration) and is called the administrator key for user A. When there are 5,000 users that access resources for a particular system, then there are 5,000 distinct administrator keys $K_1, K_2, \ldots, K_{5000}$ stored by the backend server(s). In this embodiment, there are 5,000 corresponding $L_1$, $L_2$, . . . , $L_{5000}$ user keys stored in 5,000 different transaction devices 101.

A hash function,, denoted Φ, is a function that accepts as its input argument an arbitrarily long string of bits (or bytes) and produces a fixed-size output. In other words, a hash function maps a variable length message m to a fixed-sized output, Φ(m). Typical output sizes range from 128 to 512 bits, but can also be larger. An ideal hash function is a function Φ whose output is uniformly distributed in the following way: Suppose the output size of Φ is n bits. If the message m is chosen randomly, then for each of the $2^n$ possible outputs z, the probability that Φ(m)=z is $2^{-n}$. In an embodiment, the hash functions that are used are one-way. A one-way function Φ has the property that given an output value z, it is computationally extremely difficult to find a message $m_z$ such that $\Phi(m_z)=z$. In other words, a one-way function Φ is a function that can be easily computed, but that its inverse $\Phi^{-1}$ is extremely difficult to compute. Other types of one way functions may be used in place of a hash function.

HASH FUNCTIONS

Any of a number of hash functions may be used. One possible hash function is SHA-512, designed by the National Security Agency and standardized by the NIST. The output (digest) size of SHA-512 is 512 bits. Other alternative hash functions are of the type that conform with the standard SHA-256, which produces output values of 256 bits, and SHA-384, which produces output values of 384 bits. A hash function could be SHA-3, called Keccak <http://en.wikipedia.org/wiki/Keccak>, or one of the other candidate hash functions.

One of the other candidate one-way hash functions is BLAKE <http://en.wikipedia.org/wiki/BLAKE_(hash_function)>. Another example of a hash function is GrØstl <http://en.wikipedia.org/wiki/Grøstl>. Another hash function is JH <http://en.wikipedia.org/wiki/JH_(hash_function)>. Another hash function is Skein <http://en.wikipedia.org/wiki/Skein_(hash_function)>.

HASHING INFORMATION

There are different methods that may be used for hashing biometric prints, random noise from a physical process, randomness from a quantum random system and other kinds of input. As an alternative to biometric data, the input to a hashing function can even be another code. Different types of methods of hashing are appropriate for different sizes of codes, and different types of random, biometric or combination of this information that is passed to the hash function. One method is to take two different biometric prints and apply the hash function SHA-512 to each print. For ease of explanation, denote the hash function SHA-512 as $\Phi_1$. Each application of $\Phi_1$ to a fingerprint produces an output value of 512 bits. With two biometric prints, these bits are concatenated together to create a 1024-bit code, called C. In some embodiments, random information created by a quantum device may not be applied to hash function. In other embodiments, the biometric information may be hashed and then combined with random information provided by a quantum device. Another method is to use two different sections S and T of a single acquired biometric print, and produce a 1024-bit code, C, by concatenating $\Phi_1(S)$ and $\Phi_1(T)$. An enhancement of this method can be used to create codes larger than 1024-bits. Divide one acquired fingerprint into n sections: $S_1$, $S_2$, . . . , $S_n$. Then concatenate the bits $\Phi_1(S_1)$, $\Phi_1(S_2)$, . . . , $\Phi_1(S_n)$. This creates a code C that is 512n bits in length. For example, if the acquired fingerprint is divided into 10 sections, then this method would create a code with 5,120 bits. We remark that with other hash functions that similar concatenation methods can be used to create codes or keys that use larger amounts of bits.

DIFFIE-HELLMAN-MERKLE KEY EXCHANGE

A Diffie-Hellman-Merkle key exchange is a key exchange method where two parties (Alice and Bob) that have no prior knowledge of each other jointly establish a shared secret key over an unsecure or public communications channel. Before the Diffie-Hellman-Merkle key exchange is described it is helpful to review the mathematical notion of a group. A group G is a set with a binary operation * such that the following four properties hold:

(i.) The binary operation * is closed on G. In other words, a*b lies in G for all elements a and b in G.

(ii.) The binary operation · is associative on G. a*(b*c)=(a*b)*c for all elements a, b, and c in G (iii.) There is a unique identity element e in G. a*e=e*a=a.

(iv). Each element a in G has a unique inverse denoted as $a^{-1}$. $a*a^{-1}=a^{-1}*a=e$.

In this specification, g*g is denoted as $g^2$ and g*g*g*g*g is $g^5$. The integers { . . . , −2, −1, 0, 1, 2, . . . } with respect to the binary operation + are an example of an infinite group. 0 is the identity element. For example, the inverse of 5 is −5 and the inverse of −107 is 107.

The set of permutations on n elements {1, 2, . . . , n}, denoted as $S_n$, is an example of a finite group with n! elements where the binary operation is function composition. Each element of $S_n$ is a function p:{1, 2, . . . , n}→{1, 2, . . . , n} that is 1 to 1 and onto. In this context, p is called a permutation The identity permutation e is the identity element in $S_n$, where e(k)=k for each k in {1, 2, . . . , n}.

If H is a non-empty subset of a group G and H is a group with respect to the binary group operation * of G, then H is called a subgroup of G. H is a proper subgroup of G if H is not equal to G (i.e., H is a proper subset of G). G is a cyclic group if G has no proper subgroups.

The integers modulo n (i.e., $Z_{n=\{[}0]$, [1], . . . [n−1]} are an example of a finite group with respect to addition modulo n. If n=5, [4]+[4]=[3] in $Z_5$ because 5 divides (4+4)−3. Similarly, [3]+[4]=[2] in $Z_5$. Observe that $Z_5$ is a cyclic group because 5 is a prime number. When p is a prime number, $Z_p$ is a cyclic group containing p elements {[0], [1], . . . [p−1]}. [1] is called a generating element for cyclic group $Z_p$ since $[1]^m=[m]$ where m is a natural number such that 0<m<p and $[1]^p=[0]$. This multiplicative notation works as follows: $[1]^2=[1]+[1]$; $[1]^3=[1]+[1]+[1]$; and so on. This multiplicative notation (i.e. using superscripts) is used in the description of the Diffie-Hellman-Merkle key exchange protocol described below.

There are an infinite number of groups and an infinite number of these groups are extremely large. The notion of extremely large means the following: if $2^{1024}$ is considered to be an extremely large number based on the computing power of current computers, then there are still an infinite number of finite groups with each group containing more than $2^{1024}$ elements. At some point in the future, extremely large may be $2^{50,000}$. For more information on group theory, refer to the book: Joseph J. Rotman. The Theory of Groups: An Introduction. Allyn and Bacon, Inc., 1965.

Steps 1, 2, 3, 4, and 5 describe the Diffie-Hellman-Merkle key exchange.

1. Alice and Bob agree on an extremely large, finite, group G and a generating element g in G that has an extremely large order. (Alice and Bob sometimes agree on finite group G and element g long before the rest of the key exchange protocol; g is assumed to be known by all attackers.) The group G is written multiplicatively as explained previously.
2. Alice picks a random natural number a and sends $g^a$ to Bob.
3. Bob picks a random natural number b and sends $g^b$ to Alice.
4. Alice computes $(g^b)^a$.
5. Bob computes $(g^a)^b$.

Both Alice and Bob are now in possession of the group element $g^{ab}$, which can serve as the shared secret key. The values of $(g^b)^a$ and $(g^a)^b$ are the same because g is an element of group G. In some embodiments, the Diffie-Hellman key exchange may be used to securely create a common registration code for the user and the administrator. In some embodiments, the Diffie-Hellman exchange is implemented with an elliptic curve $y^2=x^3+ax+b$ over a finite field and g is a base point on the elliptic curve. In these embodiments, a is Alice's private key, where a is a large positive integer and Alice uses the elliptic curve group operation to compute her public key $g^a$; b is Bob's private key, where b is a large positive integer and Bob uses the elliptic curve group operation to compute his public key $g^b$. In an embodiment, Alice's private key a and Bob's private key b are expressed in bits and each has size 32 bytes; in another embodiment, Alice's private key a and Bob's private key b each has size of 64 bytes.

In embodiments, the elliptic curve used for Diffie-Hellman-Merkle key exchange is a Montgomery elliptic curve. Let K be the field over which the elliptic curve is defined. A Montgomery curve is of the form $By^2=x^3+Ax^2+x$, for some field elements A, B where $B(A^2-4)\neq 0$. For the Diffie-Hellman-Merkle exchange, K is a finite field . For more information on Montogomery curves, refer to the publication: Peter Montgomery. "Speeding the Pollard and Elliptic Curve Methods of Factorization". *Mathematics of Computation* 48 (177): 243-264, 1987

For more information on elliptic curves, refer to the book: Neal Koblitz. Introduction to Elliptic Curves and Modular Forms. Springer, 1984 or to the book: Serge Lang. Elliptic Curves: Diophantine Analysis. Springer, 1978. For more information on finite fields, refer to the book: Nathan Jacobson. Basic Algebra I. W.H. Freeman and Company, 1985. In some embodiments, Alice can encrypt a message m (expressed as an element of the group), as $mg^{ab}$, and sends $mg^{ab}$ to Bob. Bob knows |G|, b, and $g^a$. A result from group theory implies that the order of every element of a group divides the number of elements in the group, denoted as |G|. This means $x^{|G|}=1$ for all x in G where 1 is the identity element in G. Bob calculates $(g^a)^{|G|-b}=(g^{|G|})^a g^{-ab}=(g^{ab})^{-1}$. After Bob receives the encrypted message $mg^{ab}$ from Alice, then Bob applies $(g^{ab})^{-1}$ and decrypts the encrypted message by computing $mg^{ab}(g^{ab})^{-1}=m$.

ASYMMETRIC KEY CRYPTOGRAPHY

This section describes other embodiments of asymmetric key cryptography and defines some notation used to represent this type of cryptography. The symbol ψ is used to represent the resulting of executing asymmetric key cryptography algorithm. In what follows, the notation ψ(m, k) is used to represent the result of encrypting message m with key k. In an embodiment, ψ implements RSA public key cryptography, which is a type of asymmetric key cryptography.

In an embodiment, ψ implements elliptic curve cryptography which is an asymmetric cryptography method. In an embodiment, it is assumed that E is an elliptic curve over finite field $\mathbb{F}_p$ where p is a prime number and H is a cyclic subgroup of $E(\mathbb{F}_p)$ generated by the point P that lies in $E(\mathbb{F}_p)$. Alice wants to send a message to Bob whose public key is (E, P, aP) and whose private key is the natural number $a<p-1$. Alice executes the following Encryption Stage:

1. Chose a random natural number $b<p-1$.
2. Consider the plaintext message embedded as points m on E.
3. Compute $\beta=bP$ and $\gamma=m+b(aP)$.
4. Send the ciphertext Enc(E, m)=c=(β, γ) to Bob.

Decryption Stage:

After Bob receives the ciphertext c=(β, γ), the plaintext m is recovered using the private key as $Dec(E, c)=m=\gamma-\alpha\beta$.

The following is a simple example described here for illustrative purposes, not security purposes. Consider the elliptic curve E given by $y^2=x^3+4x+4$ over $\mathbb{F}_{13}$. It can be shown that $E(\mathbb{F}_{13})$ has 15 elements which is necessarily cyclic. Also, P=(1, 3) is a generator of E. Assuming that Bob's public key is (E, P, 4P) where a=4 is the private key and m=(10, 2) is the message that Alice wants to send to Bob, then Alice performs the following. Alice chooses b=7 at random. Then Alice calculates $$Enc(E,m)=Enc(E,(10,2))=(bP,m+b(aP))=(7P,(10,2)+7(4P))=((0,2),(10,2)+7(6,6))=((0,2),(10,2)+(12,5))=((0,2),(3,2))=(\beta,\gamma)=c.$$

Then Alice sends ciphertext c=(β, γ)=((0, 2), (3, 2)) to Bob who uses his private key to decrypt the ciphertext and recover message m=(10, 2) as follows:

$$Dec(E,c)=(3,2)-4(0,2)=(3,2)-(12,5)=(3,2)+(12,8)=(10,2).$$

SOME Transaction DeviceS

Figure 3A:
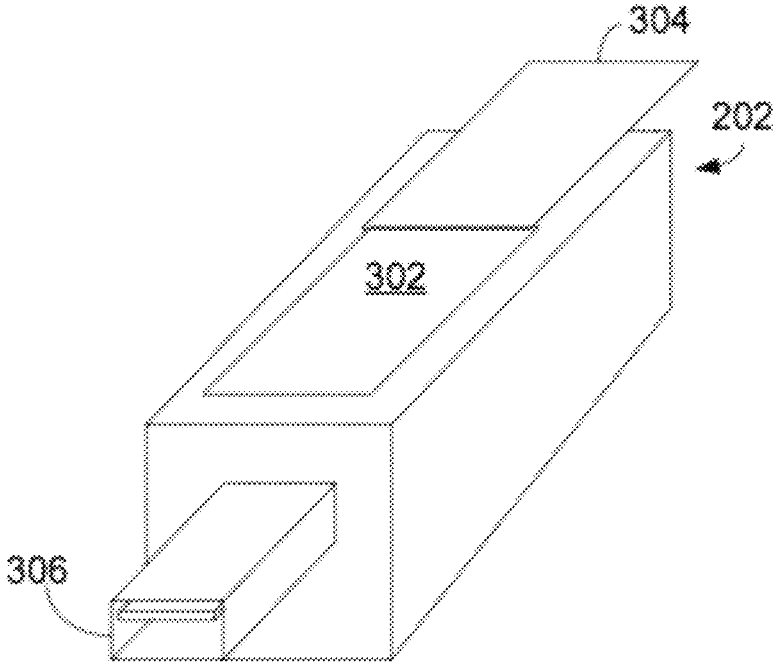
FIG. 3A shows an example of a transaction device.

In an embodiment, the passcodes are generated from a device 202 in FIG. 3A that is able to acquire biometric prints from sensor 302, store biometric print templates or images, and authenticate a newly acquired biometric print. In an embodiment, the passcode is transmitted to the bank or administrator for authentication via USB plug 306. In an alternative embodiment, the passcode is transmitted wirelessly. And in an alternative embodiment, the passcode is read from a display on the device and typed into a computer or keypad terminal.

In another embodiment, the device acquires a PIN or password or another type of information that the user knows as an alternative to biometric authentication as shown in FIG.s 3B, 3C and 3D. The biometric, PIN or a sequence of images that the user knows or has possession of is called user information. During biometric enrollment, one or more biometric prints are acquired, and one or more unique registration codes and cryptography keys are generated from the one or more of the biometric prints. During authentication, if the acquired biometric print is an acceptable match, then one or more unique passcodes are generated.

The software that this device executes may be embedded. In an embodiment there is no operating system on this device. In an alternative embodiment there is an operating system. The secure biometric print device has a number of components, which we describe in the next paragraph. The security of the secure area may be enhanced by any one of, any combination or of, or all of (1) the use of embedded software, (2) the lack of an operating system, and (3) the secure area being at least part of a self-contained device not connected to a computer or the internet. For example, the unit that includes the secure area may contain its own processor. In an embodiment, the secure area may not have any of these security enhancing features.

The device may contain a biometric print sensor that enables the device to scan biometric prints. The sensor may include a press sensor or a sweep sensor, for example. The device may contain a processor chip that executes all the software instructions such as acquiring a biometric print from the sensor, matching an acquired biometric print against a stored biometric print, sending communication and control commands to a display, and/or encrypting the registration code and transmitting it to the administrator when the user and administrator are not in the same physical location. By including a processor in the device the security is enhanced, because the external processor is given fewer chances to inspect contents of the device. Alternatively, the device may only store software instructions that are run by an external processor, and the external processor performs the biometric print acquisition, the encryption, and/or generation of the passcode. Alternatively, a specialized logic circuit is built that carries out the functions that the software causes the processors to perform.

Figure 3B:
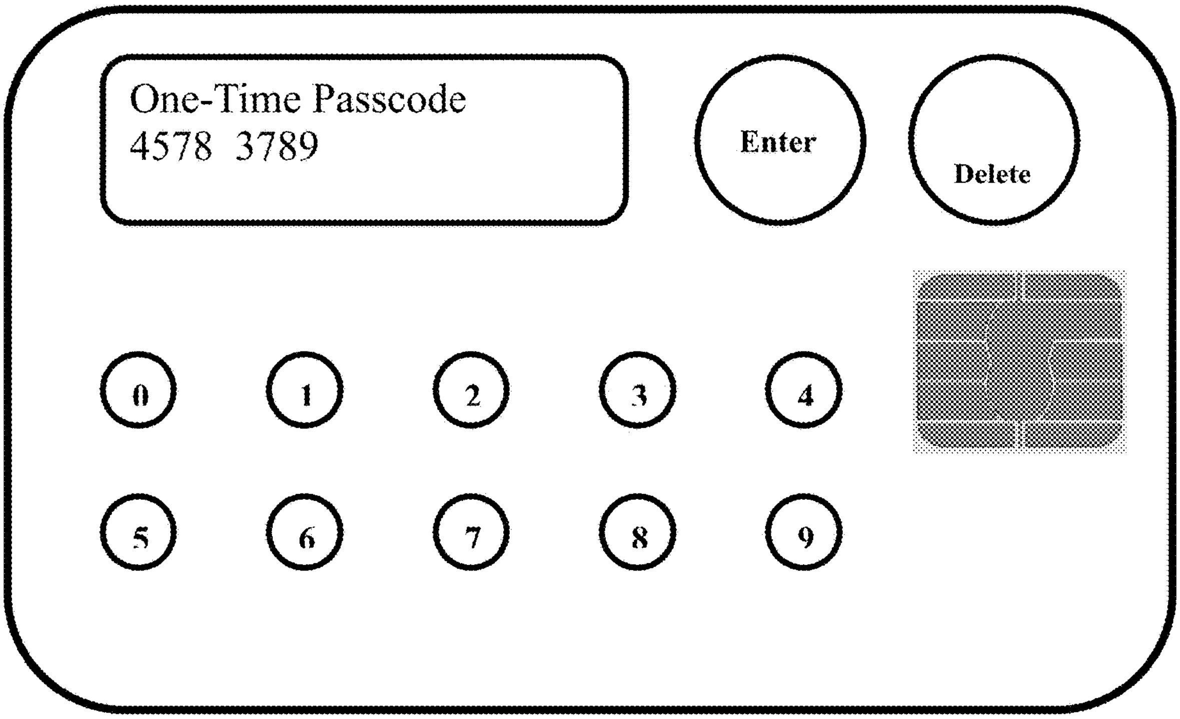
FIG. 3B shows an example of a transaction device in a smartcard embodiment.
Figure 3C:
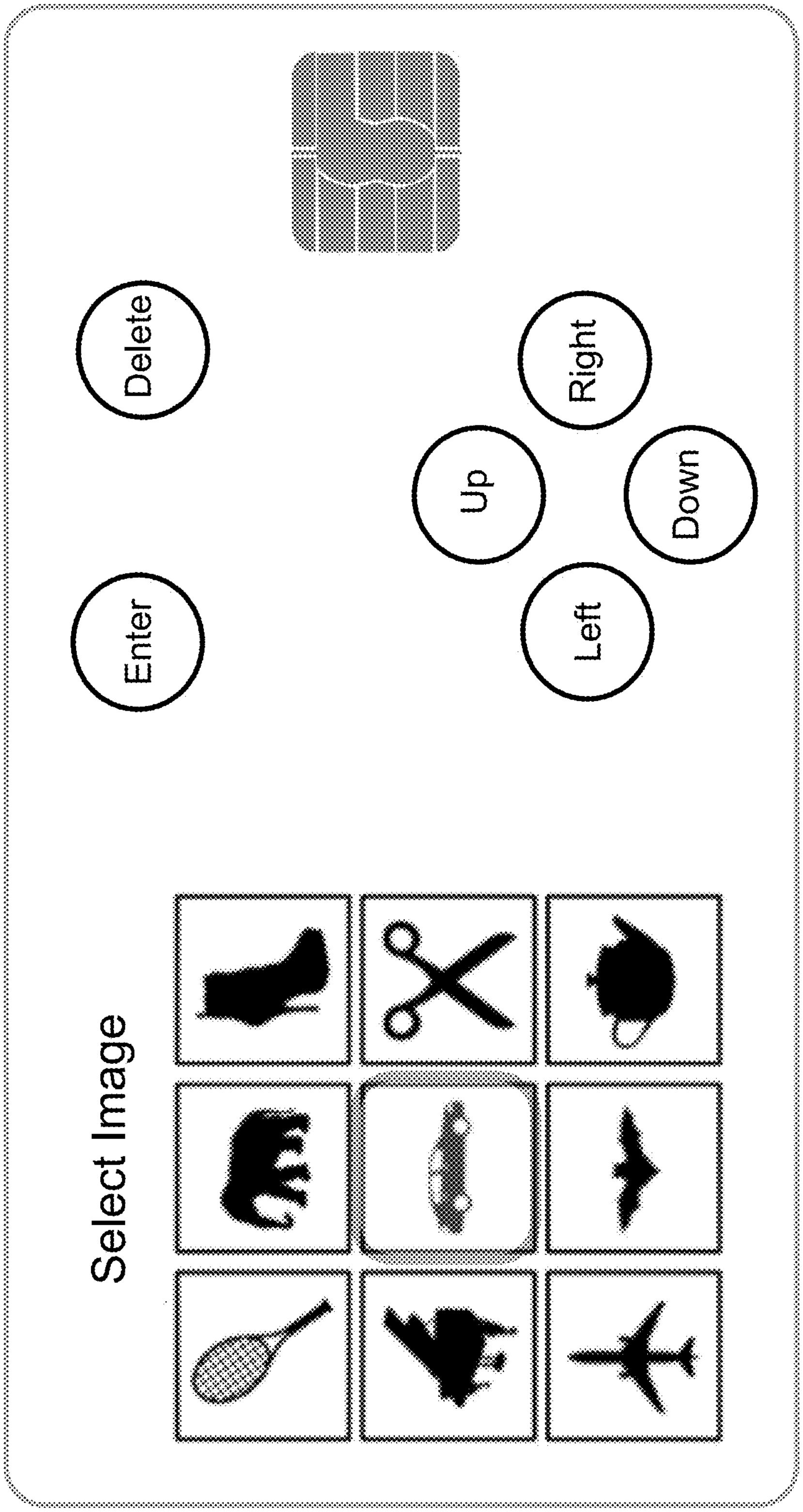
FIG. 3C shows an example of a device in an embodiment where the selection of images are used to authenticate a blockchain transaction.
Figure 3D:
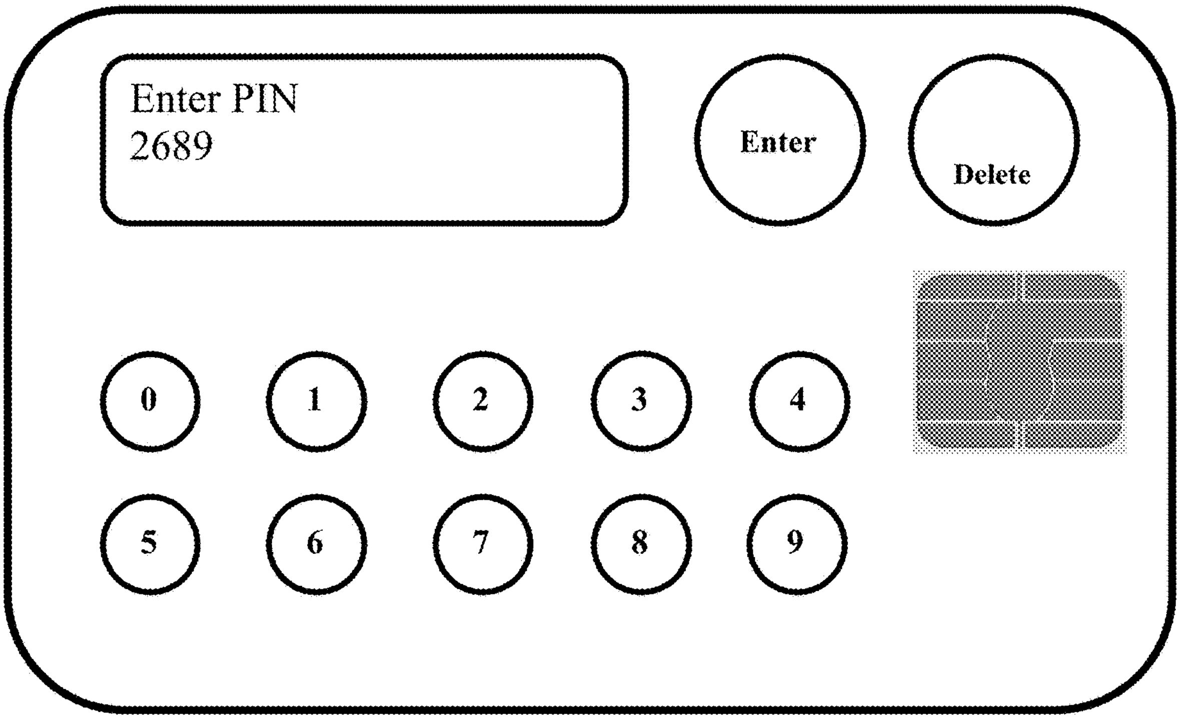
FIG. 3D shows an example of a transaction device in a smartcard embodiment where the entry of a PIN identifies the user before the next passcode is generated.

In another embodiment, FIG. 3C shows a credit card requesting visual images to be selected as a method for identifying a valid user. In this embodiment, the user information are visual images that the user knows. For example, their favorite animal may be an elephant so they select an elephant. In an alternative embodiment, the device shown in FIG. 3B is a credit card containing a smart card chip that has ten buttons for entering digits, labeled 0, 1, 2, 3, 4, 5, 6, 7, 8, 9. The credit card has a screen on it to display the one-time passcode and request a PIN. To enter the PIN 2689, the user presses the button labeled 2 first. Then the user presses button 6. Then the user presses button 8. Finally, the user presses button 9. And then the user presses the enter button. FIG. 3D shows a credit card requesting a PIN using the display screen on the card. This credit card contains a smart card chip. Entering the PIN directly into the device helps address phishing attacks.

In some embodiments, there also may be a delete button so that the user may delete an incorrect number entered during PIN entry. In some embodiments, the credit card may not have a biometric sensor. In other embodiments, the credit card may also have a biometric sensor and may also request a biometric authentication. In some embodiments, the numbered buttons and enter and delete button may be on a USB token. The device also may contain memory, some of which may be non-volatile. The use of non-volatile memory enables the device to permanently store code generation information, such as biometric print information, executable code, registration codes, and/or the passcode generator. In some embodiments, the memory is on the processor chip. In some embodiments, the processor chip is a smart card chip. Although not necessary, in some embodiments, the sensor and processor could be integrated into a single chip. Alternatively, the sensor and the processor may be two separate chips.

In some embodiments, the physical token is located and operates inside of a mobile phone as shown in FIG. 4B and FIG. 5A. In some embodiments a sequence of images is selected, as shown in FIG. 4B (instead of using a PIN or biometric), to authenticate the human user on the mobile phone or personal computer and then an asymmetric one-time code is generated and sent to the backend for authentication. As an example, a user may select the image of the car—as highlighted and shown in FIG. 3C—as a part of identifying the user and thus providing user information. In embodiments using a mobile phone or other mobile device such as IPad, the one-time code may be sent wirelessly via TCP/IP or via a cellular network.

By executing the biometric algorithms and visual image selection algorithms and cryptography software on a secure embedded device, the biometric prints, visual images, cryptography keys and passcode generator are less susceptible to theft; biometric information or visual image information or PIN information is not transmitted to the insecure device, nor is there any need to have encrypted templates of the biometric prints transmitted to an insecure device. Each of the above embodiments may be used separately from one another in combination with any of the other embodiments. All of these embodiments may be used together.

FIG. 1A is a block diagram of an example of a system 100. System 100 includes a transaction device 101, an administrator 102, and a secure entity 103. In other embodiments system 100 may not have all of the components listed above or may have other components instead of and/or in addition to those listed above.

System 100 is an example of a system in which the security of a secure entity is kept by requiring a user to submit a passcode (e.g., a password) in order to gain access to the secure entity. The term "user" refers to someone that has access to transaction device 101. The user may use transaction device 101 to gain access to a secure entity. Any sequence of bits (which may represent any string of symbols) may be used as a passcode. In some cases, the passcode may be directly transmitted without human intervention to the administrator, so the sequence of bits may not have a visual display in standard formats such as ASCII, Unicode, and so on. For example, the first sequence of 8 bits in the passcode could in ASCII represent the end of file character, which currently does not have a visual representation. In other embodiments where the passcode is displayed as a sequence of symbols on a graphical display, then the symbols may be chosen from any subset of or combination of alphanumeric, punctuation, picture symbols, math, upper case, and/or lower case symbols, for example. The choice of alphanumeric symbols may include characters from a multiplicity of languages. An example of an alphanumeric passcode with 8 symbols 4R1pa5Wx. An example of a possible passcode with 8 symbols is ♀3ב♫Эگğ☺ . An example with 16 symbols including punctuation and other symbols is &x#WДЯ q61!j$uS_m.

Transaction device 101 may be used for generating passcodes and/or for setting up a new user in system 100. Setting up a new user may include "registering" the new users. Registering a new user refers to the process of adding a new user so that the new user is able to use a system, such as transaction device 101 or system 100. Transaction device 101 may have multiple other uses.

In an embodiment, transaction device 101 generates a new passcode each time a user wants to gain access to the secure entity. In an embodiment, after the passcode is used, the passcode is discarded and is not stored. In an embodiment, after a passcode is used once, the passcode will no longer enable access to the secure entity. In an embodiment, transaction device 101 also acquires and/or stores information about a user that is used for identifying the user. When the user wants to access the secure entity, the user enters at least some identifying information (e.g., a valid fingerprint)

into transaction device 101. If transaction device 101 is able to match the identifying information with identifying information stored in transaction device 101, then transaction device 101 generates a passcode, which may be used for gaining entry to a secure entity (e.g., a newly acquired fingerprint may be matched with information derived from earlier acquired fingerprints). The identifying information may be stored in transaction device 101 in association with a user ID. Thus, in this embodiment, each time a user submits identifying information to the transaction device 101, a new one-time passcode is created. An embodiment of the transaction device 101 uses a secure device (as transaction device 101) that produces unique passcodes from the identifying information, and the unique passcodes can be used as one-time passcodes. In an embodiment, for each acquired set of identifying information, the derived passcodes created are unique. In an embodiment in which the passcode may only be used once, the user does not have to remember her passcode. For example, transaction device 101 may generate a new passcode every time a user submits a valid fingerprint. In an embodiment in which a new passcode is generated for each request for access, stealing the passcode is of, at best, limited use, because after the passcode has been used, the passcode is no longer valid.

In other embodiments, transaction device 101 generates a new passcode less frequently than every time a user submits valid identifying information. For example, a new passcode may be generated every other time or on a random schedule, which the user may be unaware of. In an alternative embodiment, the passcode may be used multiple times prior to being discarded. In an alternative embodiment, the passcode is stored for a brief period of time, which may extend beyond the passcodes initial use. The discarding of the passcode may depend upon the number of uses and/or a length of period of time after the passcode was generated.

In an alternative embodiment, the frequency of repeated passcodes issued to different users is low enough such that it is unlikely that one of two users that have been issued the same passcode will try to access secure entities that only the other of the two is entitled to access. In an embodiment, the frequency of passcodes issued to the same user being repeated is low enough that it is unlikely that the interception of an old passcode will be useful to a hacker. Since the passcode is not stored beyond an expiration time, the passcode itself cannot be stolen accept during the brief period between the time the passcode is generated and the passcode expires. In an embodiment in which the passcode is valid for only one use, the passcode does not need to be stored at all and can only be stolen during the brief period between when the passcode is generated and used. In an embodiment, each time the user enters user information (e.g., a fingerprint) the current passcode is displayed or transmitted (whether or not the current passcode is a one-time passcode), and consequently, the user does not need to remember the passcode. In an embodiment, a timestamp may be associated with a one-time passcode or other passcode. If the current time is later than the associated timestamp, when the passcode is submitted to an "administrator," then the passcode has expired, is invalid, and access would be denied. The word administrator is used to refer to an entity that grants or denies access to the secure entity.

There are many types of identifying information that may be stored by transaction device 101, such as fingerprints, a name, a birthday, a favorite number, a social security number, and/or a driver's license, a profile, an image of a face, an image of an animal, an image of a car, an iris scan, a toe print, a handprint, and/or a footprint. In an embodiment, the item used to generate the passcodes is any item that is unique. In this specification, using a first item (e.g., a fingerprint) to "generate" a second item (e.g., a passcode) may refer to using the first item to "directly" generate the second item or to "indirectly" generate the second item by, for example, first generating one or more intermediary items from which the second item is ultimately generated. The intermediary items may include a chain of multiple intermediary items that each generated one from another. In an embodiment the item used to generate the passcode is one that is difficult to fabricate, guess, find by trial and error, and/or compute. In an embodiment, the item used to generate the passcodes is uniquely associated with the user. In an embodiment, the item used to generate the passcodes has an unpredictable element to it (e.g., the unpredictable manner in which the patterns of lines in fingerprints differ between fingerprints).

During an enrollment process (also called registration) identifying information about a new user may be stored in transaction device 101. In an embodiment transaction device 101 includes a secure area for acquiring identifying information, storing the identifying information, and/or information related to, or derived from, the identifying information. In addition, optionally, the transaction device 101 can be a standalone and/or portable device. It is more difficult for an attacker to gain access to transaction device 101 if transaction device 101 is a standalone device, because there are less opportunities for another device to inspect or otherwise access the contents of transaction device 101 compared to if transaction device 101 is not a standalone device. Additionally, in an embodiment in which transaction device 101 is a standalone device, it is more difficult for an unauthorized entity to steal the identifying information associated with the user than were transaction device 101 not a standalone device.

Administrator 102 receives the requests for access to a secure entity from transaction device 101, and decides how to handle the request. For example, administrator 102 may receive a passcode from transaction device 101 and may cause the passcode to be authenticated. In an embodiment, administrator 102 may check, or cause other entities to check, whether a passcode is derived from one of the registration codes and/or passcode generators stored in the database.

Similar to the passcode, any sequence of bits or sequence of symbols may be used as a registration code. In some cases, the registration code may be directly transmitted without human intervention to the administrator, so the sequence of bits may not have a visual display in standard formats such as ASCII, Unicode, and so on. For example, the first sequence of 8 bits in the registration code could in ASCII represent the end of file character, which currently does not have a visual representation. In other embodiments where the registration code is displayed as a sequence of symbols on a graphical display, then the symbols may be chosen from any subset of or combination of alphanumeric, punctuation, picture symbols, math, upper case, and/or lower case symbols, for example. The symbols that the user may choose from may be any subset of or combination of alphanumeric, punctuation, math, upper case, and/or lower case symbols, for example. The choice of alphanumeric symbols may include characters from a multiplicity of languages. An example of a registration code with 16 symbols is 1Ae58GnZbk3T4pcQ and a registration code with punctuation and other symbols may also be used. An example with 32 symbols is 1!56hs#K♀3_4xP*7:y2iW=K; r.+4vN? There may be at least one unique registration code for each user and/or transaction device 101. The same criterion and/or restrictions for both passcodes and registrations codes for determining what sequences of characters are valid.

Administrator 102 may be a human being, software, a computer, an electro-mechanical lock, or other machine that grants a particular user access to its resources and/or enables a particular event (e.g., a financial transaction, or landing a plane at an airport, and so on). Administrator 102 has the capability (e.g., authority) to grant or deny the user, associated with transaction device 101, access to the secure entity. If the passcode is found to be authentic, then administrator 102 grants the user, associated with transaction device 101, access to the secure entity. In an embodiment, the passcode is accepted by administrator 102 only once. In an embodiment, after accepting the passcode, administrator 102 expects a different passcode for the next request.

Several different embodiments are discussed above in conjunction with transaction device 101 that relate to different criterion and/or durations of time for when a passcode is valid. Administrator 102 has a corresponding way of behaving in terms of whether a given passcode is accepted depending on the embodiment. For example, in an embodiment in which the passcode is valid for only a specified number of uses (which may be a relatively small number of uses) instead of being valid for only one use, administrator 102 accepts the passcode as valid for only the specified number of times. In an alternative embodiment, the passcodes validity may be dependent on time period (which may be relatively short) instead of, or in addition to, being valid for only one or a specified number of uses. As another example, in an embodiment in which the passcode is associated with a timestamp, administrator 102 may deny access for a passcode submitted with an expired timestamp.

In an embodiment, to authenticate a passcode instead of comparing the passcode to a previously received passcode, administrator 102 generates the passcode independently from transaction device 101. Consequently, in this embodiment, instead of storing the actual passcode, administrator 102 stores a method of generating the passcode that is expected to result in the same passcode generated by transaction device 101. In an embodiment, administrator 102 stores and/or uses the same method of generating passcodes that transaction device 101 uses.

In an embodiment in which transaction device 101 and administrator 102 use the same method for generating a passcode, the registration process may involve associating a particular method of generating passcodes with a user and/or transaction device 101. The registration process may involve synchronizing the methods used by transaction device 101 and by administrator 102 so that at a particular attempt to gain access, administrator 102 and transaction device 101 generate the same passcode. The registration process may involve associating a particular registration code (which may also be referred to as a seed) with a particular user and/or transaction device 101. Administrator 102 may be part of the secure entity, a separate entity, and/or may be located in location that is remote from the secure entity.

Secure entity 103 is the secure entity that the user (which is associated with transaction device 101) desires to access. Secure entity 103 is the entity to which administrator 102 has the capability to determine whether the user is entitled to access. Some examples of secure entities are locks, doors, cars, houses, websites, bank accounts, ATMs, medical records, authorization to perform a financial transaction, or some other type of event that requires security.

The lines connecting transaction device 101, administrator 102, and secure entity 103 represent paths of communication. These lines may represent physical communication lines, wireless communications, sonar communications, verbal communications, and/or other communications. The dashed part of the line connecting transaction device 101 with secure entity 103 indicates the capability of administrator 102 to prevent or allow access to secure entity 103.

Although in FIG. 1A only one transaction device 101, administrator 102, and secure entity 103 are illustrated, there may be a multitude of transaction devices 101 that can access secure entity 103 and each transaction device 101 may be able to access multiple secure entities 103. Similarly, there may be several administrators 102 that are capable of granting access to a particular secure entity 103, and each administrator may be capable of granting access to several secure entities 103. Further, a particular transaction device 101 may have a choice of several administrators 102 via which to gain access to a particular secure entity 103.

Figure 1B:
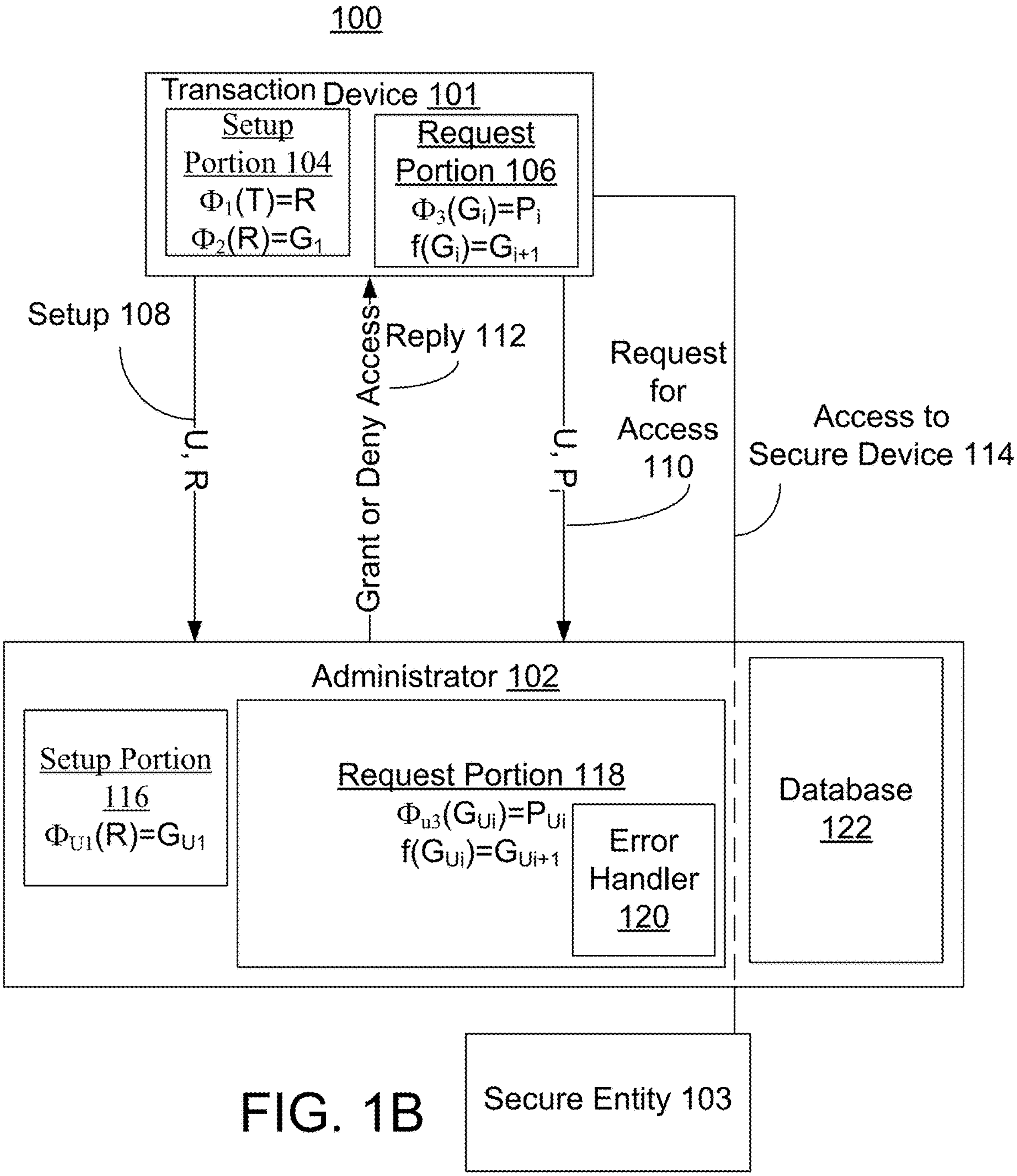
FIG. 1B shows a block diagram of an example of the system in FIG. 1A.

FIG. 1B shows one of many possible embodiments of system 100. In the embodiment of FIG. 1B, transaction device 101 includes setup portion 104 and request portion 106. In the embodiment of FIG. 1B, system 100 includes setup 108, request for access 110, reply 112, access to secure device 114, and administrator 102. Administrator 102 may include setup portion 116 and request portion 118. Request portion 118 may include error handler 120. In other embodiments system 100 may not have all of the components listed above or may have other components instead of and/or in addition to those listed above.

In FIG. 1B, each passcode, denoted as $P_i$, is a sequence of bits or a sequence of symbols. Although this specification uses a specific notation, the invention is in no way limited by this notation. Software implementing the methods of this specification may use a notation that is unrelated to the notation used in this specification. Setup portion 104 may be used for registering a new user, configuring transaction device 101, and/or for setting up transaction device 101. Setup portion 104 acquires identification information, T. In an embodiment, setup portion 104 may generate a registration code, which may be denoted as R, for the sake of registering the user with another entity.

In an embodiment, a method, $\Phi_1$, may be used for generating registration code R from the identification information. The method $\Phi_1$ (which may be referred to as a generating method) may be a "one-way" method such as a one-way algorithm, a one-way function, and/or another one-way method. For example, the registration code may generated according to the equation $\Phi_1(T)=R$. A one-way method, herein denoted $\Phi_1$ (possibly having one or more indices representing different functions associated with different users or applications), has the property that given an output value z, it is computationally extremely difficult to find the input $m_z$ such that $\Phi_1(m_z)=z$. In other words, a one-way method is a method $\Phi_1$ that can be easily computed, but whose inverse $\Phi_1^{-1}$ is extremely difficult (e.g., impossible) to compute. One way to quantify the difficulty to compute $\Phi_1$ given an output z, is to use the number of computations that are expected to be required to compute and/or guess $\Phi_1$. For one type of method, it is expected to take between $O(2^{n/2})$ and $O(2^n)$ computational steps to find or guess $m_z$, (depending on the how clever the one performing the computations is) where n is the number of bits in the output z. By using a one-way method for computing the registration code, even if the registration code is intercepted or otherwise stolen, it is unlikely that the registration code can be used to discover identifying information T.

One set of methods that may be used are one-way functions in which finding the inverse involves an operation that is mathematically indeterminate, impossible, intractable, or computationally impractical or difficult. For example, one method is to use a collection of step functions each of whose domain and range is [0, 1, 2, . . . 255] and apply a distinct step function to a part of T. The information from T could be used to determine which step functions to select from the collection. If 16 step functions are chosen from the collection, then this would create an output of 128 bits. If n step functions are chosen from the collection, then this would create an output of 8n bits. An alternative to this would be to construct 32 matrices resulting from the step functions and compute the determinant modulo 256 for each of the 32 matrices. This creates a one-way function whose output is 256 bits. As another example, method $\Phi_1$ could involve first represent user information T by a string of digits. Then, each digit of the string of digits could be multiplied by a corresponding digit from another string of digits, where at least one digit of the other string has a value of zero. The inverse of this method would involve at least one division by zero for each multiplication by a digit with the value of zero, which has no inverse, and consequently this method would be also be one-way. Similarly, functions for which finding their inverses involves computing a non-convergent series or non-convergent integral are other examples of classes of functions that may be used as one-way functions.

Another class of one-way functions involves computations that cause a loss of information or a discarding of selected pieces of information. Since some of the input information is lost in computing this class of one-way functions, the original input information (e.g., identifying information T) is difficult and may be impossible to recover. For example, a one-way function may be constructed by first performing a randomizing operation such as discarding random bits of information from the input, adding random bits of information to the input, and/or performing another randomizing operation to the input, and then another function may be applied to the information retained. Similarly, the same randomizing operations may be performed on the output of the function.

In an embodiment, a one-way hash function is used as method $\Phi_1$. A hash function is one that accepts as its input argument an arbitrarily long string of bits (or bytes) and produces a fixed-size output. In other words, a hash function maps a variable length input m to a fixed-sized output, $\Phi_1(m)$. Typical output sizes range from 128 to 512 bits, but can also be larger. An ideal hash function is a function $\Phi_1$ whose output is uniformly distributed in the following way. For example, suppose the output size of $\Phi_1$ is n bits. If the input m is chosen randomly, then for each of the $2^n$ possible outputs z, the probability that $\Phi_1(m)=z$ is $2^{-n}$. This is a definition of an ideal hash function.

A real hash function with output size n bits should have the property that probability of each of its $2^n$ possible outputs can be compared against the ideal probability of $2^{-n}$. The chi-square function on n−1 degrees of freedom is a useful way to measure the quality of a real hash function. One uses a chi-square on n−1 degrees because there are n bits of output. And then one can compute a confidence level that the real hash function is close to an ideal hash function. Some typical confidence levels could be 90%, 95%, 99%, 99.5% and 99.999% depending on the level of security desired. In an embodiment, the hash functions that are used are one-way. Other types of one-way functions or methods may be used in place of a hash function. In an embodiment, the hash functions that are used are one-way. Other types of one-way functions or methods may be used in place of a hash function.

Setup portion 104 uses registration code R and a method $\Phi_2$, which may be a one-way function, to generate an initial passcode generator $G_1$. Initial passcode generator $G_1$ may be used for generating an initial passcode. A passcode generator, also known as a seed, can be a string of characters or other form of a code similar to registration code R or a passcode. Passcode generators may be stored securely by administrator 102 for use in verifying a passcode that is submitted by transaction device 101. The initial passcode generator $G_1$ may be generated according to the equation $\Phi_2(R)=G_1$. Method $\Phi_2$ (which also may be referred to as a generating method) may be the same as, or different from, method $\Phi_1$.

In some embodiments, setup portion 104 may also use random information T generated from the semiconductor shown in FIG. 13 to create registration code $R=\Phi(T)$. Setup portion 104 also uses asymmetric cryptography method [illegible] and user key $K_A$ where the subscript A indicates user A. Using passcode generators, such as $G_1$, enables the identification of a person without having access to the user's identifying data, such as the user's biometric data (e.g., fingerprints) or social security number or other identifying data. For example, some citizens and organizations are concerned about the government and other institutions storing a person's biometric data. Using a passcode generator, such as $G_1$, an institution can identify a person with a unique registration or passcode, which is derived from his or her fingerprint, other biometric data, and/or other authentication data.

Request portion 106 requests access to a secure device. In an embodiment, request portion 106 generates a passcode, which may be used for requesting access to a secure entity. For example, request portion may use a method, $\Phi_3$, and a generator, $G_i$, for generating a passcode $P_i$. Method $\Phi_3$ may be a one-way method such as a one way function, similar to method $\Phi_2$. Method $\Phi_3$ (which may be referred to as a generating method) may be the same as or different from methods $\Phi_1$ and/or $\Phi_2$. For example, request portion 106 may compute a passcode using the equation, $\Phi_3(G_i)=P_i$. The index i is used to indicate the ith passcode $P_i$, which in an embodiment is generated by the ith request for a passcode. In an embodiment, each passcode, $P_i$, is generated by using a different generator $G_i$. In an embodiment, each new generator, $G_{i+1}$, may be generated from a prior generator, $G_i$, using a method f, according to the equation, $f(G_i)=G_{i+1}$, for example.

In some embodiments, request portion 106 may use a nonce or rounded time $\tau$ to compute the next passcode as $\Phi_3(G_i, \tau)=P_i$. Setup 108, request for access 110, reply 112, and access to secure device 114 are different forms of communications in which transaction device 101 participates. Setup 108, request for access 110, and reply 112 are embodiments of the communications represented by the lines connecting transaction device 101, administrator 102, and secure entity 103 in FIG. 1B. In an embodiment, transaction device 101 may send registration code R to another entity, when sending setup 108. In an embodiment, transaction device 101 sends a user ID U with the registration code R to another entity or elsewhere as part of setup 108. Alternatively, transaction device 101 receives the user ID U from the other entity or from elsewhere. Request access 110 is a request for access to secure device 103.

Request 110 may include sending encrypted passcode ϯ ($P_i$, $K_A$), for example. In an embodiment, user ID U is also sent as part of request 110.

In an another embodiment, Alice's request may send to secure device 103 Reply 112 is a reply to request 110. Reply 112 may include a grant or a denial of request 110 for access to secure entity 103. In an embodiment, administrator 102 receives registration codes R from transaction device 101 as part of setup 108, and receives requests for access to a secure device from transaction device 101, as part of request 110. In an embodiment, administrator 102 may also grant or deny access to a user associated with transaction device 101, as part of reply 112. Access to secure device 114 are communications between transaction device 101 and secure entity 103. Access to secure entity 114 can be blocked from occurring or allowed to occur by administrator 102. Administrator 102 includes setup portion 116, which uses registration code R received from transaction device 101, to generate the initial passcode generator $G_1$. In alternative embodiments, setup portion 116 may be located outside of administrator 102. Since administrator 102 may service several transaction devices 101 and/or several users, user ID U may be used to associate a registration code R, the generators $G_i$, and the passcodes generated with a transaction device 101 and/or a user U, which may be written as $R_U$ and $G_{Ui}$, respectively. In this notation, the index U distinguishes the registration code $R_U$ and generator $G_{Ui}$ of user U from the registration code and generators of other users. Registration code $R_U$ denotes registration code R after having been associated with user U at the administrator's side.

Since administrator 102 may need to authenticate the passcode submitted by transaction device 101, administrator 102 may need to generate the same set of passcodes as transaction device 101 in order to perform the authentication. Administrator 102 may generate the passcodes generated by transaction device 101 by using the same methods (e.g., one-way functions such as one-way hash functions or random number generators) and generators as used by transaction device 101. Consequently, administrator 102 uses method $\Phi_{U2}$ to generate an initial passcode generator $G_{Ui}$. Method $\Phi_{U2}$ may be the same for all U as long as the registration codes $R_U$ are different for each of the U's. In an embodiment, methods $\Phi_{U2}$ are in general different for each U. If methods $\Phi_{U2}$ are different, then the $R_U$'s do not need to necessarily be different so long as the resulting passcodes for different users are in general different. The passcodes of different users can be different if methods $\Phi_{U3}$ or passcode generators $G_{Ui}$ are different for different users, while the $G_{Ui}$'s will be different for different users if methods $\Phi_{U2}$ and/or $R_U$ are different.

Similar to transaction device 101, administrator 102 may generate the initial passcode generator $G_{U1}$ according to the equation $\Phi_{U2}(R_U)=G_{U1}$. In an embodiment, for a given authorized user U, $\Phi_{U2}$, $R_U$, and $G_{U1}$ are the same as $\Phi_2$, R, and $G_1$. Administrator 102 also includes request portion 118. In alternative embodiments, request portion may be located outside of administrator 102. For example, request portion 118 may be stored and executed on a system having a database that stores information being accessed. Request portion 118 receives, via request 110, encrypted passcode ϯ ($P_i$, $K_A$) and user ID U from request portion 106 of transaction device 101. Database 122 may be part of administrator 102, as illustrated in FIG. 1B, or may be located elsewhere. Database 122 may store current passcode generators and/or other user information such as the administrator key $L_A$ for user A. In an embodiment, based on user ID U, request portion 118 receives a passcode generator and administrator key $L_A$ from database 122, and then decrypts ϯ ($P_i$, $K_A$) using cryptography method ϯ and key $L_A$ and then also generates a passcode that is compared with the decrypted passcode ϯ (ϯ ($P_i$, $K_A$), $L_A$)=$P_i$ received from the transaction device. The passcode $\Pi_i$ generated is expected to be the same (after decryption is performed by the administrator using administrator key $L_A$ and cryptography method ϯ ) as the decrypted passcode $P_i$ that user U sent encrypted as ϯ ($P_i$, $K_A$) with the current request if user U is an authorized user.

For example, request portion 118 may use method $\Phi_{U3}$ and a passcode generator, $G_{Ui}$, for generating a passcode $P_{Ui}$. Method $\Phi_{U3}$ may be the same as or different from method $\Phi_{U2}$. For example, request portion computes a passcode using the equation, $\Phi_{U3}(G_{Ui})=P_{Ui}$. Each passcode, $P_{Ui}$, is generated by using a different passcode generator $G_{Ui}$. Each new passcode generator, $G_{Ui+1}$, may be generated from a prior passcode generator, $G_{Ui}$, using method $f_U$, according to the equation, $f_U(G_{Ui})=G_{Ui+1}$, for example. Request portion 118 compares passcode $P_{Ui}$ to passcode $P_i$, and if passcode $P_{Ui}$ and passcode $P_i$ are the same, authorization to access to secure entity 103 is granted from request portion 118 of administrator 102, via reply 112, to the user associated with transaction device 101.

Methods $\Phi_{U3}$ and $f_U$ may be the same for all U as long as the passcode generators $G_{Ui}$ and $G_{Ui+1}$ are different. In an embodiment, methods $\Phi_{U3}$ and $f_U$ are in general different for different U. In an embodiment, for a given authorized user U, $\Phi_{U3}$, $f_U$, $G_{Ui}$, and $G_{Ui+i}$ are the same as $\Phi_3$, f, $G_i$, and $G_{i+1}$, respectively, except that $\Phi_{U3}$, $G_{Ui}$, and $G_{Ui+1}$ are generated in association with administrator 102 and $\Phi_3$, f, $G_i$, and $G_{i+1}$ are generated at transaction device 101. Setup portion 116 and request portion 118 may be separate portions of code, such as objects, subroutines, functions, and/or methods. Setup portion 116 and request portion 118 may not be separate portions of code, but may be lines of code intermingled with one another and/or other parts of administrator 102.

Figure 1C:
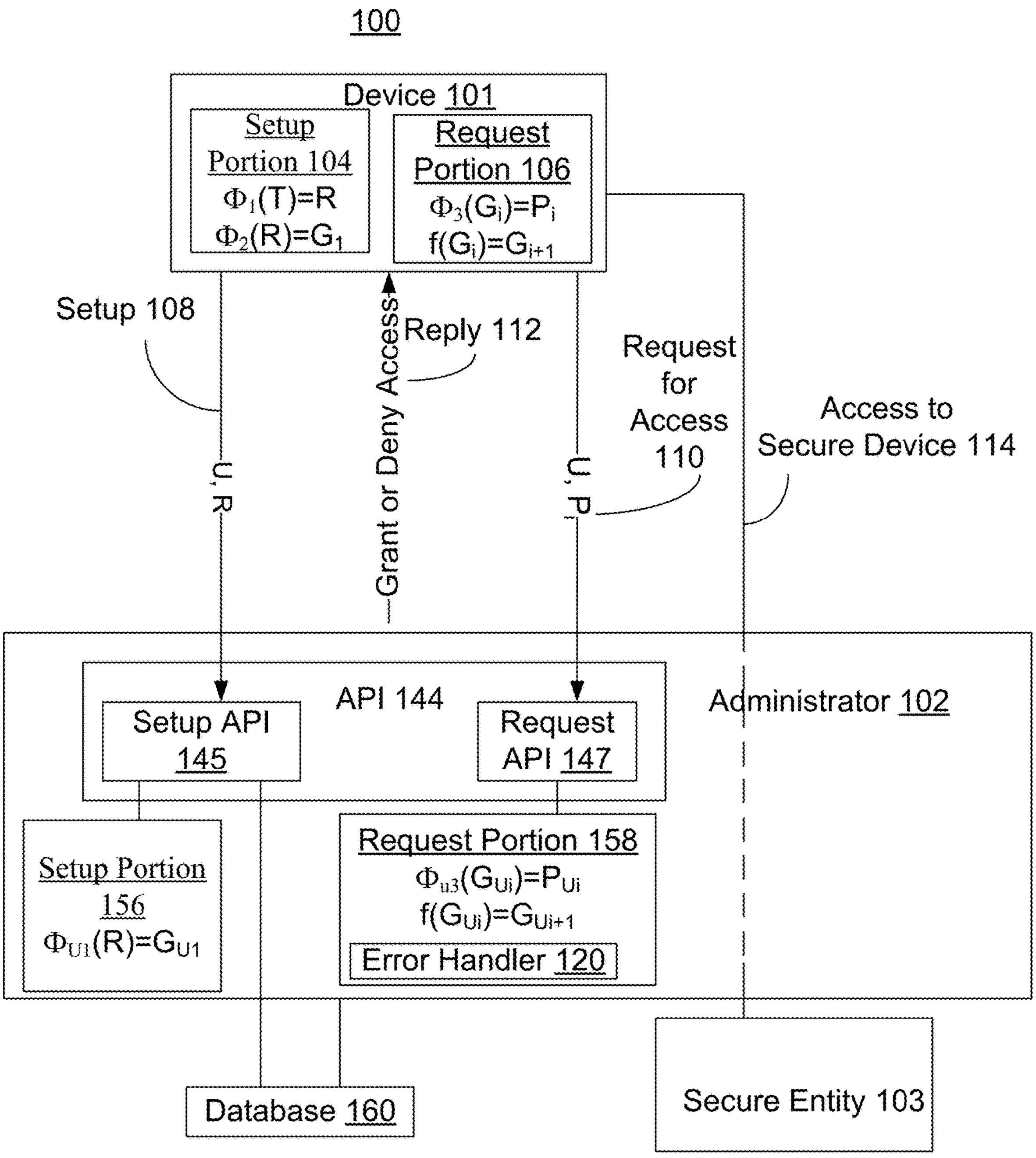
FIG. 1C shows a block diagram of an example of the system in FIG. 1A.

FIG. 1C shows one embodiment of system 100. In the embodiment of FIG. 1C, transaction device 101 includes setup portion 104 and request portion 106, similar to the embodiment of FIG. 1B. In the embodiment of FIG. 1C, system 100 includes setup 108, request for access 110, reply 112, and administrator 102. Administrator 102 includes API 144, which may include setup API 145, request API 147. Administrator 102 may also include setup portion 156, and request portion 158. As in FIG. 1B, in FIG. 1C system 100 also includes database 160 and secure entity 103. Request portion 158 may include error handler 120. In other embodiments of FIG. 1C, system 100 may not have all of the components listed above or may have other components instead of and/or in addition to those listed above.

Transaction device 101, administrator 102, and secure entity 103 were explained in conjunction with FIG. 1A. Setup portion 104 (of transaction device 101), request portion 106 (of transaction device 101), setup 108, request for access 110, reply 112, and request for access 110 were also explained above in conjunction with FIG. 1B. Setup portion 156, request portion 158, database 160 function in essentially the same manner as setup portion 116, request portion 118, database 122 (FIG. 1B). However, setup portion 156, request portion 158, database 160 are numbered differently from setup portion 116, request portion 118, database 122 (FIG. 1B), because their locations in FIG. 1C are different than in FIG. 1B, and consequently their operations may have differences that relate to their different locations.

In some applications (e.g., an electronic lock for a car), system 100 may not need a database, because the amount of information being stored is relatively small. Other applications, such as accessing a bank account, may have many users and may require the storing of information associated with system 100 in a database. Some institutions may not mind establishing a new database for storing information associated with system 100 when installing system 100. However, other institutions, such as banks, may already use one or more databases.

Institutions that already have at least one database may not be interested in maintaining another separate database for the user information associated with system 100, and may prefer to store the user information associated with system 100 in their current database. API 144, setup API 145, and/or request API 147 may communicate with a database for storing and retrieving user information. To explain API 144, in an embodiment, API 144 is located within administrator 102, and communicates with transaction device 101 and database 160. In an embodiment in which administrator 102 is a human (and in other embodiments), API 144 may be external to the rest of administrator 102. Setup API 145 is the interface through which the user, transaction device 101, or a human administrator setup and/or register new user. Request API 147 is the interface through which a user, transaction device 101, or a human administrator request access to secure entity 103. Setup API 145 and request API 147 may share the same fields for entering data or may use different fields. Similarly, setup API 145 and request API 147 may not be distinct modules, but may be different portions of code within administrator 102 and/or API 144 and may be parts of the same module. Alternatively, the lines of code that make setup API 145 and request API 147 may be intermingled with one another, and/or with the rest of administrator 102. Setup API 145 and request API 147 may be any combination of hardware and software. The software portion of setup API 145 and request API 147 (if present) may be written using any of a number of scripts and/or computer languages such as PHP, JSP, a web interface that calls JavaScript routines, C, Perl, TCL, Pascal, and/or Basic.

In an embodiment, setup API 145 and request API 147 may be capable of handling both clients that prefer to use pre-existing database, such as database 160, and those that prefer to use a newly established database, facilitating a quick integration of system 100 into a pre-existing system and thereby reducing the financial costs of integration. In an alternative embodiment, a different setup API 145 and/or request API 147 are used depending upon whether the customer intends on using their own database or allowing administrator 102 to setup a database. To explain setup API 145 in conjunction setup portion 156, setup API 145 may cause user information, such as passcode generators $G_{Ui}$ to be stored in database 160. Setup API 145 may cause methods $\Phi_{U2}$ and/or $\Phi_{U3}$ to be stored within administrator 102 for use by setup portion 156. Methods $\Phi_{U2}$, $\Phi_{U3}$, and/or $f_U$ may also be stored within administrator 102 for use by setup portion 156.

Request portion 158 may contain proprietary executable code that receives a passcode from request API 147. Request portion 158 may determine whether passcode $P_i$ is valid or not. Regarding database 160, database 160 may have existed prior to the installation of system 100, and may store a variety of different types of information, some of which may have not have any relationship to granting access to the secure entity 103. When configuring system 100 or when setting up a new user, if database 160 already exists and already has a records for the user of interest, system 100 may add a field to the record for a user ID U and for a passcode generator $G_{Ui}$. In an alternative embodiment, database 160 is within administrator 102, and is installed with and/or after administrator 102. Putting the together the above discussion of API 144, setup portion 156 and request portion 158, and database 160, a registration code R, user key K and administrator key L may be based upon (e.g., copied from or received as) output from transaction device 101 and optionally may also be based on other user information that is entered into the setup API 145. Setup API 145 calls setup portion 156 and passes registration code R and administrator key L as arguments, where registration code R and administrator key L is received by setup portion 156.

In an embodiment, setup portion 156 determines if registration code R is valid, and sends a valid or invalid message back to setup API 145. The determination of whether registration code R is valid may be a determination as to whether registration code R fits a particular format. If administrator 102 stores a copy of the user information from which registration code was derived, then the determination as to whether registration code is valid may include generating the registration code at registration portion 156, comparing the generated registration code with the received registration code. Determining whether registration code R is valid may involve verifying that the user associated with registration code R exists, determining whether user ID U is valid, and/or verifying other user information that registration portion 156 has access to. Determining whether registration code R is valid may involve administrator 102 sending a communication to transaction device 101 or the associated user confirming that the registration code was sent. If valid, the setup API 145 also sends a passcode generator $G_{Ui}$ (generated from registration code R) and may optionally send other user information, such as the user ID U, to database 160. When a user would like to access secure entity 103, a passcode $P_i$ is entered into, transmitted to, and/or received by request API 147 based on output from transaction device 101. Request API 147 calls request portion 158, using passcode $P_i$ as an argument. User ID U may be encoded within passcode $P_i$, and request portion 158 may extract user ID U from passcode $P_i$. Request portion 158 may return user ID U to request API 147. If passcode $P_i$ is invalid, request portion 158 may return an invalid user ID U. Alternatively, instead of request portion 158 extracting the user ID U from passcode $P_i$, the user may enter user ID U into request API 147, or request API 147 may receive user ID U from transaction device 101. Administrator 102 uses user ID U as a database index for the purpose of retrieving passcode generator $G_{Ui}$ from the database 160. If user ID U is an invalid index, then administrator 102 sends an invalid message to request API 147. If user ID U is a valid index, then the administrator 102 sends passcode generator $G_{Ui}$ to request API 147. Request API 147 calls request portion 158, and sends two arguments, passcode $P_i$ and passcode generator $G_{Ui}$, which are received by request portion 158. Request portion 158 determines whether passcode $P_i$ and passcode $G_{Ui}$ match. If passcode $P_i$ and passcode $G_{Ui}$ match, then request portion 158 returns a valid message and the updated passcode generator $G_{Ui+1}=f(G_{Ui})$ to the request API 147. Administrator 102 stores passcode generator $G_i$ or an updated version of passcode generator $G_{Ui+1}$ in database 160, such that passcode generator $G_i$ or its updated version is indexed by user ID U. However, if passcode $P_i$ and passcode generator $G_{Ui}$ do not match, the request portion 158 returns an invalid message to request API 147. Then request API 147 may send an invalid message to the user U, a human administrator, and/or transaction device 101.

FIG. 2A shows an example of an embodiment of a secure system 200. Secure system 200 includes transaction device 202, computer 204 having input system 206 and output system 208. Secure system 200 also includes system 210, network 212, system 214, system 216, system 218, and system 220. In other embodiments secure system 200 may not have all of the components listed above or may have other components instead of and/or in addition to those listed above. Secure system 200 illustrates some of the variations of the manners of implementing system 100. Transaction device 202 is one embodiment of transaction device 101. Transaction device 202 is capable of being plugged into and communicating with computer 204 or with other systems via computer 204. Transaction device 202 also may communicate wirelessly with computer 204. A user may use input system 206 and output system 208 to communicate with transaction device 101.

Computer 204 is directly connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Administrator 102 may be any of, a part of any of, or any combination of any of computer 204, system 210, network 212, system 214, system 216, system 218, and/or system 220. Secure entity 103 and may be any of, a part of any of, or any combination of any of system 210, network 212, system 214, system 216, system 218, and/or system 220. For example, administrator 102 may be located on system 214, and secure entity 103 may be located on system 216. As another example, administrator 102 may be located on computer 204, and secure entity 103 may be located on system 210, 214, system 216, system 218, system 220, and/or network 212. As yet another example, administrator 102 and secure entity 103 may both be located on system 216 or may both be located on system 210. As another example, system 218 may be administrator 102, and system 220 may include secure entity 103.

Figure 2B:
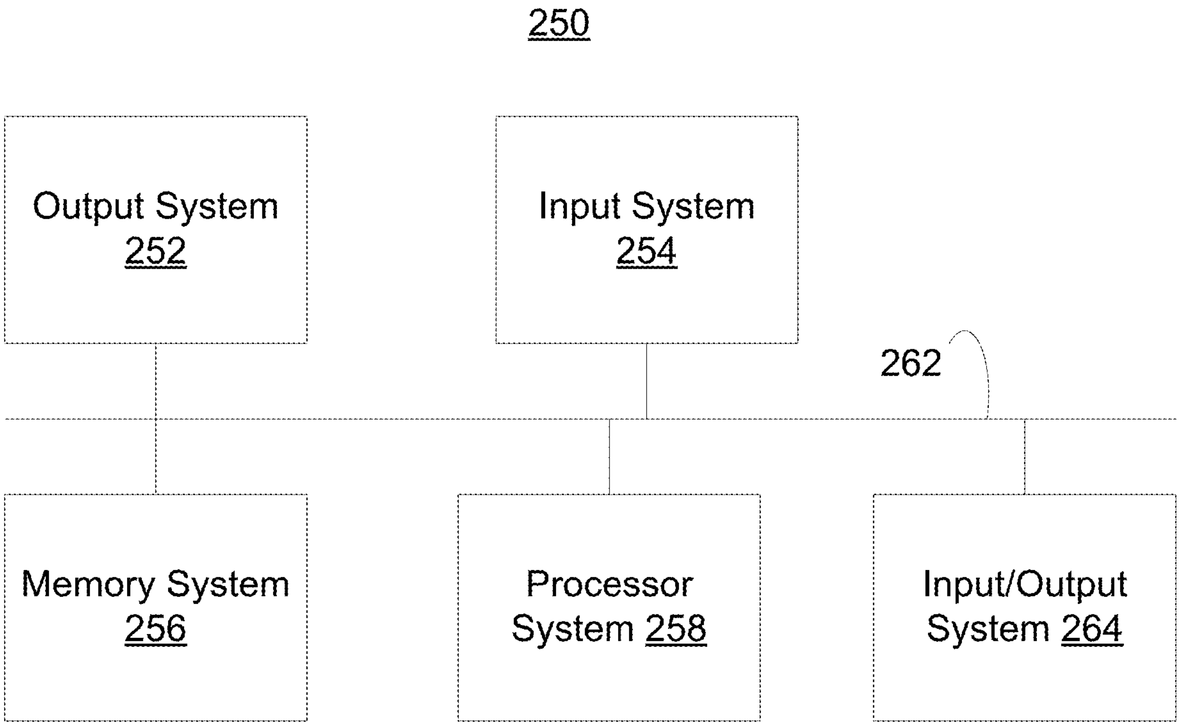
FIG. 2B shows a block diagram of an example of computer system, which may be used as any of the system of FIG. 2A and/or for any of the blocks in FIG. 1A.

FIG. 2B shows a block diagram of a computer system 250 used in system 100. Computer system 250 may include output system 252, input system 254, memory system 256, processor system 258, communications system 262, and input/output device 264. In other embodiments, computer system 250 may not include all of the components listed above or include other components in addition to and/or instead of those listed above.

Computer system 250 is an example of a system that may be used for any one of, any combination of, or all of computer 204, system 210, system 214, system 216, system 218, and/or system 220.

Output system 252 may include any one of, some of, any combination of, or all of a monitor system, a handheld display system, a printer system, a speaker system, a connection or interface system to a sound system, an interface system to peripheral devices and/or a connection and/or interface system to a computer system, an intranet, and/or an internet, for example.

Input system 254 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 256 may include, for example, any one of, some of, any combination of, or all of a long term storage system, such as a hard drive; a short term storage system, such as random access memory; a removable storage system, such as a floppy drive, jump drive or other removable drive; and/or flash memory. Memory system 256 may include one or more machine-readable mediums that may store a variety of different types of information.

The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. For example, embedded software is stored on a machine-readable medium. The term machine-readable medium also includes mediums that carry information while the information is in transit from one location to another, such as copper wire, air, water, and/or optical fiber. Software versions of any of the components of FIGS. 1A-C may be stored on machine-readable mediums.

Processor system 258 may include any one of, some of, any combination of, or all of multiple parallel processors, a single processor, a system of processors having one or more central processors, and/or one or more specialized processors dedicated to specific tasks.

Communications system 262 communicatively links output system 252, input system 254, memory system 256, processor system 258, and/or input/output system 264 to each other. Communications system 262 may include machine-readable media such as any one of, some of, any combination of, or all of electrical cables, fiber optic cables, long term and/or short term storage (e.g., for sharing data) and/or means of sending signals through air (e.g., wireless communications), for example. Some examples of means of sending signals through air include systems for transmitting electromagnetic waves such as infrared and/or radio waves and/or systems for sending sound waves.

Input/output system 264 may include devices that have the dual function as input and output devices. For example, input/output system 264 may include one or more touch sensitive display screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 264 is optional, and may be used in addition to or in place of output system 252 and/or input device 254.

FIG. 3A shows one example of a transaction device 202. Transaction device 202 includes acquisition mechanism 302, cover 304, and interface 306. In other embodiments, transaction device 202 may not have all of the components listed above or may have other components instead of and/or in addition to those listed above.

Acquisition mechanism 302 may be a mechanism of acquiring fingerprints. Cover 304 may be a cover for covering acquisition mechanism 302, and for protecting acquisition mechanism 302 when acquisition mechanism 302 is not in use. Cover 304 may swing open, slide open, and/or snap off and on. Interface 306 is for connecting with an electronic device, such as a computer. Interface 306 may be a USB port, an RS 232 connection, a wireless connection using RFID, a serial port or any of a number of other types of connections.

ENROLLMENT: CREATING ASYMMETRIC KEYS & REGISTRATION CODE

In the embodiments, described below, a user named Alice will be referred to as user A. In an embodiment, during enrollment, the user A presents or presses his or her body part(s) to scan in acceptable biometric prints. In an alternative embodiment as shown in FIG. 3B and FIG. 3D, during enrollment, the user may enter a PIN. In another embodiment shown in FIG. 3C and FIG. 4B, the user selects a number of favorite images so they may authenticate (identify) this user at a later time.

In another embodiment, the enrollment may be of a chip or a device of a chip instead of user who has biometrics. In this embodiment, it is helpful to call the device or chip "Alice" even though it is not a person. In these embodiments, a serial number in the chip or device may help authenticate the device. In an embodiment, the serial number and Alice's private key may be signed with a private key held by the manufacturer and the manufacturer's public key and Alice's public key is placed on a public key server so that another device (Bob) can use these public keys to validate Alice (the serial number of the device or chip.) In this manner, the serial number behaves similarly to a biometric for a person since the serial number helps Bob validate that Alice is a valid device in an Internet of Devices.

In an embodiment, during enrollment, in the secure area of the device, biometric print information or serial number from is obtained from the user (Alice) and is passed to a one-way hash function Φ or another one-way method of encoding that generates a registration code $R_A$. Then $R_A$ is securely given to the administrator. In an embodiment, during enrollment, a key pair (administrator key, user key) denoted as $(L_A, K_A)$ is generated for user A. In an embodiment, $L_A \neq K_A$ (i.e., the administrator key is not equal to the user key), which helps make the passcode system asymmetric. This means user A stores user key $K_A$ in its secure area of the device. In one embodiment, user key $K_A$ is stored on the memory of a smart card chip in transaction device. The administrator stores user A's public key $L_A$. In one embodiment, the user key $K_A$ is stored in the secure area of a chip inside a mobile phone in device 400, shown in FIG. 4.

In some embodiments, the relationship between the user and administrator is a peer to peer relationship, where Alice's device acts as a user and Bob's device corresponds to the administrator. In this way, Bob's device authenticates Alice's device in order to determine if Bob will make Bob's computational resources or some of Bob's information available to Alice's device.

In some embodiments, a second key pair denoted as $(L_{BA}, K_{BA})$ is created for the administrator corresponding to user A. In an embodiment, $L_{BA} \neq K_{BA}$ (i.e., the second administrator key is not equal to the second user key), which helps make the security system asymmetric. In an embodiment, the administrator stores key $K_{BA}$ in its database entry for user A; user A stores key $L_{BA}$ in a secure area of user A's transaction device 101. In an embodiment, this second key pair $(L_{BA}, K_{BA})$ may be used to encrypt administrator key $L_A$ as ⸸ $(L_A, L_{BA})$ and securely transmit ⸸ $(L_A, L_{BA})$ to administrator 102, shown in FIG. 1A. After the administrator receives ⸸ $(L_A, L_{BA})$, it may decrypt it by using key $K_{BA}$ and computing ⸸ (⸸ $(L_A, L_{BA}), K_{BA})$ which equals $L_A$. This enables the asymmetric keys $L_A$ and $K_A$ to be created on transaction device 101 in a decentralized way and also transmit administrator key $L_A$ to administrator 102.

In an embodiment, the registration code $R_A$ and administrator key $L_A$ may be given to the administrator in the same physical place, such as at a bank, or the registration code $R_A$ and public key $L_A$ may be securely couriered or electronically transmitted to the administrator if enrollment is accomplished remotely. In some applications, the registration code and cryptography keys may be encrypted and distributed first using a Diffie-Hellman exchange.

Figure 7:
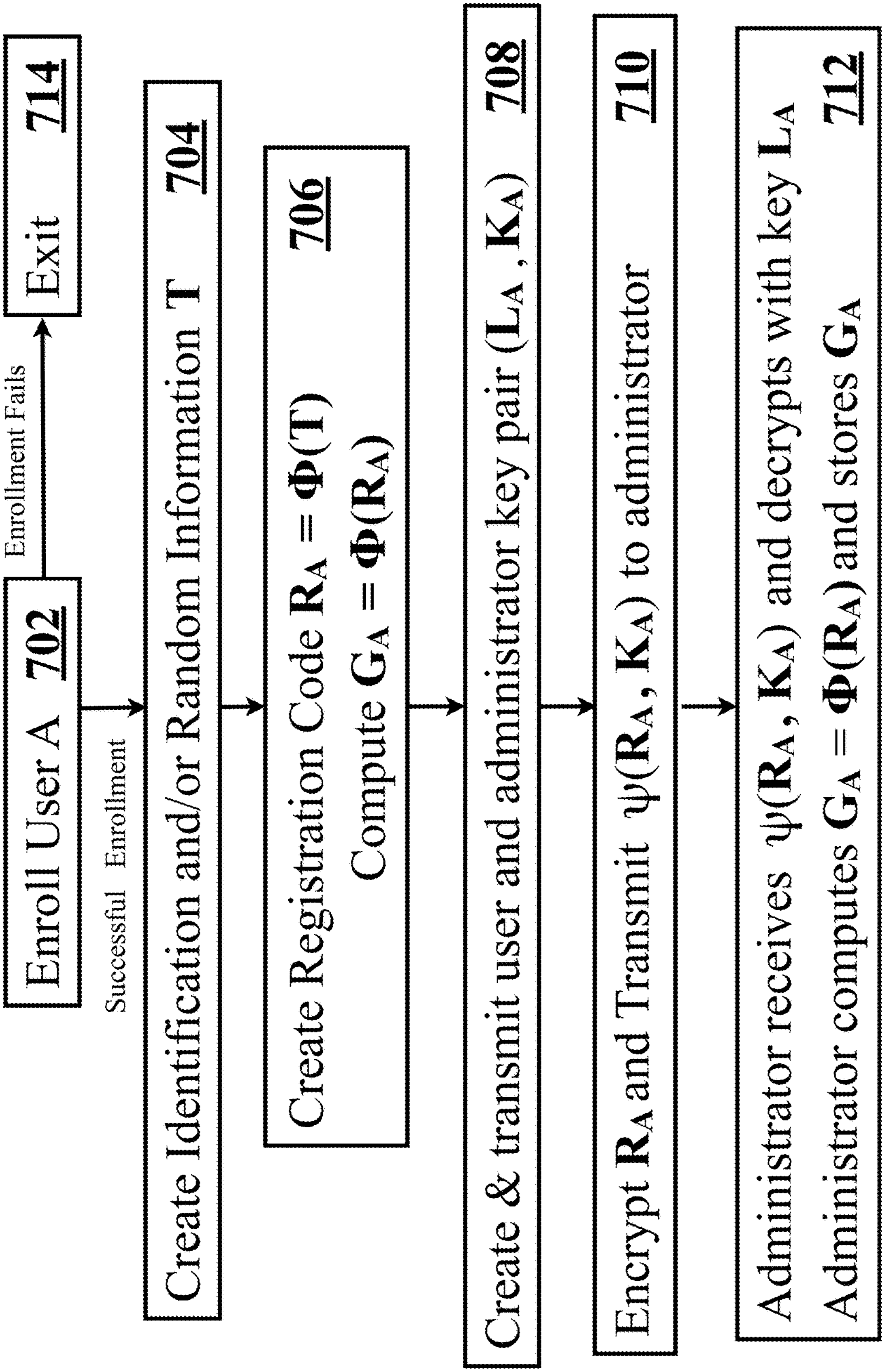
FIG. 7 shows a flowchart of an example of a method for enrolling a particular user to use a transaction device.

In an embodiment, during the enrollment of user A the following steps are executed. These steps are shown in the flowchart of FIG. 7.

Step 702.) The user presents user information in the form of biometrics, PIN or visual images. Check if this enrollment is successful. If successful, goto step 704. If enrollment of the user's identifying information fails, goto step 714.

Step 704.) Some of the biometric print information and/or random information from a physical device, denoted as T, is used to create a registration code $R_A$. A hash function Φ is applied to T, denoted as Φ(T), to create the registration code $R_A$. In other words, $R_A = \Phi(T)$. A hash function Φ is applied to $R_A$. The passcode generator $G_A$ is computed as $G_A = \Phi(R_A)$ and stored in secure memory of user A.

Step 706.) The asymmetric key pair $(L_A, K_A)$ is generated. $L_A$ is the administrator key stored by the backend server(s). $K_A$ is the user key stored on the user's device in a secure area.

Step 708.) In an embodiment, the registration code $R_A$ may be encrypted as ⸸ $(R_A, K_A)$ using asymmetric key cryptography and transmitted to the administrator via the Internet or wirelessly on a cellular network. In another embodiment, a Diffie-Hellman exchange may be used to securely establish a common registration code $R_A$ In an alternative embodiment, the display on the credit card or mobile phone may show the unencrypted registration code $R_A$ when the user is in the same physical location of the administrator.

For example, the user could be present at the bank when enrolling and a bank employee could read $R_A$ from the display.

Step 710.) Using asymmetric key cryptography, the administrator decrypts ⸸ $(R_A, K_A)$ by using the other key $L_A$ to compute ⸸ (⸸ $(R_A, K_A), L_A) = R_A$. In an alternative embodiment, the Diffie-Hellman exchange is used so that the administrator has $R_A$. When the administrator is in the same physical place as the user, the registration code $R_A$ may be securely displayed to the administrator in the same physical place or possibly decrypted by the administrator if received from a remote location.

Step 712.) The administrator uses the registration code $R_A$ it received and/or decrypted to compute the passcode generator $G_A$ as $G_A = \Phi(R_A)$ and stores $G_A$ for this particular user in a secure area. Completed.

Step 714.) If enrollment step 702 fails, then this procedure immediately exits with failure.

In some embodiments, one or more of the above steps may be combined or separated. In some embodiments, the following step may be added. The administrator may generate the key pair $(L_{BA}, K_{BA})$ and transmit public key $L_{BA}$ to user A where public key $L_{BA}$ is stored in secure area of user A's device. These additional asymmetric keys could also be used as backup or used to restore the security of the system if a compromise on the backend occurs at a later time.

In regard to steps 704 and 706, some of the random information from a physical device and/or biometric print information, denoted as U, is obtained during enrollment and is used to create a random seed $S_A$ that helps generate the public key and private key. In an embodiment, a one-way hash function $\Phi$ is applied to U, denoted as $\Phi(U)$, to create the random seed $S_A$. In other words, $S_A=\Phi(U)$. In an alternative embodiment, where the random information U may be generated by a quantum random system or other non-deterministic system, then the use of the one-way function may be omitted and the random seed $S_A$ is assigned the value of U (i.e., $S_A=U$).

In an embodiment, public key $L_A$ and private key $K_A$ are created on the device. In an alternative embodiment, public key $L_A$ and private key $K_A$ are created by the administrator and public key $K_A$ is transmitted to the device. In an embodiment, public key $L_A$ and private key $K_A$ are created on the device. In an embodiment, private key $K_{BA}$ and public key $L_{BA}$ are created in a smart card chip on the device (credit card). In another embodiment, private key $K_{BA}$ and public key $L_{BA}$ are created in a secure area of a chip on a mobile phone.

In an embodiment, a quantum random system creates quantum random information that is used to generate public key $L_A$ and private key $K_A$, where private key $K_A$ is stored on the device and public key $L_A$ is stored by the administrator. In an embodiment, a smart card chip receives random seed $S_A$ used to generate public key $L_A$ and private key $K_A$ from a quantum random system external to the smart card chip.

In an embodiment, a quantum random system is used to help create registration code $R_A$ that is sent to the device and sent to the administrator.

In an embodiment, a quantum random system creates quantum random information that is used to generate public key $L_{BA}$ and private key $K_{BA}$, where private key $L_{BA}$ is stored on the device and public key $K_{BA}$ is stored by the administrator. In an embodiment, public key $L_{BA}$ and private key $K_{BA}$ are generated by a smart card chip that receives random seed $S_{BA}$ from a quantum random system external to the smart card chip.

USER A GENERATING A PASSCODE AFTER VALID USER AUTHENTICATION

Figure 8:
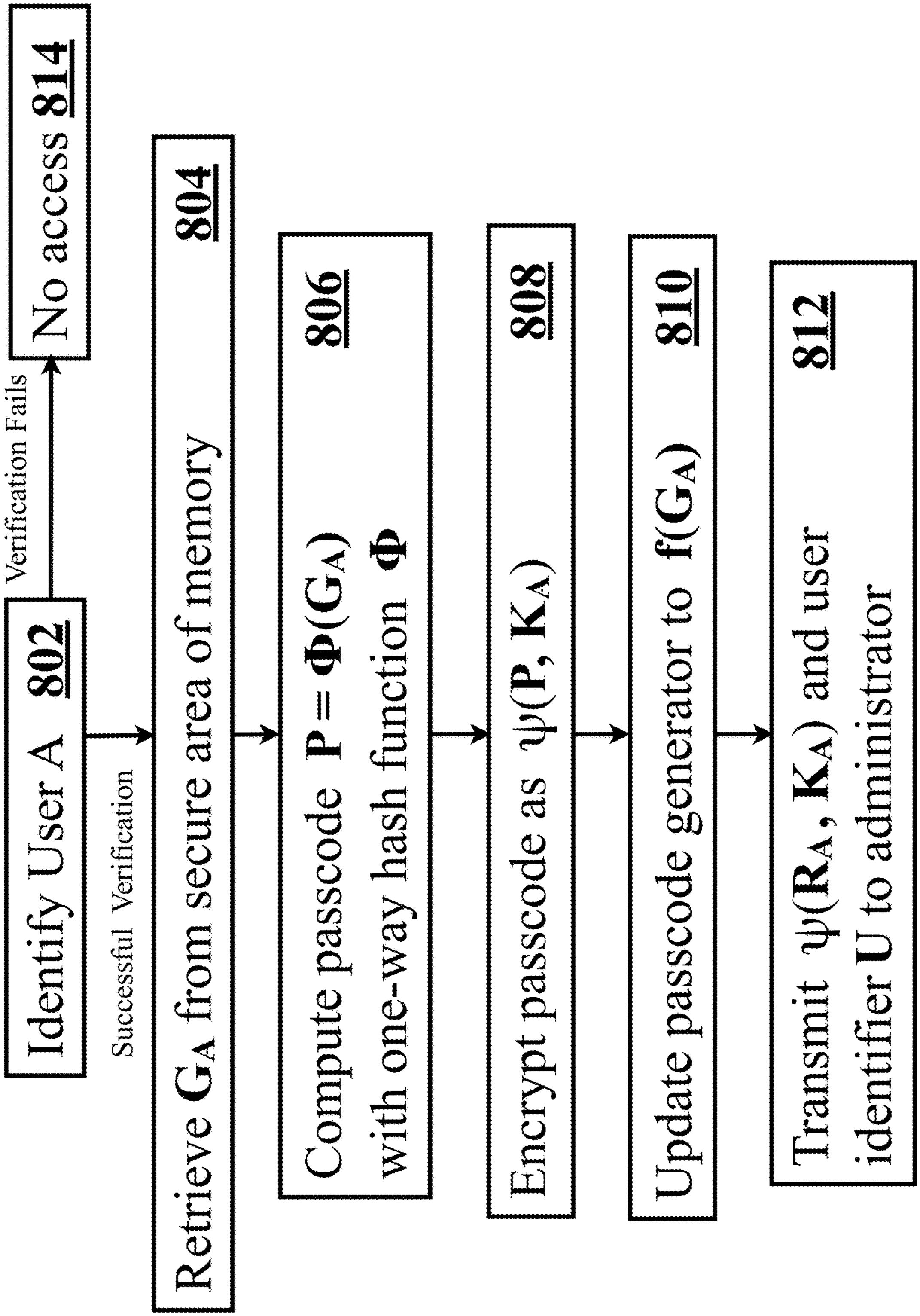
FIG. 8 shows a flowchart of an example of a method for identifying a particular user and generating a transaction signature with asymmetric secrets on the transaction device.
Figure 9:
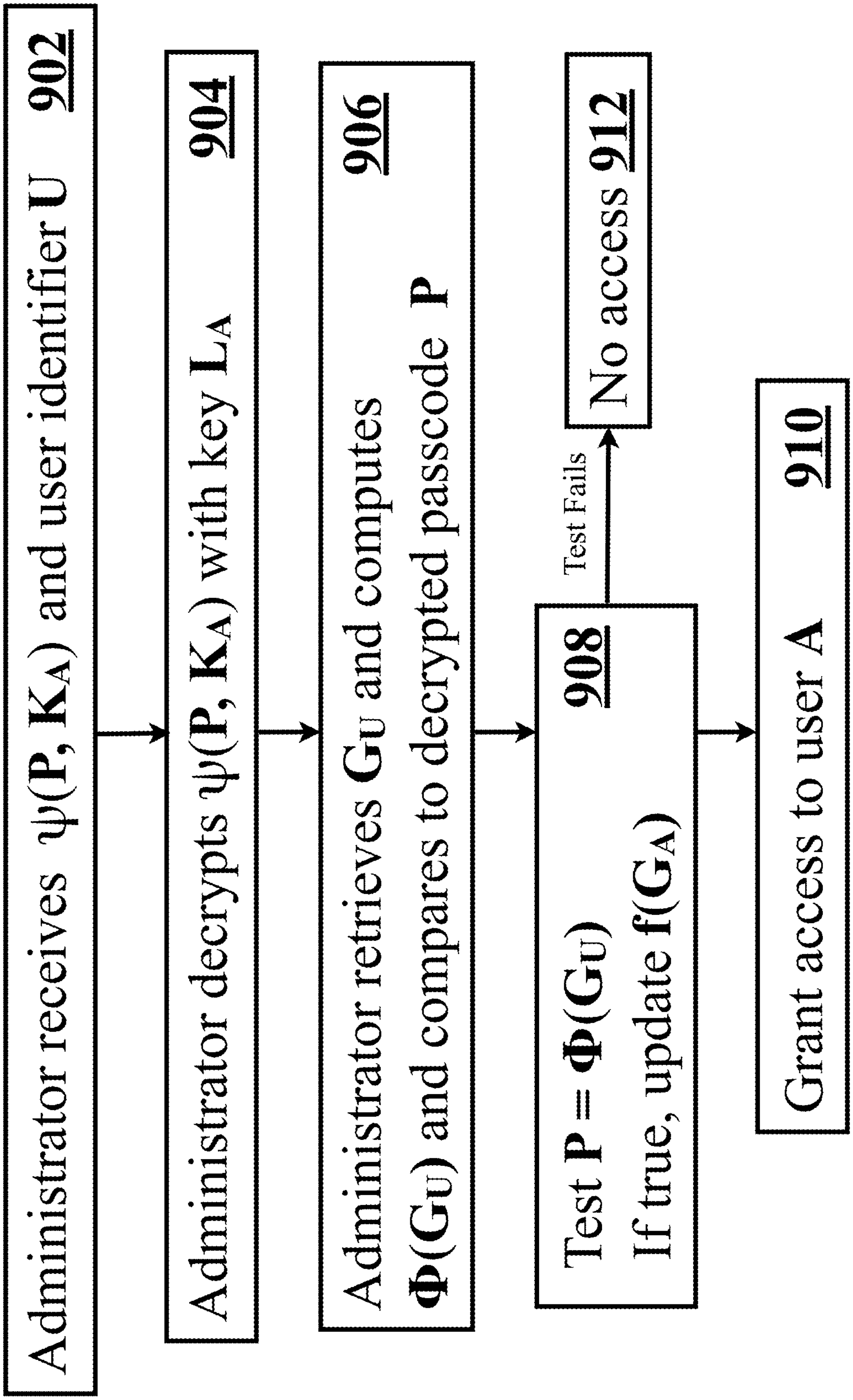
FIG. 9 shows a flowchart of an example of a method for the administrator to verify a transaction signature with asymmetric secrets sent from the transaction device.

The following steps are executed on the transaction device and shown in the flowchart of FIG. 8.

Step 802.) Identify user A, based on a valid authentication using biometrics, PIN or visual images. If the authentication is valid, goto step 804. If the authentication is invalid, goto step 814.

Step 804.) The passcode generator GA is retrieved from non-volatile memory in a secure area of the device.

Step 806.) A one-way hash function $\Phi$ is applied to GA or some part of $G_A$, denoted as $\Phi(G_A)$, to create the one-time passcode P. In other words, $P=\Phi(G_A)$.

Step 808.) Asymmetric key cryptography method ʔ encrypts passcode P with private key $K_A$ and creates an encrypted passcode. In other words, the encrypted passcode is ʔ (P, $K_A$).

Step 810.) The passcode generator G is changed to a new value. G is set equal to the new value f(G), where there are an infinite number of functions that f could be. The function f will be referred to as the perturbing function. One possible perturbing function f could add $\Phi(G)$ to G. Another possible perturbing function f could consider G as a number and add 1. Another possible perturbing function f could increase G by 2. Another possible perturbing function f could add 1 to G and permute the order of the symbols in G using some randomly chosen permutation. Even another possible perturbing function f could add 1 to G, and then permute the bits in G. G could be used as a seed for a deterministic random number generator, which is used by f to generate a new G.

Step 812.) The one-time passcode ʔ (P, $K_A$) is either transmitted to a display or submitted directly to the administrator. There are many different methods for transmitting the passcode to the administrator. In one method, the passcode can be displayed to the administrator, when the user is in the same physical location as the administrator. In a second method, the user passcode may be automatically transmitted over the mobile phone cellular network or TCP/IP. In a third method, the user may type the passcode into a web browser using the Internet. And in many other methods, the user may submit the passcode by some other electronic means such as a fax machine or typing into the keypad of an ATM machine.

PASSCODE VERIFICATION BY THE ADMINISTRATOR (BACKEND SERVERS

The following steps are executed by the administrator. In an embodiment, the administrator verification is performed by one or more of computers 214, 216, 218, 220 as shown in FIG. 2A.

Step 902.) The administrator receives the encrypted passcode ʔ (P, $K_A$) and user identifier U from user A.

Step 904.) The administrator uses asymmetric key cryptography method ʔ to decrypt encrypted passcode ʔ (P, $K_A$) with administrator key $L_A$ and to reveal the decrypted passcode P. In other words, use cryptography method ʔ to compute ʔ (ʔ (P, $K_A$), $L_A$) which equals passcode P.

Step 906.) The administrator uses identifier U as an index to retrieve passcode generator $G_U$. (The passcode generator for each user can be indexed by the user identifier in a database.) The administrator applies a hash function $\Phi$ to $G_U$, denoted as $\Phi(G_U)$, and compares it to the decrypted P.

Step 908.) If $\Phi(G_U)$ equals P, then goto step 910 (The passcode submitted by the field user is valid.) and the passcode generator is set equal to the new value of G', generated by applying the perturbing function to G, (G'=f (G)).

If $\Phi(G_U)$ is not equal to P, then goto step 912. The passcode is invalid.

Step 910.) The administrator grants access to user A.

Step 912.) No access is granted to user A.

This method of using asymmetric keys where the transaction device only has access to key $K_A$ and the administrator only has access to key $L_A$ makes the system more secure. If a hacker (adversary) or a government of hackers breaks into the administrator database and gain access to the administrator keys $L_A$ for each user A, then this information does not reveal to the adversary the value of any private key $K_A$, which only is stored on each transaction device (e.g., secure USB token or credit card with smartcard chip.) In order to generate the next correct, encrypted passcode, the hacker needs to know the value of $K_A$ for user A. The asymmetric keys help decentralize the security to the transaction devices.

REDUCING USER OR TRANSMISSION ERROR

In some embodiments, the one-time passcode may be transmitted automatically (in some cases, wirelessly) to the backend server. In some cases, there may be transmission error, where one or more bits are not transmitted correctly. In some embodiments, to address this, the transaction device may use key $K_A$ to encrypt a number which indicates how many times that the perturbing function has been applied since the registration code was established at the time of enrollment. The backend server(s) then decrypt this number and this helps the backend determine the correct passcode generator $G_U$ to check against the passcode that was submitted from the user's device. In some embodiments, the user may be reading the one-time passcode from the display and may incorrectly read it or write it down. Or the user may forget to record the one-time password, or type it into a keyboard incorrectly.

REDUCING USER ERROR: LOOKAHEAD ROUTINE

As an alternative method of reducing user error, the user may scan their biometric again or select their images or enter their PIN again, and the passcode generator will generate a new passcode. When this happens, an optional feature enables the administrator to accept this new passcode even though the administrator is expecting to receive the previous passcode. Let m denote the maximum number of passcodes that an administrator will look ahead. In this alternative embodiment, the administrator (i.e., the backend server(s)) works around user error by executing the following steps. In an embodiment, the administrator verification is executed by computer(s) 214, 216, 218, 220 as shown in FIG. 2A.

Step I.) The administrator enters the encrypted passcode Ɨ (P, $K_A$) received from the user.

Step II.) Use asymmetric key cryptography Ɨ to decrypt encrypted passcode Ɨ (P, $K_A$) with public key $L_A$ and to create decrypted passcode P. In other words, use public key cryptography to compute Ɨ (Ɨ (P, $K_A$), $L_A$) which equals passcode P.

Step III.) The administrator obtains a user identifier U associated with (e.g., extracts a user number U from) passcode P, and uses U to find the passcode generator $G_U$. (The passcode generator for each user can be indexed by the user number in a database.) The administrator applies a hash function $\Phi$ to $G_U$, denoted as $\Phi(G_U)$, and compares it to P.

Step IV.) If $\Phi(G_U)$ does not equal P, a temporary passcode generator $G_T$ is set equal to $f(G_U)$, where f is the perturbing function.

Initialize the counter k to zero. Then execute the following loop at most m times:

Step A.) The administrator compares $\Phi(G_T)$ to passcode P.

Step B.) If $\Phi(G_T)$ is not equal to P, set $G_T$ equal to $f(G_T)$. Increment k. If ($k<m$), go back to step A. If ($k \geq m$), then send a message that the passcode P is not valid.

Step C.) Otherwise, $\Phi(G_T)$ equals P. For user U, set the new value of the passcode generator equal to $f(G_T)$. Send a message that the passcode P is valid.

PASSCODES DEPENDENT ON A NONCE OR ON TIME

In some embodiments, the one-time code can depend upon a nonce or upon the time rather than being event based. FIG. 10 shows enrollment 1000. The steps of ENROLLMENT OF PASSCODES USING A NONCE are shown below.

Step 1002.) The device or computer chip named Alice generates private signature key S during manufacturing or at the beginning of enrollment.

Step 1004.) Alice computes her public signature key $g^s$ and sends $g^s$ to Bob.

Step 1006.) Bob generates his one-time code private key; Bob computes his public one-time code key $g^b$; Bob sends public key $g^b$ to Alice.

Step 1008.) Alice stores her private signature key S and Bob's public key $g^b$ in Alice's memory.

Step 1010.) Bob stores Alice's public signature key $g^s$ in Bob's memory.

Alice never lets her private signature key S leave the secure area of her device. In an embodiment, the private signature key S is generated by an random number generator that uses non-determinism.

AUTHENTICATION WITH ONE-TIME CODES DEPENDING UPON A NONCE

In an embodiment, Alice could send to Bob a 16-byte nonce denoted as N, and in hexadecimal N=50F20B3A 04B52E46 12478DCB 763C5766 In another embodiment, the size of the nonce could be 64 bytes or 128 bytes. In an embodiment, the nonce N is generated by a random number generator. In an embodiment, the nonce Nis generated by a quantum process.

In an embodiment, the quantum process uses a light emitting diode as the generator of non-determinism.

In another embodiment, the one-time passcode could depend upon the time to the nearest 90 seconds. In other words, the rounded time acts like a nonce. In this case, denote the rounded time to the nearest 90 seconds as t. If the current time when the passcode is received by the administrator is more than 90 seconds after the time when the passcode was created on the user's device, then this one-time passcode has expired. In this case, the passcode is invalid. Consequently, the administrator would deny access for this particular passcode submitted. In other embodiments, the rounded time t can be computed upon the time to the nearest 60 seconds or two minutes or another interval of time that is used to compute the rounded time.

Figure 11:
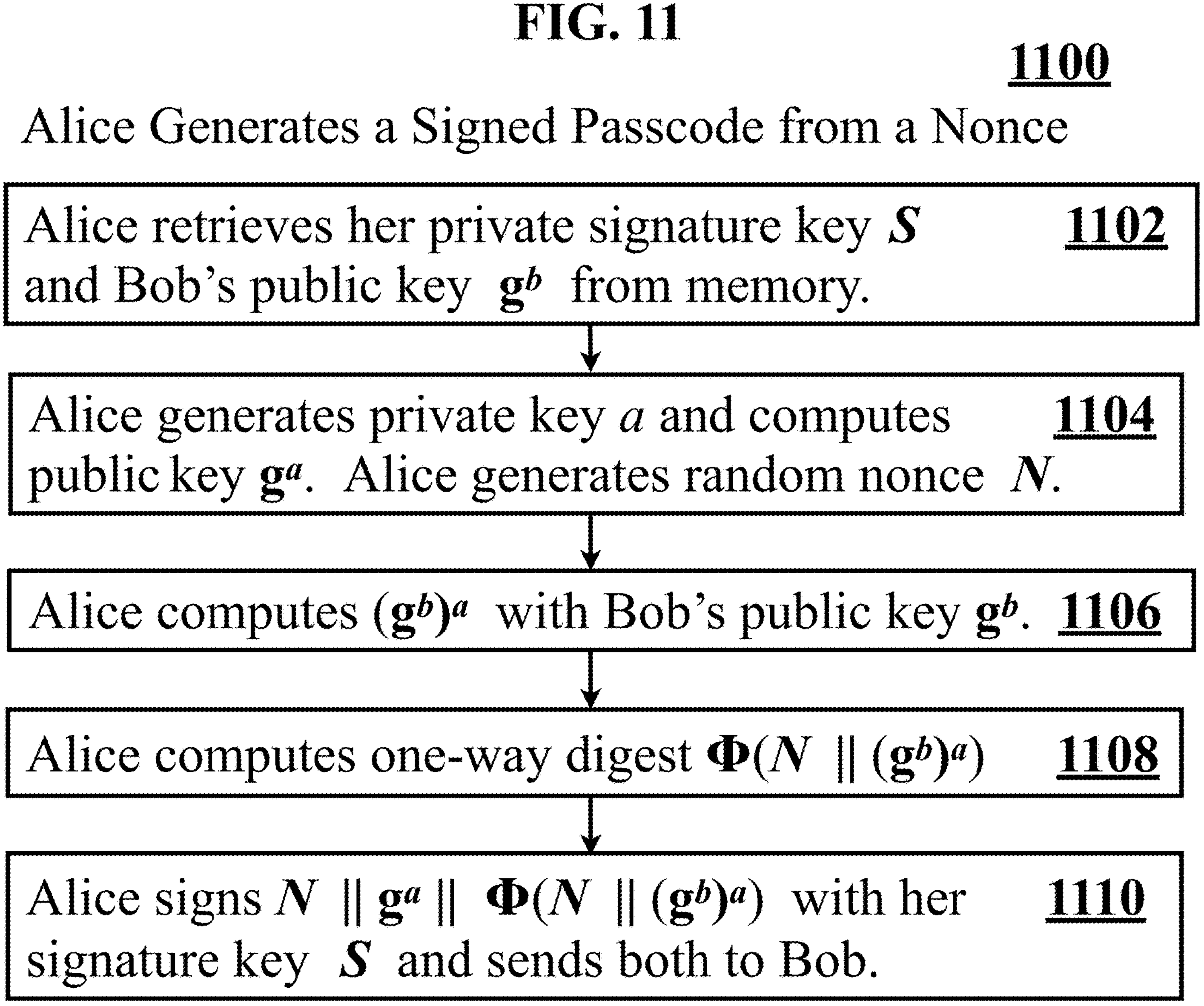
FIG. 11 shows a flowchart of an example of a method for a device or computer chip named Alice to generate a signed transaction derived from a nonce and to send to an administrator (named Bob or called a second party).

For embodiments, using a nonce or time, the following steps are executed by device 1100 (named Alice or sometimes called a first party) and shown in the flowchart of FIG. 11.

ALICE GENERATES A SIGNED PASSCODE FROM A NONCE

Step 1102.) Alice retrieves her private signature key S and Bob's public key $g^b$ are retrieved from memory in a secure area.

Step 1104.) Alice generates private key a and Alice computes her public key $g^a$. Alice generates random nonce N.

Step 1106.) Alice uses Bob's public key $g^b$ and her private key a to compute the shared secret $(g^b)^a$.

Step 1108.) Alice concatenates nonce N to $(g^b)^a$, expressed as $N\|(g^b)^a$ and computes $\Phi(N\|(g^b)^a)$ with one-way hash function $\Phi$. Alice's passcode is $P=\Phi(N\|(g^b)^a)$.

Step 1110.) Alice signs $N\|g^a\|\Phi(N\|(g^b)^a)$ with her private signature key S. Alice sends $N\|g^a\|\Phi(N\|(g^b)^a)$ (a concatenation of her nonce, public key and one-time code) and Alice sends the signature $\sigma(N\|g^a\|\Phi(N\|(g^b)^a), S)$ to Bob.

Figure 12:
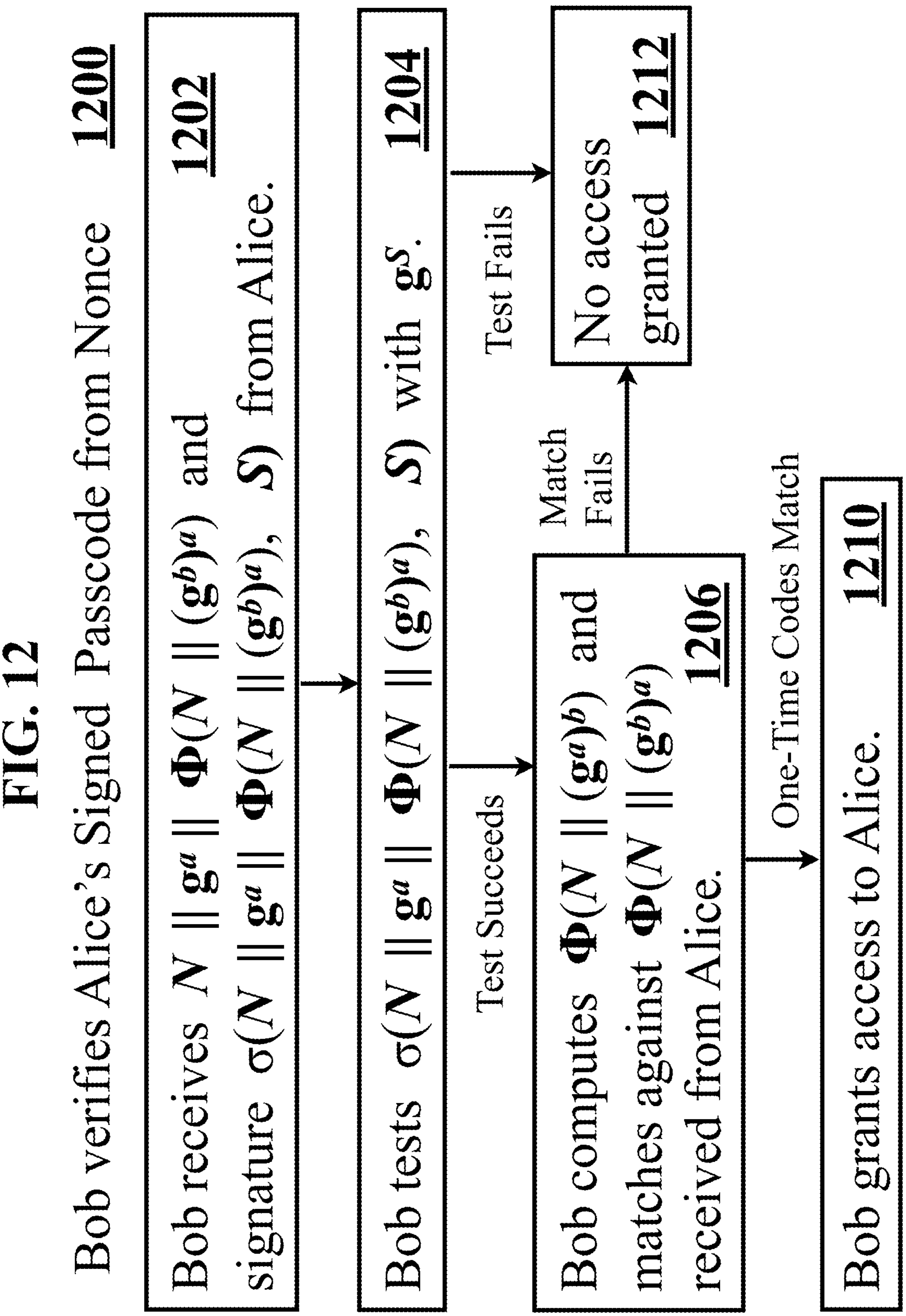
FIG. 12 shows a flowchart of an example of a method for an administrator or second party named Bob to authenticate a transaction and signature received from Alice.

In an embodiment, an elliptic curve is used for performing the computations the comprise signing with the private signature key. In an embodiment the elliptic curve computations are performed on an Edwards curve over a finite field. When the field K does not have characteristic two, an Edwards curve is of the form: $x^2+y^2=1+d\,x^2y^2$, where d is an element of the field not equal to 0 and not equal to 1. For more information on Edwards curves, refer to the publication: Harold Edwards. A normal form for elliptic curves. Bulletin of the American Mathematical Society. 44: 393-422, April, 2007. For embodiments, using a nonce or time, the following steps are executed by device 1200 (named Bob or sometimes called a second party) and shown in the flowchart of FIG. 12.

BOB VERIFIES ALICE'S SIGNED PASSCODE DERIVED FROM A NONCE

Step 1202.) Bob receives from Alice $N \| g^a \| \Phi(N \| (g^b)^a)$ and signature $\sigma(N \| g^a \| \Phi(N \| (g^b)^a), S)$.

Step 1204.) Bob tests signature $\sigma(N \| g^a \| \Phi(N \| (g^b)^a), S)$ with Alice's public signature key $g^S$. If the signature test succeeds, goto step 1206. If the signature test fails goto step 1212.

Step 1206.) Bob use his private key b and Alice's public key $g^a$ to compute the shared secret $(g^a)^b$. Bob uses one-way function $\Phi$ and nonce N to compute $\Phi(N \| (g^a)^b)$. Bob matches $\Phi(N \| (g^a)^b)$ against passcode $\Phi(N \| (g^b)^a)$ received from Alice. If the match succeeds, goto step 1210; if the match fails goto step 1212.

Step 1210.) Alice is authenticated and Bob grants access to Alice.

Step 1212.) Bob does NOT grant access to Alice.

In some embodiments, the nonce is generated by a non-deterministic process. In some embodiments, the one-way function $\Phi$ exhibits the avalanche property: in these embodiments, with a probability very close to 1, each temporary passcode occurs only once, and the next temporary passcode is not only different but also extremely difficult to predict from prior temporary passcodes. For more information on the avalanche property, refer to the publication: A. F. Webster and S. E. Tavares. On the Design of S-Boxes. Advances in Cryptology. CRYPTO 85 Proceedings. LNCS 218. Springer, 523-534, 1986.

BLOCKCHAIN NETWORK SYSTEM

Figure 1D:
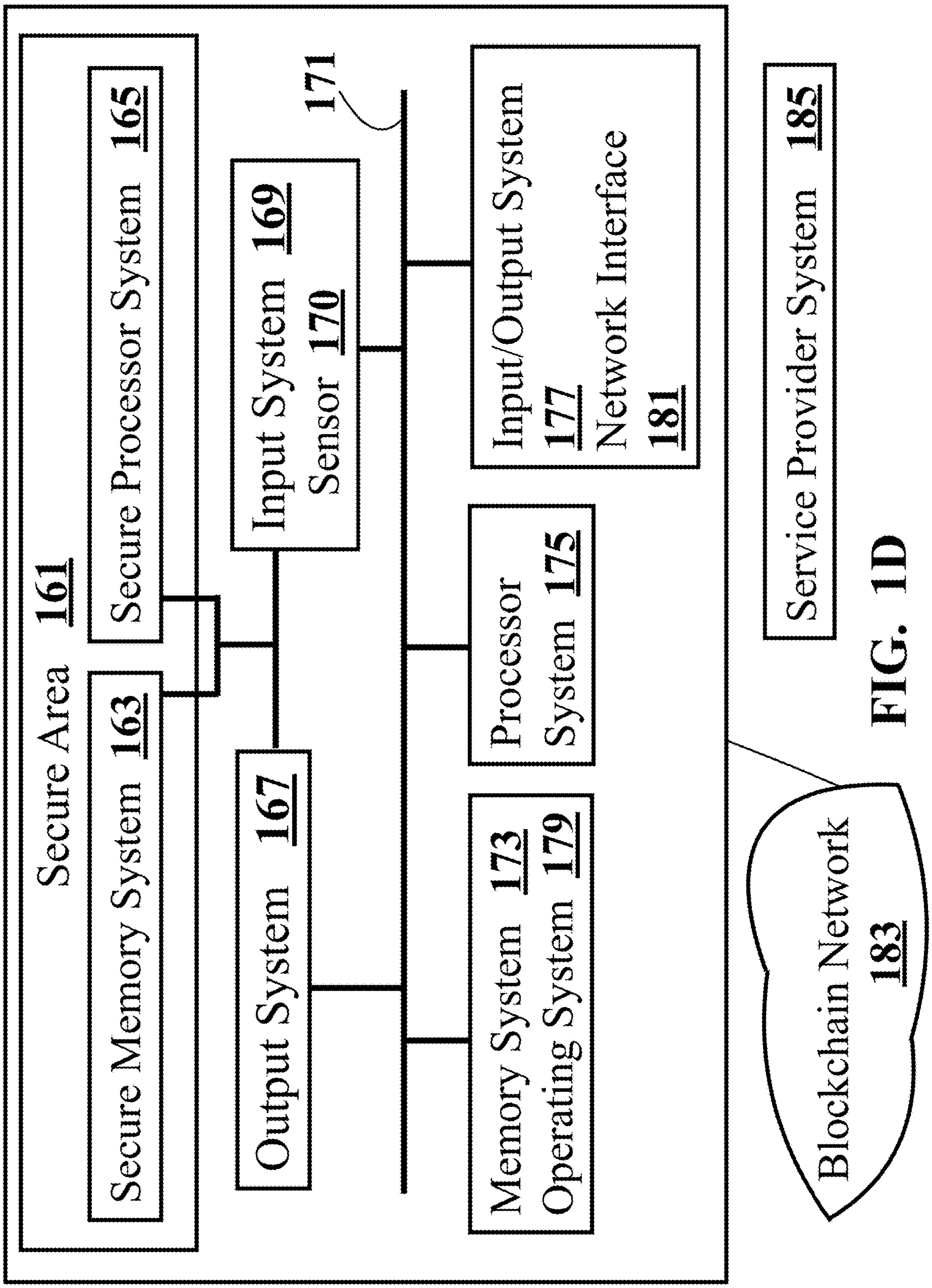
FIG. 1D shows a block diagram of an embodiment of a system for secure transactions where the transactions are stored publicly and distributed across a blockchain network.

FIG. 1D shows a block diagram of an embodiment of a blockchain network 183 with service provider system 185 in a system for securing transactions against cyber attacks. In an embodiment, service provider system 185 may include output system 167, input system 169, secure memory system 163, secure processor system 165, and input/output system 177 In other embodiments, blockchain network 183 and service provider system 185 may not have all the components and/or may have other embodiments in addition to or instead of the components listed above.

Service provider system 185 may be a financial institution or any other system such as a power plant, a power grid, or a nuclear plant or any other system requiring secure access and secure transactions. Service provider system 185 may include one or more webservers, applications servers, and/or databases, which may be part of a financial institution, as shown in FIG. 2A.

Output system 167 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 169, containing sensor 170, may include any one of, some of, any combination of, or all of a keyboard system, a touch sensitive screen, a tablet pen, a stylus, a mouse system, a track ball system, a track pad system, buttons on a handheld system, character entry of letters, numbers or other symbols on a touch sensitive screen, a scanner system, a microphone system, a connection to a sound system, and/or a connection and/or interface system to a computer system, intranet, and/or internet (e.g. IrDA, USB).

Memory system 173 may store operating system 179. Memory system 173 may include may include, for example, any one of, some of, any combination of, or all of a long term storage system, such as a hard drive; a short term storage system, such as random access memory; a removable storage system, such as a floppy drive or a removable drive; and/or flash memory. Memory system 173 may include one or more machine-readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. Memory 173 may include encryption/decryption code, generate passcode generator, and algorithms for authenticating transaction information, for example (memory system 173 is discussed further in conjunction with FIG. 2C).

Processor system 175 executes the secure transactions as a part of blockchain network 183. Processor system 175 may include any one of, some of, any combination of, or all of multiple parallel processors, a single processor, a system of processors having one or more central processors and/or one or more specialized processors dedicated to specific tasks. In an embodiment, processor system 175 may include a network interface 181 to connect and use device 101 in FIG. 1C to authenticate the user's blockchain transaction with service provider system 185 via blockchain network 183. In an embodiment, the smart card in FIG. 3B may authenticate the user's blockchain transaction with service provider system 185 via blockchain network 183. In an embodiment, the device in FIG. 3C or 5B, which may be part of device 101 shown in FIG. 1C may use the selection of visual images to authenticate the user's blockchain transaction with service provider system 185 via blockchain network 183.

Input/output system 177 may include devices that have the dual function as input and output devices. For example, input/output system 177 may include one or more touch sensitive screens, which display an image and therefore are an output device and accept input when the screens are pressed by a finger or stylus, for example. The touch sensitive screen may be sensitive to heat and/or pressure. One or more of the input/output devices may be sensitive to a voltage or current produced by a stylus, for example. Input/output system 118 is optional, and may be used in addition to or in place of output system 202 and/or input device 204.

Figure 2C:
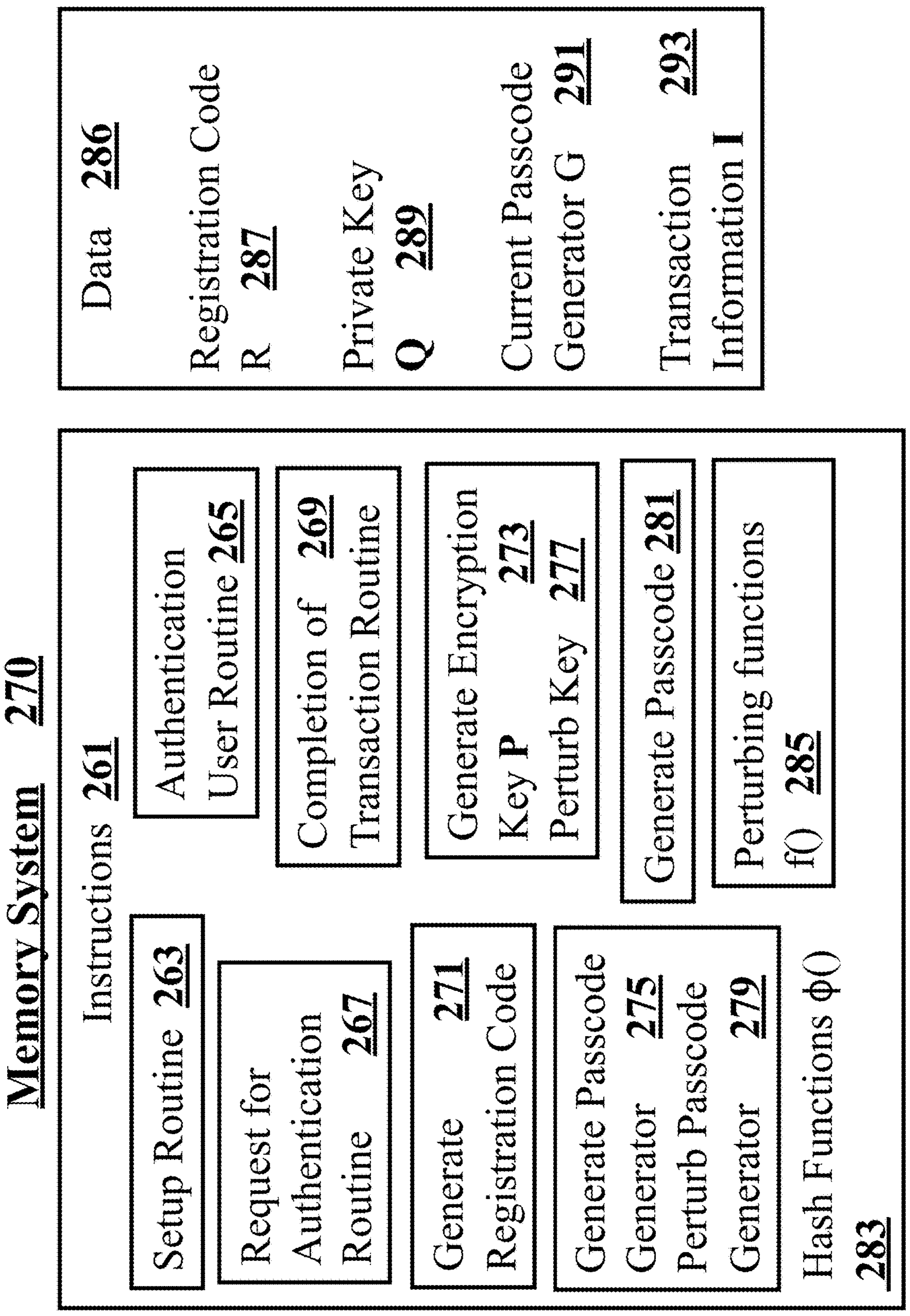
FIG. 2C shows a block diagram of an example of a memory system.

FIG. 2C shows an embodiment of a block diagram of the contents of memory system 256 of FIG. 2A, Memory system 270 may include instructions 261, which in turn may include a setup routine 263, an authentication of user routine 265, a request for authentication routine 267, completion of transaction routine 269, generate registration code 271, generate encryption key 273, generate passcode generator 275, perturb encryption key 279, perturb passcode generator 279, generate passcode 281, hash functions 283, and perturbing functions 285. Memory system 270 may also store data 286, which may include registration code R 281, current encryption key K 289, current passcode generator G 291, and transaction information S 293. In other embodiments, memory system 270 may not have all of the elements or features listed and/or may have other elements or features instead of, or in addition to, those listed.

Setup routine 263 is a routine that handles the setting up of the service provider system 185, so that service provider system 185 may be used for performing secure blockchain transactions in blockchain network 183. Setup routine 263 may receive a registration code from the user system, which in turn may be used for generating an initial encryption key 273.

In an alternative embodiment, the user may send a biometric print or template of a biometric print to service provider system 185, and service provider system 185 may generate the registration code from the biometric print in the same manner that device 101 generates the registration code from the template of the biometric print or from the biometric print and/or information obtained from an unpredictable physical process (e.g., by setup routine 263 applying a hash function to the biometric print and/or information derived from an unpredictable physical process in FIG. 13).

In another embodiment, the user may visit the location of service provider, where the service provider may collect the biometric print or the user, which is used by service provider system 185 for creating the template of the biometric print, the registration code, and/or the initial encryption key. In this embodiment, device 101, containing sensor 170, may obtain the biometric template, initial encryption key, and/or the registration code from service provider system 185 instead of device 101 collecting the biometric print, creating the biometric template, initial encryption key, and/or creating the registration code.

Authentication of user routine 265 may optionally receive and may process the initial request from initial request routine 267 of device 101 to perform the transaction, which includes a passcode. Authentication of user routine 265 may decrypt the transaction information with the encryption key and generate the passcode from a combination of the current passcode generator and transaction information. If the passcode generated by service provider system 185 and the passcode received match from device 101, then the user has been authenticated. If the passcode received and the passcode generated do not match, the process is terminated, and optionally an error message is sent to device 101. During authentication of user routine 265, the passcode generator is perturbed (stored at service provider system 185) and the encryption key (stored at service provider system 185) is perturbed to obtain a new passcode generator and a new encryption key, respectively, so that the passcode generator and encryption key used by service provider system 185 is the same as (or stored differently is synchronized with) the passcode generator and encryption key used by device 101. As with device 101, an embodiment, each passcode is generated from a different passcode generator. In an embodiment, the passcode is generated from the passcode generator generated after generating the prior passcode, which may be generated any time after generating the prior passcode and before generating the current passcode, such as just after generating the prior passcode or just before generating the current passcode, so long as the passcode generator and encryption key of the service provider system 200 is the same as used by user system 101 for creating the passcode being authenticated.

After authentication of user routine 265 authenticates the passcode sent from user system 101, service provider system 185 needs to be authenticated by user system 101 (e.g., so that the user knows that the service provider is not an imposter and thereby protect against man-in-the-middle attacks). Authentication of service provider routine 226 creates a new passcode, which is sent to the user system 101 for authentication. As part of authentication of user routine 265, service provider 185 perturbs the passcode generator, and applies a function (e.g., a one-way hash function) the combination of the passcode generator and the transaction information (which generates the new passcode). In order for service provider system 185 to be authenticated, both service provider system 185 and device 101 generate the new passcode from the same passcode generator and transaction information, and since the passcode generator is indirectly derived from the biometric print and in some embodiments indirectly derived from an unpredictable physical process. Since the transaction information is likely to vary with every transaction, the passcode is likely to be hard to duplicate by someone posing as the user or service provider.

After sending the passcode for authenticating the service provider, service provider system 185 waits for a reply, including a new passcode and transaction information, to complete the transaction. Upon receipt of the passcode and an encrypted message, user authentication routine 265 again authenticates device 101 by decrypting the encrypted message to obtain the new transaction information, perturbing the generating of the new passcode by applying a one way function to the combination of the passcode generator and the transaction information, and comparing the new passcode generated and the new passcode received. If the passcode is determined to be authentic, completion of transaction routine 269 completes the transaction using the transaction information sent from device 101 by initial request routine 267 and/or completion of transaction routine 269. The transaction information sent by initial request routine 267 and completion of transaction routine 269 may be the same or different. In an embodiment, the transaction information sent from device 101 to service provider system 185 are not known in advance. In another embodiment, the transaction information used and/or sent during initial request routine 267 may be information that is already known by service provider system 185, while the transaction information sent during transaction routine 269 (which is after device 101 and service provider system 185 authenticated one another) may include some transaction information that was previously unknown to the service provider 185. Initial request routine 267 may send a perturbation of a hash of an initial passcode and transaction information 293, to service provider system 185, and secure transaction routine 269 may wait for a reply, which will include a passcode that is dependent on the passcode generator and transaction information.

Generate registration code 271 may execute in device 101 and service provider system 185, and sent to the other of device 101 and service provider system 185, and in an embodiment of device 101 and service provider system 185 does not generate the registration code.

Generate encryption key 273 are machine instructions that generate a new encryption key from (e.g., by applying a function, such as a perturbing function to) a prior encryption key. Generate passcode generator 275 are machine instructions that generate a new passcode generator from a prior passcode generator. In other words, generate passcode generator 275 may be an algorithm for generating a passcode generator from previous passcode generator. Generate passcode generator 275 may combine (e.g., concatenate) the prior passcode generator with current transaction information and apply a one-way function (e.g., a one-way hash function) to the combination or may perturb the prior passcode generator. Perturb encryption key 236 may be the same as perturb encryption key 174, and perturb encryption key 236 perturbs the current encryption key to thereby generate the next encryption key. Perturb passcode generator 238 may be the same as perturb encryption key 175, and perturb passcode generator 238 perturbs the current passcode generator to thereby generate the next passcode generator. Generate passcode 240 may be the same as generate passcode 176, and generate passcode 240 may generate a new passcode. Generate passcode 240 may generate the passcode by applying a hash function to a combination of (e.g., a concatenation of) the passcode generator and transaction information. Hash functions 283 may be one a way functions, which may be used by generate registration code 271. Hash functions 283 may be used to generate passcode 240. Hash functions 283 may be used for generating a registration code from a biometric print and/or information from an unpredictable physical process and/or other user information. Hash functions 283 may be used for generating a new passcode from the combination of a prior passcode and transaction. Optionally, hash functions 283 may include a different function for generate registration code 271 and generate passcode 240. Those hash function(s) of hash functions 283 that are used by authentication of user routine 265, request for authentication routine 226, and completion of transaction routine 269 may be the same as one another or different from one another. The perturbing functions in perturbing functions 244 used by perturb encryption key 236 and perturb passcode generator 238, and may be the same or different from one another. Different perturbing functions of perturbing functions 244 may be used during each of authentication of user routine 265, request for authentication routine 226, and completion of transaction routine 269. Although perturbing functions 244 and hash functions 283 are indicated as separate storage areas in from perturb encryption key 236 and perturb passcode generator 238, the perturbing functions may just be stored as part of the code for perturb encryption key 236 and perturb passcode generator 238.

Data 245 may include any data that is needed for implementing any of the routines stored in memory 206. Registration key R 246 may be the same as registration code 186 and may be generated by applying a hash function to biometric print(s) and/or information from an unpredictable physical process, and may be used for generating passcode generators by perturbing the registration code or applying a hash code to the registration code.

Current encryption key K 248 may be the same as current encryption key 188, and may be the current encryption key, which may be stored long enough for the next encryption key to be generated from the current encryption key. Similarly, current passcode generator G 250 may be the same as passcode generator G 190 and may stored long enough for generating the current passcode and the next passcode generator. The passcode generator is a value (e.g., a combination of various symbols and characters) that is combined with the transaction information, and a function may be applied to the combination to generate a passcode. Transaction information S 252 may be the same as transaction 192, and may include information about a transaction that the user would like to perform. Transaction information S 252 may combined with the current passcode generator and to generate the current passcode. Transaction information S 252 may be received from device 101 and may be used to perform a transaction at service provider system 185 on behalf of device 101.

FIGS. 3A, 3B, 3C, 3D, 3E, 3F, 3G and FIG. 4, FIG. 5, and FIG. 6 show methods for different parts of a secure transaction. The methods of FIGS. 3A-3G and FIG. 4, FIG. 5, and FIG. 6 may be implemented on system 100.

Setup of Device or Wallet

Figure 3E:
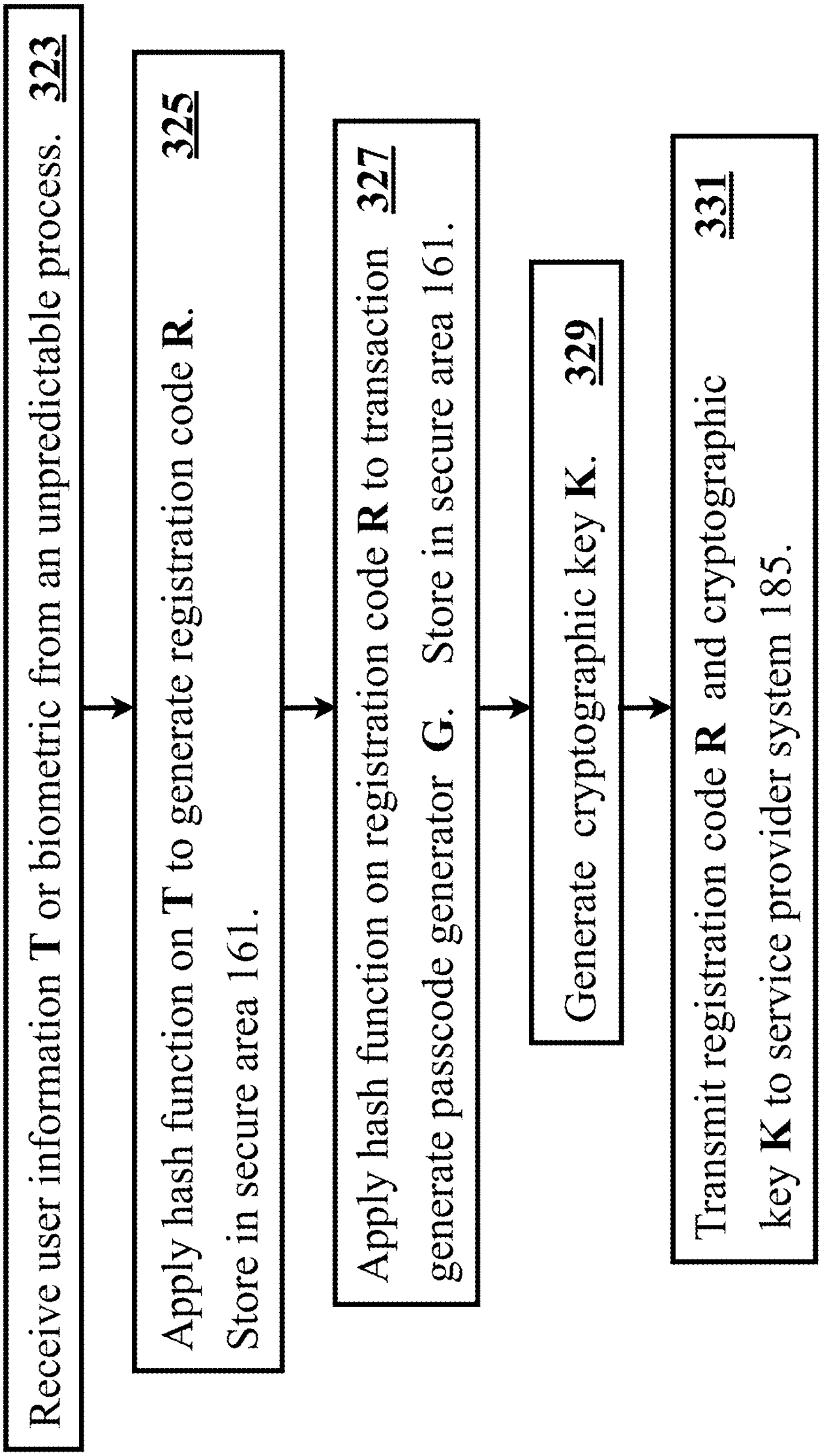
FIG. 3E shows a flow diagram of an embodiment of a user-side method of setting up a system before starting a secure transaction.

FIG. 3E shows a flowchart of an embodiment of method 321 of setting up device 101 for securing transactions. User system method 321 may be the setup performed by device 101 before starting a secure transaction.

In step 323 of the biometric (FIG. 3A) or visual image (5B) or PIN information may be obtained from the user via a sensor 170 in input system 169 in FIG. 1D. A collection or sequence of images that are easy to remember may be obtained as in FIG. 3C and FIG. 5B. Method 321 may also collect other setup information, such as a Personal Identification Number (PIN), or a password, or an email address, or a mobile phone number. The setup data that was collected may be denoted as a T.

In step 325, a hash function Φ or any other one way method is applied on the biometric print information and other collected data T. A hash function Φ is applied to T, one or more times denoted as $\Phi^k(T)$, to create the registration code R which may be stored in secure area 161.

In other words, $R=\Phi^k(T)$. The registration code is a sequence of symbols. An example of a registration code with 16 symbols is "1Ae58GnZbk3T4pcQ". A registration code in hex format maybe used: "32DE0FA3908F100BBCEFFE3E4CB2382E376629E34-A11478291A09B2A3DFFEF." A registration code with punctuation and other symbols may also be used. An example of a registration code with 32 symbols is "1!56hs#KUD3_4xP*7:y2iW=K;r.+4vN?". There is at least one unique registration code for each passcode generator. In at least one embodiment, more than one different hash function may be used so for example, SHA-512 may be applied to U one or more times and Keccak may be applied to W one or more times.

In step 327, transaction passcode generator G is computed. For example, transaction passcode generator G may be generated by applying a hash function Φ to registration code R. In other words, G=Φ(R). In an embodiment, in step 306 transaction passcode generator G may be stored in secure memory system 270. In this specification, passcode generator and transaction passcode generator may be used interchangeably. The transaction passcode generator G may be stored in secure memory system 163 and is a value (e.g., a number or sequence of symbols, such as alphanumeric characters) from which device 101 may generate a one-time transaction passcode. For example, a one-way function may be applied to a combination of the transaction passcode generator G and transaction information to generate the one-time passcode. Each transaction code generator may be generated from a prior transaction passcode generator, by applying a function to the prior passcode generator. In an embodiment, both the device 101 and service provider system 185 separately generate each transaction passcode generator G and each one-way passcode.

In an alternative embodiment, the application of hash function Φ in step 327 may be skipped and the registration code is stored as an initial passcode generator.

In step 329, a cryptographic key K may be generated. In at least one embodiment, the biometric print information T is divided into two parts U,W. U may be used to generate the registration code R and W is used to help generate an encryption key K that the user's secure area and a valid blockchain network only have access to. Similarly, the registration code may be generated as $R=@^k(U, I)$ and the encryption key may be generated as $K=\Phi^k(W, I)$ where I is information created from an unpredictable physical process. Alternatively, the registration R code may be generated from the biometric print, the initial transaction passcode generator may be generated from the registration code and each subsequent passcode generator may be generated from the prior transaction passcode generator. The transaction passcode generator may be used as the encryption key or may be generated by applying yet another one way function to the transaction passcode generator.

In step 331, the registration code R generated in step 327 and the cryptographic key K generated in step 329 may be securely transferred to service provider system 185. In an embodiment, the secure distribution of R and K may be performed by a Diffie-Hellman key exchange.

EMBODIMENT USING TIME

Implemented in System 100

During setup, in the secure area 161, biometric print information obtained from the user and in at least one embodiment unpredictable noise received from the hardware in the secure area 161 is passed to a one-way hash function Φ or another one way method. In one embodiment, the unpredictable noise may come from a physical process (e.g., FIG. 13) using one or more phototransistors or another type of hardware in the secure area of the chip in the wallet. In an embodiment, the unpredictable noise (e.g., FIG. 13) and/or biometric data and/or other user information such as a collection of visual images is used by the device 101 to generate a private key Q and in some embodiments to generate a separate seed s. Public key cryptography algorithms, that comprise instructions 261, are executed on Q to compute a public key P. In some embodiments, public cryptographic key P may computed with elliptic curve operations. Subsequently, P can be used to derive an address A that may be transmitted to the blockchain network. In some embodiments, public key P=address A. In at least one embodiment, the distribution and transmission of public cryptographic key P may implemented with elliptic curve cryptography for signing transactions and subsequent verification by block chain network 183.

In an embodiment, the public key P or address A may be electronically transmitted to the blockchain network 183—for example, using TCP/IP infrastructure. In at least one embodiment, the public key P or address A may be given to the blockchain network 183 in the same physical place, such as at a bank or financial exchange location, or it may be mailed or electronically transmitted to the blockchain network when setup is accomplished remotely. Throughout this specification the term blockchain network 183 and service provider 185 may be interchanged to obtain different embodiments and terms of use. Throughout this specification device 101 and user wallet may be substituted one for another to obtain different embodiments except in discussion of the user interacting with device 101.

USER REGISTRATION FOR A BLOCKCHAIN NETWORK

During setup, the user presents user information. Setup may request the user to present information that he or she knows. The information that the user knows may be a PIN, password, or a sequence or collection of images that are easy to remember. In an embodiment, the user information may be a PIN or password that is entered via a secure interface into the secure area of the user's wallet. In another embodiment, setup may request something that the user is and use a sensor to acquire his/her biometric attributes one or more times. These biometric attributes may be fingerprints, or a voice command or sentence or a face. In another embodiment, at the end of setup, the following steps are executed:

Step 1.) Biometric print information, unpredictable noise from hardware in the secure area and other items (e.g., images, PIN, password, etc.) obtained from the setup, denoted as user information T, are used to create a seed s. In an embodiment, a hash function Φ is applied to user information T, one or more times denoted as $\Phi^k(T)$, to create the seed s. In other words, $s=\Phi^k(T)$. In at least one embodiment, user information T is divided into two parts U, W as described in the previous section and U is used to generate the seed and W is used to generate a private encryption key pair (K, P), which the user's secure area and the blockchain network. Similarly, the private encryption key may be generated by applying the hash function one or more times to the other part of the user information W one or more times (which may be written as $K=\Phi^j(W)$). In at least one embodiment, more than one type of hash function may be used so for example, SHA-512 may be applied to one part of the user information U one or more times and Keccak may be applied to the other part of the user information W one or more times.

Step 2.) A hash function is applied to the public key P one or more times. That is, $\Phi^k(P)$ where k is greater than or equal to 1. The hash output $\Phi^k(P)$ may be truncated to an address A and this address is transmitted to the blockchain network.

Step 3.) To prevent massive thefts that occurred at Mt. Gox and others, there is an additional measure. A private key 289 Q can be dynamically generated in the secure area by combining the seed s and the user information entered into the secure area. In an embodiment, private key Q is computed as $\Phi^k(s, T)$ where the user information is never stored in the secure area. In another embodiment, private key Q is computed as $\Phi^k(s, \Phi(T))$. If the wallet is stolen or broken into remotely over the Internet, the hacker cannot capture Q because the private user information T is never stored in the secure area. Q is used to compute a distinct public key 273 P, which is sent to blockchain network 183.

SECURELY EXECUTING A TRANSACTION USING A BLOCKCHAIN NETWORK

Figure 3F:
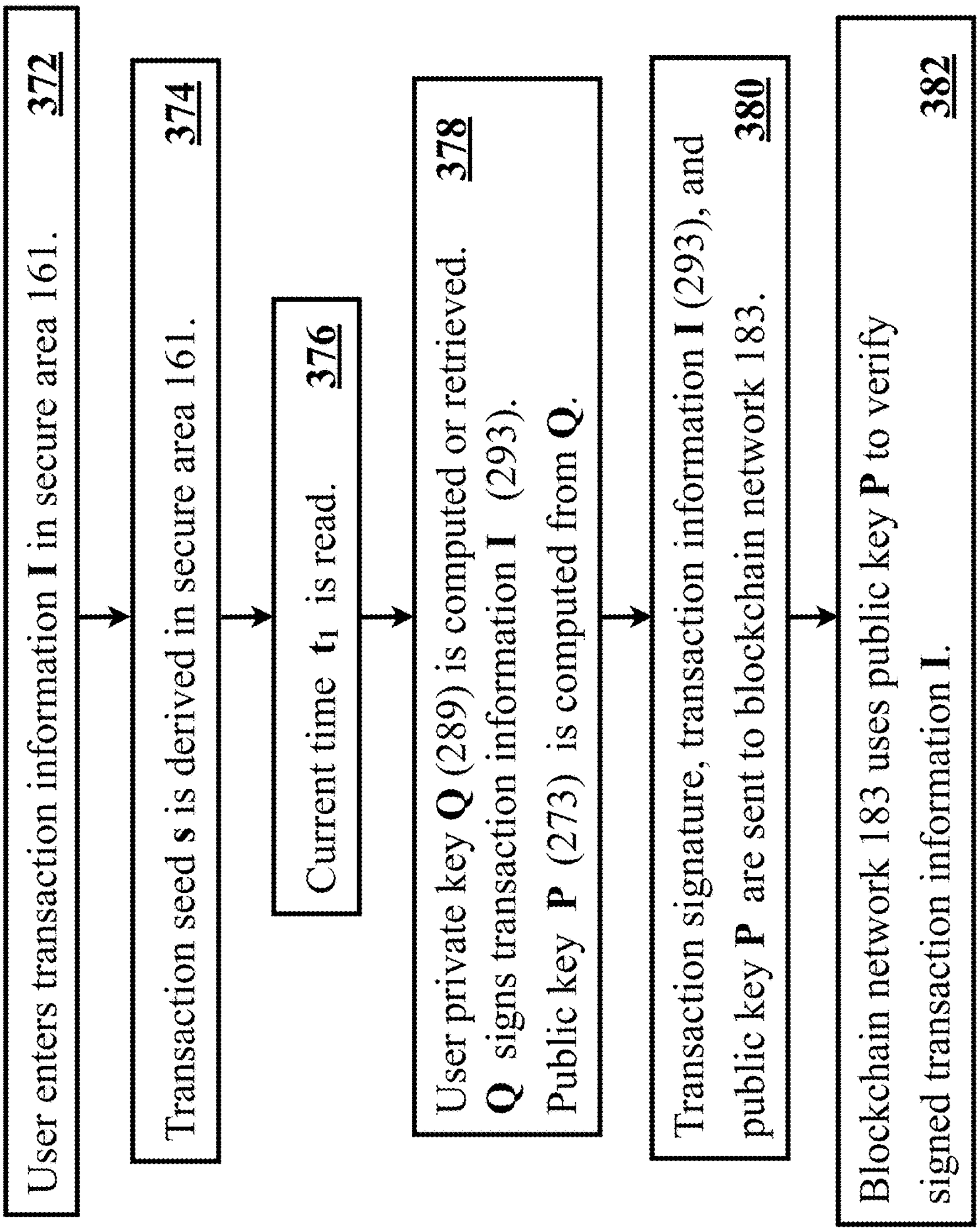
FIG. 3F shows a flow diagram of an embodiment of a secure transaction that is submitted to a blockchain network. In an embodiment, the transaction involves the transfer of bitcoin(s).

In at least one embodiment, there are transaction methods A, B, and C. In some embodiments, transaction steps A.1, A.2, A.3, A.4, A.5 and a successful validation step A.6 comprise a successful transaction, as shown in FIG. 3F. In some embodiments, one or more of the transaction steps is not executed. In some embodiments, machine-implemented methods A, B, and C help prevent an untrusted browser attack or other cyberattack from compromising the transaction.

BLOCKCHAIN TRANSACTION. The person (user) securely enters transaction information into a secure area 161 of his device or wallet (e.g., device 101) and the transaction information is transmitted to the service provider 185. In an embodiment, service provider 185 is performed in a decentralized peer to peer manner by blockchain network 183.

Figure 3G:
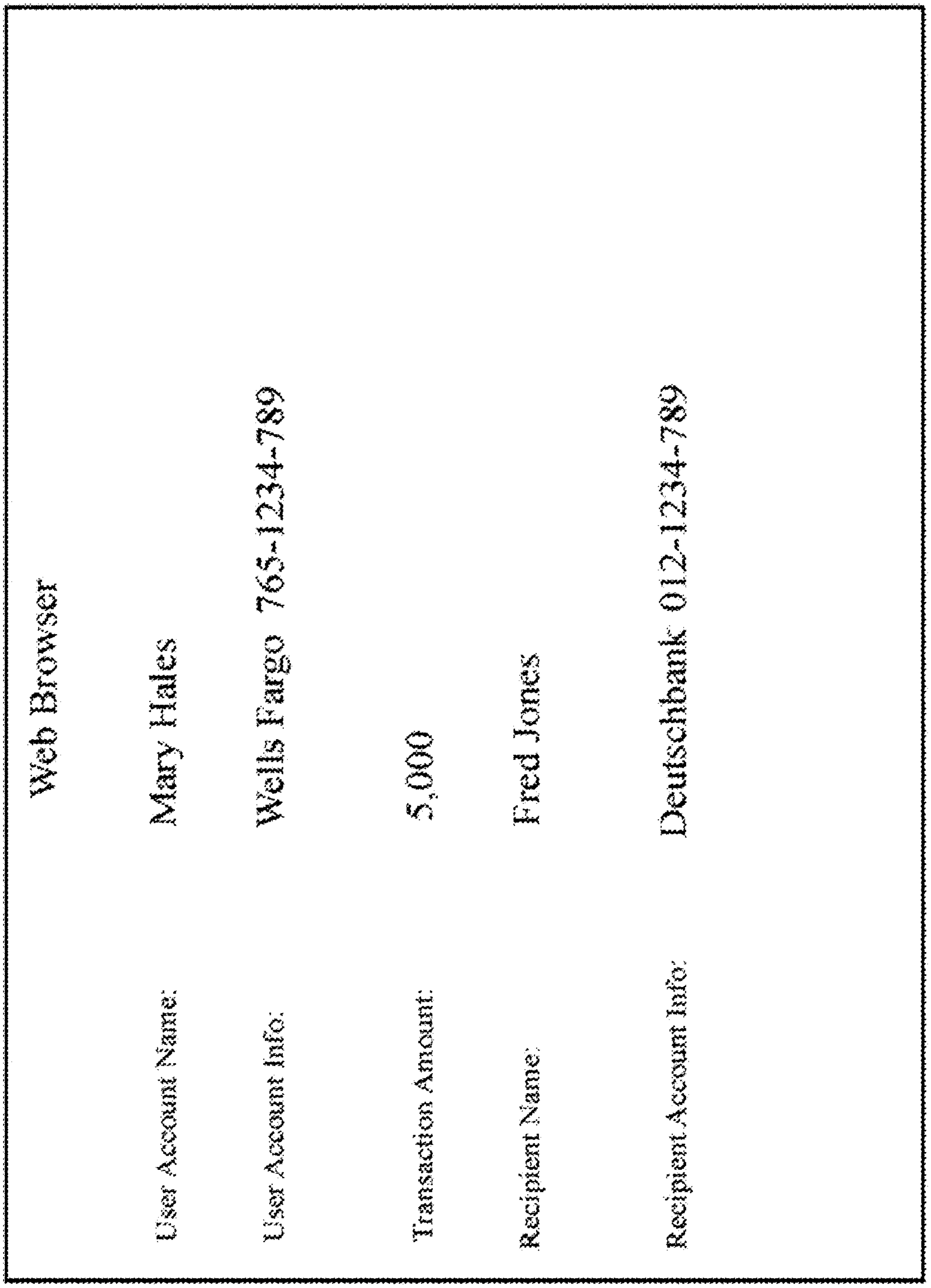
FIG. 3G shows a diagram of an embodiment, where transaction information is entered into a web browser.

A.1 The person selects and enters transaction information I into the secure area 161 of device 101 that in some embodiments is a part of one of the devices shown in FIGS. 3B, 3C, or 3D, or mobile phone in FIG. 4 or FIG. 5A, or FIG. 5B. In an embodiment, transaction information is entered into a web browser, as shown in FIG. 3G.

A.2. The transaction seed s is retrieved or reconstructed from secure area 161 of devices shown in FIGS. 3B, 3C, or 3D, or mobile phone in FIG. 4 or FIG. 5A, or FIG. 5B.

A.3 The current time t, is read.

A.4 The user system receives the private user information T into the secure area and retrieves private key 289 Q and then signs the transaction information 293 I with its private key Q. In some embodiments, public key 273 P, corresponding to Q is a bitcoin address or an ethereum address.

In an embodiment, the current time $t_1$ is part of the transaction information. In another embodiment, the transaction information I and current time $t_1$ are distinct and concatenated and then the concatenation is signed with private key 289 Q. The signing produces a transaction signature—also known as a one-time transaction passcode—that blockchain network 183 can verify with public key 273 P.

A.5 The user system sends the one-time transaction signature (produced by Q) and the transaction information 293 I, public key 273 P to blockchain network 183.

A.6 Blockchain network 183 verifies the signed transaction information with the user's public key P.

In some embodiments, where P is a bitcoin address or ethereum address or an alt coin address, if the verification of the transaction signature (one-time transaction passcode) is successful and the network verifies that the user's cryptocurrency (bitcoin other cryptocurrency) has not been already spent, the blockchain network adds the user's transaction to the pending block which will eventually be added to the new block that is appended to the blockchain.

In some embodiments, the transaction information I is comprised of a bitcoin address. In some embodiments, the transaction information I is comprised of an ethereum (ETH) address. In some embodiments, the transaction information I is comprised of an altcoin address. In some embodiments, the transaction information I involves the amount of bitcoins (e.g., 1.0331 BTC) transferred in exchange for another currency such as U.S. dollars, Euro, British pound, Japanese Yen, Yuan, stock, or product or service(s).

In an embodiment, private key Q may exist for more than 10 years, and may be stored on device 101 for more than 10 years. In an embodiment, during a transaction, Q may exist for less than 1 second. In some embodiments, Q existing for less than a second is what it means to say that the private key Q is transient.

There are many different methods for transmitting public key P, the transaction signature (one-time transaction passcode) and corresponding transaction information I to the service provider system 185, which in some embodiments is a blockchain system. In a one method, the user may transmit the transaction information and transaction signature and public key P via a mobile phone to service provider system 185. In a second method, the user may submit the passcode and transaction information to the web browser of device 101 and use the Internet for transmission to service provider system 185. In many other methods, the user may submit the transaction passcode (signature) and transaction information by some other electronic means, such as a fax machine or an ATM machine. In one method, the transaction passcode and transaction information may be displayed on the blockchain network, when the user is in the same physical location as the service provider system.

In some embodiments, the user system may take extra precautions by executing an extra step: The user system erases or deletes private key Q from secure area 161 after step A.6

In at least one embodiment, the current time $t_1$ is determined and rounded to the nearest minute, for example. Optionally, the sender and receiver may compute the difference in time between the clock of the sender and the clock of the receiver prior to sending a message in case the two clocks are not sufficiently synchronized. In other embodiments, the time may be rounded to the nearest 5 minutes, the nearest, 10 minute, or the nearest hour, for example. For example, if the exact time is 19:05 and 45 seconds, then $t_1$ is set to is 19:06 pm. In some embodiments, the timestamp may be synchronized across timezones based on the Coordinated Universal time (UTC time).

When a transaction is requested by the person, in some embodiments, device 101 only signs the transaction information after a valid biometric print match occurs or a valid verification of other user items such as password, PIN, or images are authenticated by device 101.

In other embodiments, the current time $t_1$ is determined and rounded to the nearest 90 second. In other embodiments, the current time $t_1$ is determined and rounded to the nearest 5 minutes. In these embodiments, if the exact time is 6:07 and 57 seconds, then $t_1$ is set to 6:10.

In at least one embodiment, the blockchain network (e.g., via service provider system 185) verifies the transaction passcode and verifies the transaction information and then executes this transaction if the transaction passcode is valid based on the decrypted transaction information, the same seed and the current time. In this specification the words "valid" and "authenticated" and their conjugations may be substituted one for another to obtain different embodiments. If the transaction signature is determined to not be correct, or the decrypted transaction information is unreadable, then the transaction is aborted.

In other embodiments, the blockchain network continues with transaction methods B and C before the transaction is executed. These steps involve an exchange between the user (sender) and the recipient. The blockchain network acts as the intermediate trusted party.

TRANSACTION METHOD B. Blockchain network 183 serves as a service provider system 185 and receives the transaction information and one-time transaction passcode. The blockchain network checks the transaction information and checks that the one-time transaction passcode is correct (e.g., the transaction information, the seed, and the time at which the passcode was generated are encrypted with a one-way hash function thereby computing the passcode, and the computed passcode is compared to a newly sent passcode to determine if there is a match.). If the transaction signature (one-time transaction passcode) received from the user is not correct (e.g., if the sent transaction signature does not match the computed signature), the transaction is aborted, and no transaction occurs. If the one-time transaction passcode received from the user is correct (e.g., if the sent passcode matches the computed passcode), then the blockchain network sends a new transaction signature back to the user that is generated by the recipient. The new transaction signature may be computed by the recipient applying her private key to the transaction information I and the new time $t_2$ where $t_2$ is the new current time read by the blockchain network 183 (at service provider system 185) or recipient's wallet.

In at least one embodiment, the private encryption key Q may be updated, denoted as h(Q), using similar methods to the update of the transaction passcode generator. Then the transaction information is sent from the blockchain network 183 back to the user. (Updating the private encryption key Q may help address sniffing and replay attacks.)

TRANSACTION METHOD C. The device 101, via the block chain network 183, checks the recipient's signing of the transaction information. Otherwise, the block chain network acting as the service provider system 185, aborts the transaction.

USER INTERFACE IN THE SECURE AREA

In at least one embodiment, the user interface may be connected to the secure area of the device may have a display screen and navigation buttons or character entry of letters, numbers or symbols using a touch sensitive screen. In at least one embodiment, the device may have a USB connection. In at least one embodiment, the device containing the secure area 161 may contain a wireless chip and a battery. In at least one embodiment, the device may be a mobile phone.

FIG. 3B, 3C, 3D and 5B show a display screen. In at least one embodiment, the display screen may part of a mobile phone. In other embodiments, the display screen may be on a smart card or USB device. In at least one embodiment, some or all of the financial institution members of the worldwide banking system may be stored into the secure area of the chip inside device 101 when the user registers with the bank or opens an account. In at least one embodiment, the user may use the navigation buttons, and/or character entry of letters, numbers or symbols using a touch sensitive screen and a display screen to scroll and select one of the banks to make a transaction with. In at least one embodiment, the user may use navigations buttons or a touch sensitive screen and display screen to scroll and select other transaction information stored in the secure area of the chip. In at least one embodiment, the user may use the navigation buttons and display screen to scroll and select letters or words that help enter transaction information.

In at least one embodiment, the user may be using a cryptocurrency wallet such as bitcoin or ripple. In at least one embodiment, the user wallet may be used to securely execute wire transfers between two banks. In at least one embodiment, the user wallet may be used to purchase a retail item such as a cup of coffee or a sandwich. In at least one embodiment, the device containing the secure area may contain a microphone. In at least one embodiment, the secure area of the chip may contain speech recognition code to receive transaction instructions or information from the user. In at least one embodiment, the device may have one or more biometric sensors. In at least one embodiment, the display screen may act as a keyboard for entering passwords and transaction information. In at least one embodiment, the display screen may enable the user to verify that the transaction information is correct or has not been tampered with by malware before executing the transaction.

In an embodiment, each passcode generator or private key is not stored in a database but stored in a separate chip which is indexed by the user's address (public key) and/or user id. In an embodiment, the function call trx1_passcode(user_address, trx_amount, other_trx_info); is passed in the user's address, user_address, the transaction amount, trx_amount, and optionally transaction info The function trx1_passcode returns a transaction passcode or signing of the that the blockchain network 183 expects to be the correct passcode.

The returned transaction passcode is compared to the transaction code received from the user's device or wallet. This embodiment protects the passcode generator or private key, because the passcode generator or private key never leaves the separate chip.

In an alternative embodiment, trx2_passcode(recipient_address, trx_amount, trx_info); passes the address of the recipient recipient_address, and the transaction amount, trx_amount, and trx2_passcode returns a transaction passcode Q that the blockchain network checks and validates to be the correct transaction passcode, which is dependent on the recipient's address, the transaction amount and optionally other transaction information (trx_info) to be sent from the user to the recipient. The transaction passcode Q is compared to the transaction passcode received from the user's device, which may be a token, mobile phone or other device.

In an embodiment, an interface retrieves a passcode generator, passcode_generator, from a database. In an embodiment, the interface is implemented with the diameter protocol <http://en.wikipedia.org/wiki/Diameter_(protocol)>. In an alternative embodiment, the interface is implemented with the RADIUS protocol <http://en.wikipedia.org/wiki/RADIUS>. In an embodiment, each passcode_generator is stored in an embedded database. In an embodiment, the passcode generator, passcode_generator, is a string of the form "23 102 215 211 55 125 14 25 36 48 152 201 106 11 77 20 21 76 53 89 29 104 114 188 209 45 135 94 15 35 47 254 219 125 35 14 19 25 27 244 236" or the string might be longer. In an embodiment, the passcode generator, passcode_generator, is a sequence of bytes of the form:

"2AB02CE4E1BA93DBC9E844E6551E3CC3FF83A7-877B1A4A3205885E724159AB72918A FCD15FE-817A87B305F43C10500CE2290C49AC032F7B674-230A84FEA2DD1E".

In an embodiment, the passcode generator, passcode_generator may be substantially longer. For example, passcode generator may have a length of 2048 bytes or 65,536 bytes.

In the C programming language the length of the passcode generator could be declared as follows unsigned char passcode_generator[64]; or char passcode_generator[2048]; or unsigned char passcode_generator[65536];

An example of a user_name is Haley Arielle. In the C programming language the user name could be declared as follows. unsigned char user_name[200]={'H', 'a', 'l', 'e', 'y', ' ', 'A', 'r', 'i', 'e', 'l', 'l', 'e', '\0'};

An example of a routing_mumber is string "124000379". An example of trx_amount is "$5000".

Cryptor is the name of function that encrypts or decrypts transaction data. In an embodiment, the function decrypts and encrypts transactions may execute a symmetric cryptography algorithm such as AES-256. In another embodiment, function that encrypts or decrypts transaction data, cryptor, may execute an asymmetric cryptography algorithm such as RSA or ECC (Elliptic curve cryptography).

Consider the C function call cryptor("d", ciper_text, key_bytes).

The option "d" tells the function to decrypt ciper_text. In an embodiment ciper_text is an encypted string of the form "A1092BFF . . . 55." In an alternative embodiment "127 134 147 189 209 . . . 234". This represents the text that has been encrypted. key_bytes is the variable storing the key that is used by cryptor to decrypt ciper_text. In an embodiment, key_bytes is a string of the form "7BCAF22D . . . 0E38". In an alternative embodiment, "123 202 242 45 . . . 14 156". In an embodiment, key_bytes may have length of 32 bytes. In another embodiment, key_bytes may have length of 2048 bytes. In an embodiment, the decrypted ciphertext may be returned in the string ciper_text.

Consider the C function call cryptor("e", plain_text, key_bytes): The option "e" tells the function to encrypt plain_text. In an embodiment plain_text is a string of the form "User: Haley Arielle. Account Number: 121456789-3456789956. Bank: Wells Fargo. Amount: $5000. Recipient: Michael Fiske. Account Number: 101345729-2411779888 Bank: Citibank" This represents the text that has been encrypted. key_bytes is the variable storing the key that is used by cryptor to encrypt plain_text.

In an embodiment, key_bytes is a string of the form "7BCAF22D . . . 0E38". In an alternative embodiment, key_bytes may have the string "123 202 242 45 . . . 14 156". In an embodiment, key_bytes may have length of 32 bytes. In another embodiment, key_bytes may have length of 2048 bytes. In an embodiment, the encrypted ciphertext may be returned in the string plain text.

Each of the above embodiments may be used separately from one another in combination with any of the other embodiments. All of the above embodiments may be used together. For example, the different embodiments of transaction device 101 and administrators 102 may all be used in the same system 100. Similarly, the different aspects of each component may be used together or separately. For example, a transaction device 101 may include any one or any combination of no operating system, a secure area, embedded software, and/or being configured to function as a standalone device. Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A machine-implemented method, wherein a transaction comprises:

a first party comprising a processor system that has at least one processor for executing instructions and a memory system for storing instructions;

a second party comprising a processor system that has at least one processor for executing instructions and a memory system for storing instructions;

the first party generating a private key;

the first party computing a public key from the private key;

the first party sending its public key to the second party;

the second party receiving the first party's public key;

the first party signing transaction information with first party's private key and computing a transaction signature;

wherein the first party signing transaction information is executed on a device having a touch sensitive screen;

the first party sending the transaction information and transaction signature to a second party;

the second party using the first party's public key to verify the signature;

if the first party's transaction signature is valid, the second party executes the transaction;

wherein the second party is a blockchain network.

2. The method of claim 1 wherein the first party computing a transaction signature, based on a bitcoin address that is part of the transaction information.

3. The method of claim 1 wherein the computing of said transaction signature depends at least partly on the time.

4. The method of claim 1 wherein said computing of a transaction signature executes at least some elliptic curve computations over a finite field.

5. The method of claim 1, wherein said generating of the private key depends upon biometric information.

6. The method of claim 1, wherein said generating of the private key depends upon the first party selecting a collection or sequence of visual images.

7. The method of claim 1, wherein said processor system contains a smart card processor.

8. A machine-implemented method, wherein a transaction comprises:

a first party comprising a processor system, the processor system comprising at least one processor for executing instructions and a memory system for storing instructions;

a second party comprising a processor system, the processor system comprising at least one processor for executing instructions and a memory system for storing instructions;

a first party generating a private key;

the first party computing a public key from the private key;

the first party sending its public key to the second party;

the second party receiving the first party's public key;

the first party signing transaction information with first party's private key and computing a transaction signature;

the first party sending the transaction information and transaction signature to a second party; the second party using the first party's public key to verify the signature;

if the first party's transaction signature is valid, the second party executes the transaction;

wherein the second party is a blockchain network;

and wherein the first party computing a transaction signature, is based on an ethereum address or an alt coin address that is part of the transaction information.

9. The method of claim 8, wherein said generating of private key is derived from one or more words or images, where at least one is an animal, place, or object.

10. The method of claim 8, wherein said private key is at least partly derived from a password.

11. The method of claim 8, wherein said private key is generated at least partly based on biometric information.

12. The method of claim 8, wherein said private key is generated at least partly based on quantum events in a device where the transaction signature is computed.

13. The method of claim 8, wherein the transaction signature is validated by a blockchain network.

14. A transaction system comprising:

a first party comprising a processor system, the processor system comprising at least one processor for executing instructions and a memory system for storing instructions;

the first party generating a private key;

the first party computing a public key from the private key;

the first party sending its public key to a second party;

the second party receiving the first party's public key;

the first party signing transaction information with first party's private key and generating a transaction signature;

wherein the first party signing transaction information is executed on a device having a touch sensitive screen;

the first party sending the transaction information and transaction signature to a second party;

the second party using the first party's public key to verify the signature;

if the first party's transaction signature is valid, the second party executes the transaction;

wherein the second party is a blockchain network;

and wherein each processor system in the blockchain network has at least one processor for executing instructions and a memory system for storing instructions.

15. The system of claim 14 wherein the first party computing a transaction signature, based on a bitcoin address that is part of the transaction information.

16. The system of claim 14 wherein said computing of a transaction signature executes at least some elliptic curve computations over a finite field.

17. The system of claim 14, wherein said generating of the private key depends upon biometric information.

18. The system of claim 14, wherein said generating of the private key depends upon a collection or sequence of visual images selected by the first party.

19. The system of claim 14, wherein the generating of the private key depends upon a physical device measuring a quantum event.

* * * * *